(12) United States Patent
Parker et al.

(10) Patent No.: US 9,738,046 B2
(45) Date of Patent: Aug. 22, 2017

(54) METHODS FOR THE FABRICATION OF POLYMERIC FIBERS

(71) Applicant: President and Fellows of Harvard College, Cambridge, MA (US)

(72) Inventors: Kevin Kit Parker, Waltham, MA (US); Mohammad Reza Badrossamay, Cambridge, MA (US); Josue Adrian Goss, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 299 days.

(21) Appl. No.: 14/359,005

(22) PCT Filed: Nov. 16, 2012

(86) PCT No.: PCT/US2012/065646
§ 371 (c)(1),
(2) Date: May 16, 2014

(87) PCT Pub. No.: WO2013/115896
PCT Pub. Date: Aug. 8, 2013

(65) Prior Publication Data
US 2014/0322515 A1 Oct. 30, 2014

Related U.S. Application Data

(60) Provisional application No. 61/561,185, filed on Nov. 17, 2011.

(51) Int. Cl.
*D01D 5/40* (2006.01)
*B29D 99/00* (2010.01)
(Continued)

(52) U.S. Cl.
CPC ........... *B29D 99/0078* (2013.01); *D01D 5/00* (2013.01); *D01D 5/0985* (2013.01); *D01D 5/18* (2013.01);
(Continued)

(58) Field of Classification Search
CPC .................................. D01D 5/18; D01D 5/40
(Continued)

(56) References Cited

U.S. PATENT DOCUMENTS 1,975,504 A   10/1934 Formhals
4,237,081 A   12/1980 Murphy et al.
(Continued)

FOREIGN PATENT DOCUMENTS

CN           101871133 A      10/2010
WO      WO-2004/080681 A1     9/2004
WO      WO-2010132636 A1 *   11/2010  ............... D01D 5/18

OTHER PUBLICATIONS

Harfenist et al., "Direct Drawing of Suspended Filamentary Micro- and Nanostructures from Liquid Polymers", NanoLetters, vol. 4, No. 10, pp. 1931-1937 (2004).
(Continued)

*Primary Examiner* — Leo B Tentoni
(74) *Attorney, Agent, or Firm* — McCarter & English, LLP; Deborah L. Nagle; Anita M. Bowles

(57) ABSTRACT

In accordance with an exemplary embodiment, a method is provided for forming a micron, submicron and/or nanometer dimension polymeric fiber. The method includes providing a stationary deposit of a polymer. The method also includes contacting a surface of the polymer to impart sufficient force in order to decouple a portion of the polymer from the contact and to fling the portion of the polymer away from the
(Continued)

contact and from the deposit of the polymer, thereby forming a micron, submicron and/or nanometer dimension polymeric fiber.

24 Claims, 45 Drawing Sheets

(51) Int. Cl.
*D01D 5/00* (2006.01)
*D01F 6/62* (2006.01)
*D01D 5/098* (2006.01)
*D01D 5/18* (2006.01)

(52) U.S. Cl.
CPC ..... *D01F 6/625* (2013.01); *Y10T 428/249921* (2015.04)

(58) Field of Classification Search
USPC ........................ 264/8, 211.1, 310; 528/502 F
See application file for complete search history.

(56) References Cited

U.S. PATENT DOCUMENTS

| | | |
|---|---|---|
| 4,536,361 A | 8/1985 | Torobin |
| 6,207,274 B1 | 3/2001 | Ferenc et al. |
| 6,382,526 B1 | 5/2002 | Reneker et al. |
| 2003/0147983 A1 | 8/2003 | Berrigan et al. |
| 2004/0234571 A1 | 11/2004 | Jang |
| 2005/0163932 A1 | 7/2005 | Zschieschang et al. |
| 2006/0094096 A1 | 5/2006 | Wang et al. |
| 2008/0242171 A1 | 10/2008 | Huang et al. |
| 2008/0307766 A1 | 12/2008 | Petras et al. |
| 2010/0233928 A1 | 9/2010 | Ferry et al. |
| 2011/0073243 A1 | 3/2011 | Yu et al. |
| 2012/0135448 A1 | 5/2012 | Parker et al. |
| 2013/0312638 A1 | 11/2013 | Parker et al. |

OTHER PUBLICATIONS

European Search Report in 12867106.2, mailed Sep. 25, 2015.
International Search Report and Written Opinion in PCT/US2012/065646, mailed Aug. 27, 2013.

* cited by examiner

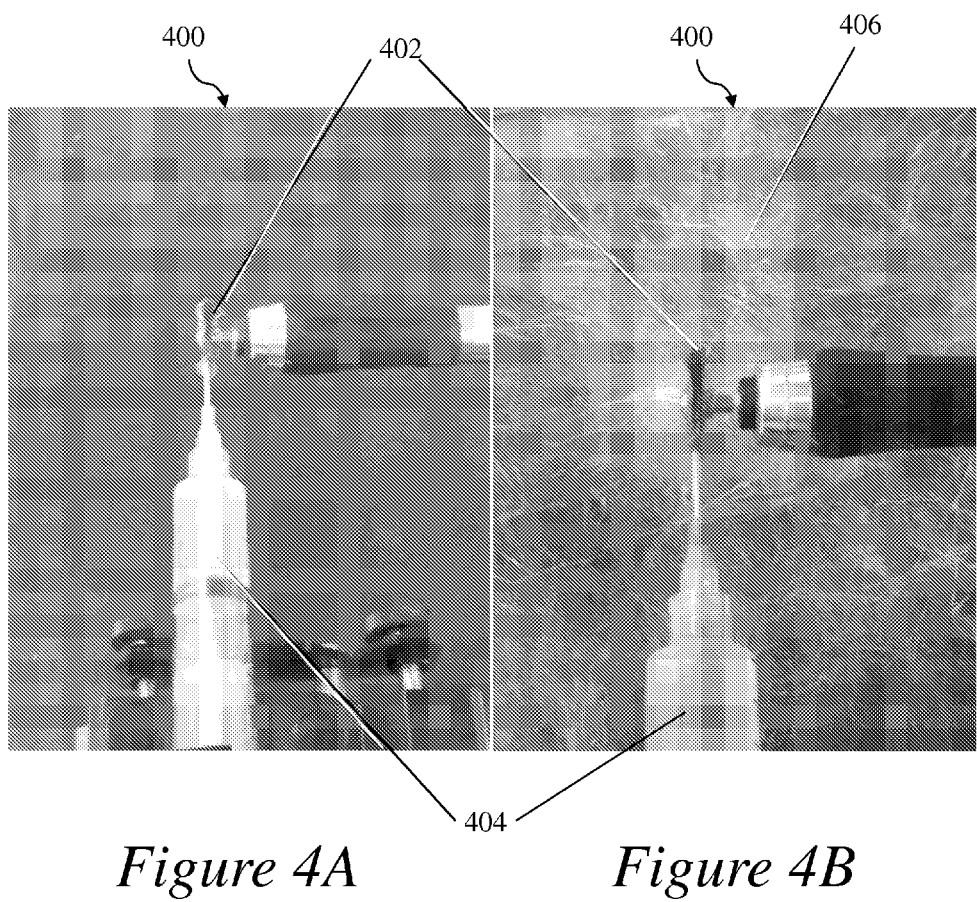
*Figure 4A*  *Figure 4B*

Pull-spinning schematic

- It is feasible to fabricate micro/nano scale fibers from melt

Polystyrene fibers formed on the blade fiber diameter:2.6 ± 1.1

METHODS FOR THE FABRICATION OF POLYMERIC FIBERS

RELATED APPLICATIONS

This application is a 35 U.S.C. §371 national stage filing of International Application No. PCT/US2012/065646, filed on Nov. 16, 2012, which claims priority to U.S. Provisional Application No. 61/561,185, filed on Nov. 17, 2011, the entire contents of which are incorporated herein by this reference.

GOVERNMENT SUPPORT

This invention was made with government support under W911NF-10-1-0113 awarded by the U.S. Department of Defense (DARPA). The United States government has certain rights in the invention.

BACKGROUND

Polymeric fibers, such as nanofibers, have a broad array of uses including, but not limited to, use in catalytic substrates, photonics, filtration, protective clothing, cell scaffolding, drug delivery and wound healing. Structures prepared using polymeric fibers are good candidates for tissue engineering because such structures can be easily wound into different shapes, have a high surface to mass ratio, high porosity (which contributes to breathability), ability to encapsulate active substances, and the ability to be aligned, and the like. Tissue engineering applications for structures made using polymeric fibers may include, but are not limited to orthopedic, muscular, vascular and neural prostheses, and regenerative medicine. Madurantakam, et al. (2009) *Nanomedicine* 4:193-206; Madurantakam, P. A., et al. (2009) *Biomaterials* 30(29):5456-5464; Xie, et al. (2008) *Macromolecular Rapid Communications* 29:1775-1792.

Electrospinning is a conventional process for fabricating polymeric fibers. Electrospinning uses high voltages to create an electric field between a droplet of polymer solution at the tip of a needle and a collection device. One electrode of the voltage source is placed in the solution and the other electrode is connected to the collection device. This exerts an electrostatic force on the droplet of polymer solution. As the voltage is increased, the electric field intensifies, thus increasing the magnitude of the force on the pendant droplet of polymer solution at the tip of the needle. The increasing electrostatic force acts in a direction opposing the surface tension of the droplet and causes the droplet to elongate, forming a conical shape known as a Taylor cone. When the electrostatic force overcomes the surface tension of the droplet, a charged continuous jet of polymer solution is ejected from the cone. The jet of polymer solution accelerates towards the collection device, whipping and bending wildly. As the solution moves away from the needle and toward the collection device, the jet rapidly thins and dries as the solvent evaporates. On the surface of the grounded collection device, a non-woven mat of randomly oriented solid polymeric fibers is deposited. Zufan (2005) *Final RET Report*; Xie, J. W. et al. (2008) *Macromolecular Rapid Communications* 29(22):1775-1792; Reneker, D. H., et al. (2007) *Advances in Applied Mechanics* 41:43-195; Dzenis, Y. (2004) *Science* 304(5679):1917-1919; Rutledge, G. C. and Yu, J. H. (2007) "Electrospinning" In *Encyclopedia of Polymer Science and Technology*, John Wiley & Sons: New Jersey; Krogman, K. C., et al. (2009) *Nature Materials* 8(6):512-518; Pham, Q. P., et al. (2006) *Tissue Engineering* 12(5):1197-1211; Boland, E. D., et al. (2001) *Journal of Macromolecular Science-Pure and Applied Chemistry* 38(12):1231-1243; Teo, W. E. and Ramakrishna, S. (2006) *Nanotechnology* 17(14):R89-R106; Li, D.; Xia, Y. N. (2004) *Advanced Materials* 16(14):1151-1170; Greiner, A. and Wendorff, J. H. (2007) *Angewandte Chemie-International Edition* 46(30):5670-5703.

There are multiple drawbacks associated with electrospinning, e.g., a low production rate, the requirement of a high voltage electrical field, the requirement of precise solution conductivity, and the need for additional devices for producing aligned fiber structures. Lia and Xia (2004) *Advanced Materials* 16:1151-1170; Weitz, et al. (2008) *Nano Letters* 8:1187-1191; Arumuganathar, S. and Jayasinghe, S. N. (2008) *Biomacromolecules* 9(3):759-766.

Accordingly, there is a need in the art for improved systems, devices and methods for the fabrication of polymeric fibers, such as nanofibers.

SUMMARY OF THE INVENTION

Described herein are improved systems, devices and methods for the fabrication of fibers having micron, submicron, and nanometer dimensions from a liquid material. Exemplary fiber formation devices do not employ a nozzle for ejecting the liquid material, a spinneret or rotating reservoir containing and ejecting the liquid material, or an electrostatic voltage potential for forming the fibers. The exemplary devices described herein are simplified as they do not employ a spinneret or an electrostatic voltage potential. In addition, the lack of a nozzle for ejecting the liquid material in exemplary devices avoids the issue of clogging of the nozzle.

Exemplary devices, systems and methods may result in the fabrication of micron, submicron and/or nanometer dimension polymeric fibers having exemplary diameters ranging from about one nanometer to about 100 microns. Exemplary diameters may include, but are not limited to, about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 microns. Exemplary diameters intermediate to the recited diameters are also part of the invention.

Exemplary devices, systems and methods may be used to form a single, continuous fiber or a plurality of fibers of the same or different diameters, e.g., diameters about 25 nanometers to about 50 micrometers, about 100 nanometers to about 1 micrometer, about 500 nanometers to about 100 micrometers, 25 micrometers to about 100 micrometers, or about 5, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 micrometers. Exemplary diameters intermediate to the recited diameters are also part of the invention.

In an exemplary embodiment, a plurality of aligned (e.g., uniaxially aligned) micron, submicron and/or nanometer dimension polymeric fibers may be formed.

In exemplary embodiments, the spatial and hierarchical structure of the fibers formed by exemplary fiber formation devices, systems and methods may be configured by controlling one or more factors including, but not limited to, the rotational speed of a rotating structure, the concentration of the liquid material, the viscosity of the liquid material, the molecular weight of the liquid material, the volatility of the solvent of the liquid material, the temperature, and the like.

A fiber formed using the methods and devices of the invention may be of any length. Exemplary lengths may range from about one nanometer to about 500 yards, but are not limited to this exemplary range. Some exemplary fiber lengths may include, but are not limited to, one nm to about 100 nm, about 1 mm to about 100 mm, 1 cm to about 100 cm, 1 foot to about 100 feet, 1 yard to about 100 yards, and the like. Exemplary fiber lengths intermediate to the recited lengths are also part of the invention.

In one embodiment, the length of the fibers may depend on the length of time the device is in motion and/or the amount of the liquid material fed into the system. Additionally, the fibers may be cut to a desired length using any suitable instrument.

The fibers produced in accordance with exemplary embodiments may be used, for example, as an extracellular matrix and, which together with cells, may also be used in forming engineered tissue. Such tissue is useful not only for the production of prosthetic devices and regenerative medicine, but also for investigating tissue developmental biology and disease pathology, as well as in drug discovery and toxicity testing. The fibers may also be combined with other substances, such as, therapeutic agents, in order to deliver such substances to the site of application or implantation of the fibers for, e.g., treating a subject in need of such treatment. The fibers produced according to the methods disclosed herein may also be used to generate food products, membranes, filters, and the like.

In accordance with an exemplary embodiment, a method is provided for forming a micron, submicron and/or nanometer dimension polymeric fiber. The method includes providing a stationary deposit of a polymer. The method also includes contacting a surface of the polymer to impart sufficient force in order to decouple a portion of the polymer from the contact and to fling the portion of the polymer away from the contact and from the deposit of the polymer, thereby forming a micron, submicron and/or nanometer dimension polymeric fiber.

In accordance with another exemplary embodiment, a system is provided for forming a micron, submicron and/or nanometer dimension polymeric fiber. The system includes a platform for supporting a stationary deposit of a polymer, and a rotating structure disposed vertically above the platform and spaced from the platform along a vertical axis. The rotating structure includes a central core rotatable about a rotational axis, and one or more blades affixed to the rotating core. The rotating structure is configured and operable so that, upon rotation, the one or more blades contact a surface of the polymer to impart sufficient force in order to decouple a portion of the polymer from contact with the one or more blades of the rotating structure and to fling the portion of the polymer away from the contact with the one or more blades and from the deposit of the polymer, thereby forming a micron, submicron and/or nanometer dimension polymeric fiber.

Sufficient rotational speeds and times for operating the devices of the invention to form a fiber may be dependent on the concentration of the material and the desired features of the formed fiber. Exemplary speeds of rotation of the rotating structure may range from about 100 rpm to about 500,000 rpm, although rotational speeds are not limited to this exemplary range. Certain exemplary devices employing rotational motion may be rotated at a speed of about 1,000 rpm-50,000 rpm, about 1,000 rpm to about 40,000 rpm, about 1,000 rpm to about 20,000 rpm, about 5,000 rpm-20,000 rpm, about 5,000 rpm to about 15,000 rpm, or about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, or about 24,000 rpm. Ranges and values intermediate to the above recited ranges and values are also contemplated to be part of the invention. For example, rotating speeds of about 10,000 rpm-15,000 rpm, or 8,000 rpm-12,000 rpm are intended to be encompassed by the methods of the invention. In one embodiment, devices employing rotational motion may be rotated at a speed greater than about 1,000 rpm, greater than about 1,500 rpm, greater than about 2,000 rpm, greater than about 2,500 rpm, greater than about 3,000 rpm, greater than about 3,050 rpm, greater than about 3,100 rpm, greater than about 3,150 rpm, greater than about 3,200 rpm, greater than about 3,250 rpm, greater than about 3,300 rpm, greater than about 3,350 rpm, greater than about 3,400 rpm, greater than about 3,450 rpm, greater than about 3,500 rpm, greater than about 3,550 rpm, greater than about 3,600 rpm, greater than about 3,650 rpm, greater than about 3,700 rpm, greater than about 3,750 rpm, greater than about 3,800 rpm, greater than about 3,850 rpm, greater than about 3,900 rpm, greater than about 3,950 rpm, or greater than about 4,000 rpm. Speeds intermediate to the above recited speeds are also contemplated to be part of the invention.

An exemplary rotating structure may be rotated to impact the liquid material for a time sufficient to form a desired fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

In accordance with another exemplary embodiment, a miniaturized system is provided for forming a micron, submicron and/or nanometer dimension polymeric fiber within a cavity, such as a cavity of a human body or a miniaturized cavity. The system includes a polymer supply tube having a supply end extending into the cavity for supplying a polymer, and a miniaturized rotating structure provided in the vicinity of the supply end of the polymer supply tube. The rotating structure includes a central core rotatable about an axis of rotation, and one or more blades affixed to the rotating core. The system also includes a motion generator for rotating the rotating structure about the axis of rotation. The rotating structure is configured and operable so that, upon rotation, the one or more blades contact a surface of the polymer to impart sufficient force in order to decouple a portion of the polymer from contact with the one or more blades of the rotating structure and to fling the portion of the polymer away from the contact with the one or more blades and from the deposit of the polymer, thereby forming a micron, submicron and/or nanometer dimension polymeric fiber.

In accordance with another exemplary embodiment, a system is provided for forming a micron, submicron and/or nanometer dimension polymeric fiber. The system includes a platform for supporting a stationary deposit of a polymer, and a jet nozzle disposed in the vicinity of the platform and spaced from the platform along a vertical axis. The jet nozzle is configured to generate a gas jet directed at the polymer so that the gas jet contacts a surface of the polymer to impart sufficient force in order to fling a portion of the polymer away from the contact with the gas jet and from the deposit of the polymer, thereby forming a micron, submicron and/or nanometer dimension polymeric fiber.

Exemplary fibers formed using exemplary fiber formation devices, systems and methods have numerous applications and advantages. For example, exemplary fiber formation devices, systems and methods may be used to create three-dimensional tissue engineering scaffolds directly from extracellular matrix proteins without hazardous effects and interruption in protein biological activities. Exemplary fiber formation devices, systems and methods may be used to integrate living cells into these micro- and nano-scale polymeric scaffolds to generate cell-encapsulated threads which is not feasible using techniques of nanofiber fabrication known in the art. Exemplary fiber formation devices, systems and methods may be used to fabricate nanofiber assemblies from small quantities of polymer liquids. Exemplary fiber formation devices, systems and methods may be used to fabricate nanofiber assemblies from polymer melts as well as polymer solutions due to the independence of the devices and methods disclosed herein from solution conductivity. Exemplary fiber formation devices, systems and methods may be used to fabricate nanofibers from in situ cross-linked polymer solutions due to the high rate of nanofiber production of the methods and devices disclosed herein.

Exemplary polymers for use in the devices and methods of the invention may be biocompatible or non-biocompatible and include, for example, poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol), poly(acrylic acid), polyacrylamide, poly(ethylene-co-vinyl acetate), poly(ethylene glycol), poly(methacrylic acid), polylactides (PLA), polyglycolides (PGA), poly(lactide-co-glycolides) (PLGA), polyanhydrides, polyphosphazenes, polygermanes, polyorthoesters, polyesters, polyamides, polyolefins, polycarbonates, polyaramides, polyimides, and copolymers and derivatives thereof.

Exemplary polymers for use in the devices and methods of the invention may also be naturally occurring polymers e.g., proteins, polysaccharides, lipids, nucleic acids or combinations thereof.

Exemplary proteins, e.g., fibrous proteins, for use in the devices and methods of exemplary embodiments include, but are not limited to, alginate, silk (e.g., fibroin, sericin, etc.), keratins (e.g., alpha-keratin which is the main protein component of hair, horns and nails, beta-keratin which is the main protein component of scales and claws, etc.), elastins (e.g., tropoelastin, etc.), fibrillin (e.g., fibrillin-1 which is the main component of microfibrils, fibrillin-2 which is a component in elastogenesis, fibrillin-3 which is found in the brain, fibrillin-4 which is a component in elastogenesis, etc.), fibrinogen/fibrins/thrombin (e.g., fibrinogen which is converted to fibrin by thrombin during wound healing), fibronectin, laminin, collagens (e.g., collagen I which is found in skin, tendons and bones, collagen II which is found in cartilage, collagen III which is found in connective tissue, collagen IV which is found in extracellular matrix protein, collagen V which is found in hair, etc.), vimentin, neurofilaments (e.g., light chain neurofilaments NF-L, medium chain neurofilaments NF-M, heavy chain neurofilaments NF-H, etc.), microtubules (e.g., alpha-tubulin, beta-tubulin, etc.), amyloids (e.g., alpha-amyloid, beta-amyloid, etc.), actin, myosins (e.g., myosin I-XVII, etc.), titin which is the largest known protein (also known as connectin), etc.

Exemplary polysaccharides, e.g., fibrous polysaccharides, for use in the devices and methods of exemplary embodiments include, but are not limited to, chitin which is a major component of arthropod exoskeletons, hyaluronic acid which is found in extracellular space and cartilage (e.g., D-glucuronic acid which is a component of hyaluronic acid, D-N-acetylglucosamine which is a component of hyaluronic acid, etc.), etc.

Exemplary glycosaminoglycans (GAGs) for use in the devices and methods of exemplary embodiments include, but are not limited to, heparan sulfate founding extracelluar matrix, chondroitin sulfate which contributes to tendon and ligament strength, keratin sulfate which is found in extracellular matrix, etc.

In an exemplary embodiment, the polymers for use in the devices and methods of the invention may be mixtures of two or more polymers and/or two or more copolymers. In one embodiment, the polymers for use in the devices and methods of the invention may be a mixture of one or more polymers and or more copolymers. In another embodiment, the polymers for use in the devices and methods of the invention may be a mixture of one or more synthetic polymers and one or more naturally occurring polymers.

In an exemplary embodiment, the liquid material may be a polymer solution, i.e., a polymer dissolved in an appropriate solvent or solution. In this embodiment, the methods may further comprise dissolving the polymer in a solvent prior to introducing the polymer to the device and/or feeding the polymer into the device. In other embodiments, the polymer is fed into the device as a polymer melt. In an exemplary embodiment, a polymer may be heated at a temperature suitable for melting the polymer, e.g., is heated at a temperature of about 100° C. to about 300° C., 100-200° C., about 150-300° C., about 150-250° C., or about 150-200° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Exemplary temperatures intermediate to the recited temperatures are also part of the invention.

In exemplary embodiments, the plurality of micron, submicron and/or nanometer dimension fibers are contacted with agents, e.g., a plurality of living cells, e.g., muscle cells, neuronal cells, endothelial cells, and epithelial cells; biologically active agents, e.g., lipophilic peptides, lipids, nucleotides; fluorescent molecules, metals, ceramics, nanoparticles, and/or pharmaceutically active agents. In certain embodiments of the invention, the fibers contacted with living cells are cultured in an appropriate medium for a time and under conditions suitable to produce, e.g., a living tissue.

In still other embodiments, the polymer, i.e., a polymer solution, is contacted with living cells during the fabrication process such that fibers populated with cells, fibers encapsulating cells (partially or totally), and/or fibers surrounded (partially or totally) with cells are produced. The polymer may also be contacted with additional agents, such as proteins, nucleotides, lipids, drugs, pharmaceutically active agents, biocidal and/or antimicrobial agents during the fabrication process such that functional micron, submicron and/or nanometer dimension polymeric fibers are produced which contain these agents.

In other aspects, the present invention provides the fibers produced using the methods and devices of the invention, as well as tissues, membranes, filters, biological protective textiles, biosensor devices, food products, and drug delivery devices comprising the polymeric fibers of the invention.

The fibers produced according to the methods disclosed herein can be used as, for example, extracellular matrix and, together with cells, may also be used to form engineered tissue. Such tissue is useful not only for the production of prosthetic devices and regenerative medicine, but also for investigating tissue developmental biology and disease pathology, as well as in drug discovery and toxicity testing. The fibers of the invention may also be combined with other substances, such as, therapeutic agents, in order to deliver such substances to the site of application or implantation of the polymeric fibers. The polymeric fibers produced according to the methods disclosed herein may also be used to generate food products, membranes and filters.

In another aspect, the present invention provides methods for identifying a compound that modulates a tissue function. The methods include, providing a tissue produced using the devices of the invention and/or according to the methods of the invention; contacting the tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound that modulates a tissue function.

In yet another aspect, the present invention provides methods for identifying a compound useful for treating or preventing a tissue disease. The methods include, providing a tissue produced using the devices of the invention and/or according to the methods of the invention; contacting the tissue with a test compound; and determining the effect of the test compound on a tissue function in the presence and absence of the test compound, wherein a modulation of the tissue function in the presence of said test compound as compared to the tissue function in the absence of the test compound indicates that the test compound modulates a tissue function, thereby identifying a compound useful for treating or preventing a tissue disease. The tissue function may be any suitable physiological activity associate with the particular tissue type, e.g., a biomechanical activity, e.g., contractility, cell stress, cell swelling, and rigidity, or an electrophysiological activity. In one embodiment, the methods include applying a stimulus to the tissue. In another exemplary embodiment, a plurality of living tissues are contacted with a test compound simultaneously.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which:

FIG. 4A illustrates an exemplary fiber formation device before the fiber formation process in which a rotating structure is not rotating.

FIG. 4B illustrates the exemplary device of FIG. 4A during fiber formation in which the rotating structure is rotating and is in contact with a liquid material.

DETAILED DESCRIPTION OF THE INVENTION

Figure 1A:
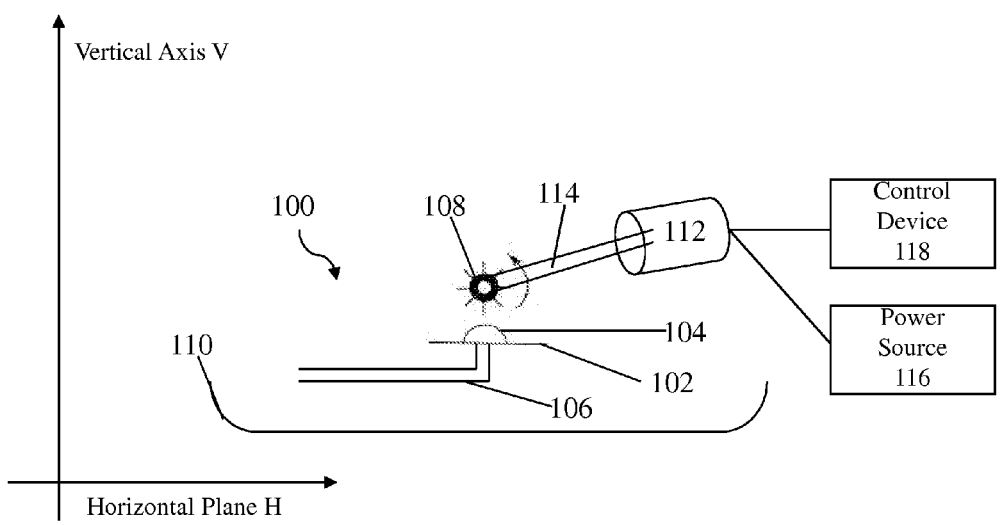
FIG. 1A illustrates an exemplary fiber formation device in which a rotating structure is in a deactivated position spaced away from a deposit of a liquid material.

The present invention provides improved fiber formation devices, systems and methods that allow for tunable polymeric fiber formation. One or more attributes of the fibers may be controlled by exemplary embodiments including, but not limited to, diameter, length, orientation, alignment, multi-fiber structure, and the like. Exemplary devices do not employ or require a nozzle for ejecting the liquid material, a spinneret or rotating reservoir containing and ejecting the liquid material, or an electrostatic voltage potential for forming the fibers. Exemplary devices are simplified as compared to devices in the art as they do not employ a spinneret or an electrostatic voltage potential. In addition, the lack of a nozzle for ejecting the liquid material in exemplary devices avoids the issue of clogging of the nozzle which results in decreased production of fibers to clean the nozzles.

The term "liquid material" refers to any suitable material in a liquid state that may be used in exemplary fiber formation devices, systems and methods to form fibers. In an exemplary embodiment, the liquid material is a polymer solution. In another exemplary embodiment, the liquid material is a polymer melt.

The term "deposit" refers to a volume of a liquid material on a stationary or moving platform. In an exemplary embodiment, a deposit of the liquid material may not be in fluid communication with a supply channel of the liquid material. In another exemplary embodiment, a deposit of the liquid material may be in fluid communication with a supply channel of the liquid material so that the deposit may be replenished on a one-time basis, intermittently or continuously during the fiber formation process. The deposit of the liquid material may be formed in contact with or in the vicinity of a fiber formation device. During fiber formation, a force, such as a shear force, may be imparted to the deposit of the liquid material. An exemplary fiber formation device that may be configured to form fibers from a deposit of a liquid material may also be used to form fibers from a droplet of a liquid material.

The term "droplet" refers to a volume of a liquid material formed substantially in the shape of a drop at an end of a supply channel for providing the liquid material. In one embodiment, a "droplet" is the quantity of liquid material that falls naturally in one rounded mass. The droplet of the liquid material may be formed in contact with or in the vicinity of a fiber formation device. During fiber formation, a force may be imparted to the droplet of the liquid material. An exemplary fiber formation device that may be configured to form fibers from a droplet of a liquid material may also be used to form fibers from a deposit of a liquid material.

The terms "fiber" and "polymeric fiber" are used herein interchangeably, and both terms refer to fibers having micron, submicron and/or nanometer dimensions. Exemplary fibers may be formed from any suitable liquid material(s).

The terms "fling" or "flinging" refer to an action, motion or movement of one or more components of an exemplary fiber formation device or method that is imparted to a liquid material deposit and that results in the creation of a micron, submicron and/or nanometer dimension fiber from the liquid material. More specifically, in a flinging action, a component of an exemplary fiber formation device makes an initial contact with a surface of a liquid material deposit in order to impart sufficient force (such as shear force) or energy to the liquid material to create a meniscus at the surface and to overcome the surface tension in order to decouple a portion of the liquid material from the contact with the component and to throw, cast or hurl the portion of the liquid material away from the contact and away from the liquid material deposit. This flinging, throwing, casting or hurling of the portion of the liquid material causes the liquid material to extend, stretch, and/or elongate and a solvent in the liquid material to evaporate and/or dry, which transforms the flung portion of the liquid material into a micron, submicron and/or nanometer dimension fiber. Exemplary components of fiber formation devices that cause or facilitate a flinging action may include, but are not limited to, one or more protrusions on a rotating structure that may contact a liquid material deposit, a jet or stream of one or more gases that may be directed to impact a liquid material deposit, and the like.

In certain embodiment of the invention, a biogenic polymer may be used in the devices of the invention to fabricate a fiber. In such embodiments, sufficient shear force is applied to the polymer to provoke shear induced protein unfolding of adherent biogenic polymer molecules, thereby exposing cryptic protein-protein binding domains and facilitate fibrillogensis in vitro.

Exemplary fibers formed using exemplary fiber formation devices, systems and methods have numerous applications and advantages. For example, exemplary fiber formation devices, systems and methods may be used to create three-dimensional tissue engineered scaffolds directly from extracellular matrix proteins without hazardous effects and interruption in protein biological activities. Exemplary fiber formation devices, systems and methods may be used to integrate living cells into these micro- and nano-scale polymeric scaffolds to generate cell-encapsulated threads which is not feasible through techniques of nanofiber fabrication known in the art. Exemplary fiber formation devices, systems and methods may be used to fabricate nanofiber assemblies from small quantities of polymer liquids. Exemplary fiber formation devices, systems and methods may be used to fabricate nanofiber assemblies from polymer melts as well as polymer solutions due to the independence of the devices and methods from solution conductivity. Exemplary fiber formation devices, systems and methods may be used to fabricate nanofibers from in situ cross-linked polymer solutions due to the high rate of nanofiber production.

Exemplary fiber formation devices of the invention may have many applications including, but not limited to, mass production of polymer or protein fibers, production of ultra-aligned fibrous scaffolds, bio-functional fibrous scaffolds for in vitro tissue engineering applications, bio-functional fibrous scaffolds for in vivo tissue engineering applications, bio-functional suture threads, ultra-strong fiber and fabric production, bio-functional protein or polymer filters, protective clothing or coverings, etc.

The fibers produced according to the methods disclosed herein can be, for example, used as an extracellular matrix and, together with cells, may also be used in forming engineered tissue. Such tissue is useful not only for the production of prosthetic devices and regenerative medicine, but also for investigating tissue developmental biology and disease pathology, as well as in drug discovery and toxicity testing. The fibers of the invention may also be combined with other substances, such as, therapeutic agents, in order to deliver such substances to the site of application or implantation of the fibers. The fibers produced according to the methods disclosed herein may also be used to generate food products, membranes and filters.

I. Exemplary Embodiments Employing One or More Rotating Structures

Exemplary embodiments provide systems, devices and methods for forming micron, submicron and/or nanometer dimension fibers using one or more rotating structures. Exemplary fibers formed by exemplary miniaturized systems, devices and methods may range in diameter from about one nanometer to about 100 microns, but are not limited to this exemplary range.

Figure 1B:
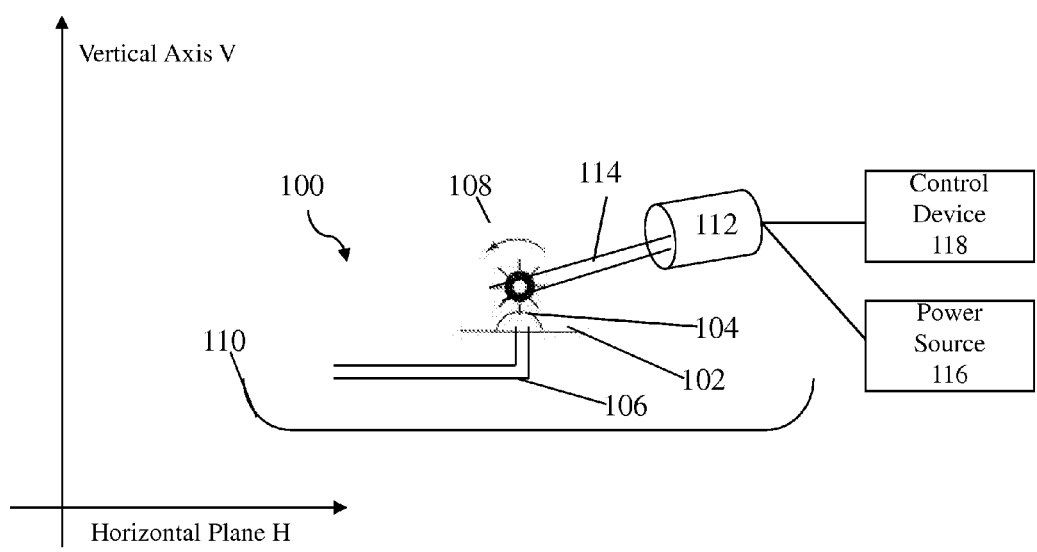
FIG. 1B illustrates the exemplary device of FIG. 1A in which the rotating structure is in an activated position that penetrates the liquid material to a desired depth.
Figure 1C:
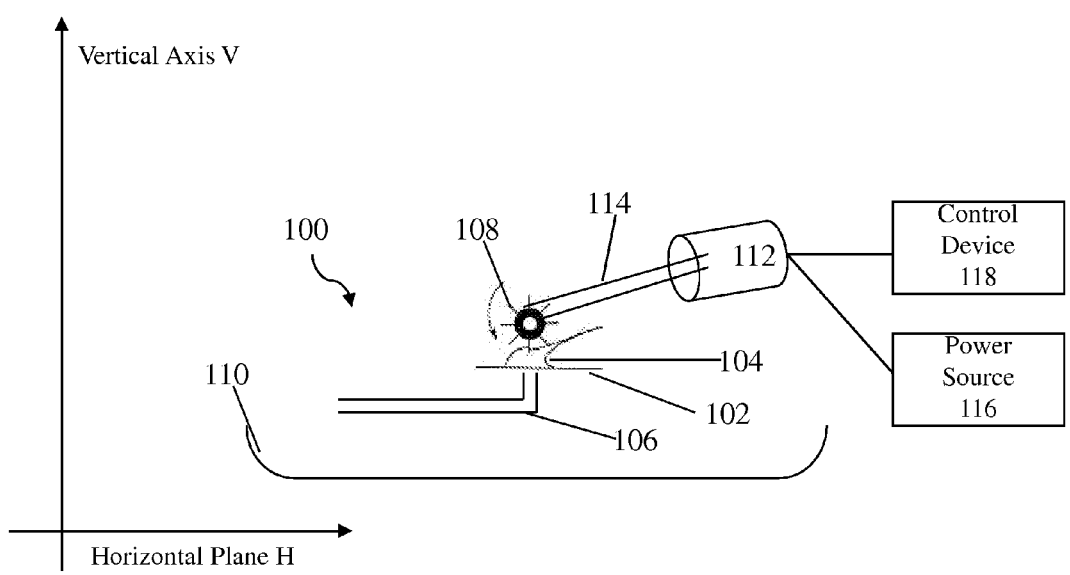
FIG. 1C illustrates the exemplary device of FIGS. 1A and 1B in which the rotating structure flings a portion of the liquid material away from the contact with the rotating structure and away from the platform to form a fiber.

FIGS. 1A-1C illustrate schematic views of an exemplary fiber formation device 100 that may employ one or more rotating structures for forming fibers. FIG. 1A illustrates the exemplary device 100 in which a rotating structure is in a deactivated position spaced away from a deposit of a liquid material. FIG. 1B illustrates the exemplary device 100 in which the rotating structure is in an activated position that penetrates the liquid material to a desired depth. FIG. 1C illustrates the exemplary device 100 in which the rotating structure flings a portion of the liquid material away from the contact with the rotating structure and away from the platform to form a fiber. The exemplary device 100 illustrated in FIGS. 1A-1C does not employ or require a nozzle for ejecting the liquid material, a spinneret or rotating reservoir containing and ejecting the liquid material, or an electrostatic voltage potential for forming the fibers. Exemplary devices are simpler than devices in the art as they do not employ a spinneret or an electrostatic voltage potential. In addition, the lack of a nozzle for ejecting the liquid material in exemplary devices avoids the issue of clogging of the nozzle.

The exemplary fiber formation device 100 may include a platform 102 for supporting a deposit 104 of a liquid material. In an exemplary embodiment, the platform 102 is stationary. In another exemplary embodiment, the platform 102 is movable and/or moving. The platform 102 may be constructed of any suitable material, e.g., a material that can withstand heat and/or that is not sensitive to chemical organic solvents. In one embodiment, the platform 102 may be formed of a plastic material, e.g., polypropylene, polyethylene, or polytetrafluoroethylene. In another embodiment, the platform 102 may be formed of a metal, e.g., aluminum, steel, stainless steel, tungsten carbide, tungsten alloys, titanium or nickel. An exemplary platform 102 may have any suitable size or geometrically shape including, but not limited to, round, rectangular, oval, and the like. The platform 102 may also be shaped in the form of any living organ, such as a heart, kidney, liver lobe(s), bladder, uterus, intestine, skeletal muscle, or lung shape, or portion thereof. The platform 102 may further be shaped as any hollow cavity, organ or tissue, such as a circular muscle structure, e.g., a sphincter or iris. These shapes allow the fibers to be deposited in the form of a living organ for the production of engineered tissue and organs, described in more detail below.

In an exemplary embodiment, the deposit 104 may be a one-time deposit. In another exemplary embodiment, the deposit 104 may be a continual or intermittently replenished deposit. The exemplary fiber formation device 100 may include a component suitable for continuously feeding the liquid material 104 onto the platform 102, such as a spout or syringe pump.

In an exemplary embodiment, an exemplary volume of the liquid material provided for fiber formation may range from about one microliter to about 100 milliliters. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

In an exemplary embodiment, the fiber formation device 100 may include one or more reservoirs (not pictured) for holding the liquid material that may be introduced onto the platform 102. The reservoir may be formed of a suitable material including, but not limited to, ceramic, metal, polymer, etc., depending on the specific applications of the device. An exemplary reservoir may have a volume ranging from about one microliter to about 100 milliliters for holding the liquid material. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

In an exemplary embodiment illustrated in FIGS. 1A-1C, the fiber formation device 100 may include a supply channel 106 for supplying the liquid material to the platform 102. In an exemplary embodiment, the supply channel 106 may provide the liquid material in the form of a deposit that is deposited on the platform 102. In an exemplary embodiment, the supply channel 106 may provide a constantly replenishing deposit on the platform 102. In an exemplary embodiment, the supply channel 106 may provide a one-time, intermittent or continual supply of the liquid material onto the platform 102 during its operation.

In another exemplary embodiment, the supply channel 106 may provide the liquid material in the form of one or more droplets that form at the tip of the supply channel 106 in the vicinity of the rotating structure 108. In an exemplary embodiment, the supply channel 106 may provide a constantly replenishing droplet. In an exemplary embodiment, the supply channel 106 may provide a one-time, intermittent or continual supply of the liquid material.

Exemplary feed rates of the liquid material provided by the supply channel 106 may range from about 0.01 milliliters per minute to about 100 milliliters per minute, although feed rates are not limited to this exemplary range. Some exemplary feed rates include, but are not limited to, about 0.01 milliliters per minute to about 1 milliliter per minute, about 1 milliliter per minute to about 20 milliliters per minute, about 20 milliliters per minute to about 40 milliliters per minute, about 40 milliliters per minute to about 60 milliliters per minute, about 60 milliliters per minute to about 80 milliliters per minute, about 80 milliliters per minute, and the like. Exemplary feed rates intermediate to the recited rates are also part of the invention.

In an exemplary embodiment, a microfluidic device including one or more microfluidic channels may be provided to supply the liquid material to the platform 102. In an exemplary embodiment, a macrofluidic device including one or more macrofluidic channels may be provided to supply the liquid material to the platform 102. In an exemplary embodiment, a microfluidic and a macrofluidic device may be provided to supply the liquid material to the platform 102.

In an exemplary embodiment, a heating device may be provided at, on or in the vicinity of the platform 102 for heating and/or melting the liquid material. Since the liquid material is not contained in a rotating reservoir, exemplary embodiments need only heat a portion of the platform (e.g., at the site of the liquid deposit) and may avoid heating a rotating element. This leads to increased efficiency in the usage of energy in the device and simplifies the design over conventional fiber formation devices. In an exemplary embodiment, a polymer delivered to the platform 102 may be heated by the heating device to form a polymer melt that may, in turn, be used to form fibers. In an exemplary embodiment, a polymer may be heated at a temperature suitable for melting the polymer, e.g., is heated at a temperature of about 100° C. to about 300° C., 100-200° C., about 150-300° C., about 150-250° C., or about 150-200° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Exemplary temperatures intermediate to the recited temperatures are also part of the invention.

In an exemplary embodiment, one or more air foils or air blades (not pictured) may be provided in the vicinity of the liquid material 104 for increasing air turbulence experienced by the flung liquid and/or fibers formed of the liquid material. In one embodiment, the formed fibers are unaligned due to the increased air flow or increased air turbulence created by the one or more air foils. In another embodiment, the formed fibers are aligned substantially along an axis or a plane due to the increased air flow or increased air turbulence created by the one or more air foils. To this end, the exemplary fiber formation device may be used in combination with an air foil as described in connection with FIGS. 13-17 of U.S. Provisional Patent Application Ser. No. 61/414,674, filed Nov. 17, 2010, the entire contents of which are incorporated herein in their entity by reference.

In an exemplary embodiment, the platform 102 of the device may include or may be provided with a conduit or hood (not pictured) for providing a desired pathway or for guiding a fiber along a desired pathway to a collection device 110, e.g., a plate, a bobbin, etc. The collection device 110 may be constructed of any suitable material, e.g., a material that can withstand heat and/or that is not sensitive to chemical organic solvents. In one embodiment, the collection device 110 may be formed of a plastic material, e.g., polypropylene, polyethylene, or polytetrafluoroethylene. In another embodiment, the collection device 110 may be formed of a metal, e.g., aluminum, steel, stainless steel, tungsten carbide, tungsten alloys, titanium or nickel. A collection device 110 may have any suitable size or geometrically shape including, but not limited to, round, rectangular, oval, and the like. The collection device 110 may also be shaped in the form of any living organ, such as a heart, kidney, liver lobe(s), bladder, uterus, intestine, skeletal muscle, or lung shape, or portion thereof. The collection device 110 may further be shaped as any hollow cavity, organ or tissue, such as a circular muscle structure, e.g., a sphincter or iris. These shapes allow the fibers to be deposited in the form of a living organ for the production of engineered tissue and organs, described in more detail below.

In an exemplary embodiment, the collection device 110 may be spaced from the platform 102 and may surround the platform 102. Although the exemplary collection device 110 illustrated in FIGS. 1A-1C is stationary, other exemplary collection devices may be moving, e.g., rotating and/or oscillating. A moving collection device 110 may be used to receive fibers in mesh, mat, woven or unwoven configurations. Exemplary configurations of fibers may enhance the mechanical properties of the collection of fibers.

In an exemplary embodiment in which the collection device 110 moves during the fiber formation process, the collection device may be coupled to a motion generator that imparts the motion to the collection device 110. The motion generator may, in turn, be coupled to a source of electrical power for supplying power to the motion generator and to a control device for controlling aspects of its motion, e.g., the type of motion (linear and/or rotational), activation/deactivation of the motion generator, timing of activation and deactivation of the motion generator, the speed of the motion, the acceleration/deceleration of the motion, and the like. An exemplary range for typical linear velocities imparted to an exemplary collection device 110 may include about 0.0001 m/s to about 4.2 m/s, but is not limited to this exemplary range. The motion of the collection device 110 may be controlled to obtain desired orientations and configurations of the fibers.

In certain embodiments, the collection device 110 may be maintained at about room temperature, e.g., about 20, 21, 22, 23, 24, 25, 26, 27, 28, 29, or about 30° C. and ambient humidity, e.g., about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90% humidity. The collection device 110 may be maintained at and the methods may be formed at any suitable temperature and humidity depending on the desired surface topography of the polymeric fibers to be fabricated. For example, increasing humidity from about 30% to about 50% results in the fabrication of porous fibers, while decreasing humidity to about 25% results in the fabrication of smooth fibers. As smooth fibers have more tensile strength than porous fibers, in one embodiment, the devices of the invention are maintained and the methods of the invention are performed in controlled humidity conditions, e.g., humidity varying by about less than about 10%. Exemplary temperatures and humidity values intermediate to the recited ranges are also part of the invention.

The exemplary fiber formation device 100 may include one or more rotating structures 108 in the vicinity of the platform 102. Exemplary speeds of rotation may range from about 100 rpm to about 500,000 rpm, although rotational speeds are not limited to this exemplary range. Sufficient rotational speeds and times for operating the devices of the invention to form a fiber may be dependent on the concentration of the material and the desired features of the formed fiber. Exemplary devices employing rotational motion may be rotated at a speed of about 1,000 rpm-50,000 rpm, about 1,000 rpm to about 40,000 rpm, about 1,000 rpm to about 20,000 rpm, about 5,000 rpm-20,000 rpm, about 5,000 rpm to about 15,000 rpm, or about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, or about 24,000 rpm. Ranges and values intermediate to the above recited ranges and values are also contemplated to be part of the invention. For example, rotating speeds of about 10,000 rpm-15,000 rpm, or 8,000 rpm-12,000 rpm are intended to be encompassed by the methods of the invention. In one embodiment, devices employing rotational motion may be rotated at a speed greater than about 1,000 rpm, greater than about 1,500 rpm, greater than about 2,000 rpm, greater than about 2,500 rpm, greater than about 3,000 rpm, greater than about 3,050 rpm, greater than about 3,100 rpm, greater than about 3,150 rpm, greater than about 3,200 rpm, greater than about 3,250 rpm, greater than about 3,300 rpm, greater than about 3,350 rpm, greater than about 3,400 rpm, greater than about 3,450 rpm, greater than about 3,500 rpm, greater than about 3,550 rpm, greater than about 3,600 rpm, greater than about 3,650 rpm, greater than about 3,700 rpm, greater than about 3,750 rpm, greater than about 3,800 rpm, greater than about 3,850 rpm, greater than about 3,900 rpm, greater than about 3,950 rpm, or greater than about 4,000 rpm.

The rotating structure 108 may be rotated to impact the liquid material for a time sufficient to form a desired fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited exemplary values are also intended to be part of this invention.

In an exemplary embodiment, one or more portions or components of the rotating structure may penetrate into the surface of the liquid material to a desired depth. Exemplary depths of penetration may range from about one nanometer to about one centimeter, but are not limited to this range. Some exemplary penetration depths include, but are not limited to, about one millimeter to about twenty milliliters, about twenty milliliters to about forty milliliters, about forty milliliters to about sixty milliliters, about sixty milliliters to about eighty milliliters, about eighty milliliters to about one hundred milliliters, about one centimeter, and the like. Exemplary penetration depths intermediate to the above-recited exemplary values are also intended to be part of this invention.

The rotating structure 108 may be configured in any suitable manner so that, upon rotation, the rotating structure 108 contacts a surface of the liquid material on platform 102 to impart sufficient force or energy to create a meniscus at the location where the rotating structure 108 contacts the surface. The force or energy imparted by the rotating structure 108 overcomes the surface tension and decouples a portion of the liquid material at the meniscus and flings the portion away from the contact with the rotating structure 108 and from the platform 102, thereby forming a micron, submicron and/or nanometer dimension fiber. The fiber may be collected on the collection device 110. In an exemplary embodiment, the direction in which the liquid material is flung may be substantially the same as the tangential direction of motion of the component of the rotating structure that contacts the liquid material. In an exemplary embodiment, the rotating structure may impart a force to the liquid material in a substantially parallel direction to the top surface of the liquid material.

In the exemplary embodiment illustrated in FIGS. 1A-1C, the rotating structure 108 may have a central core rotatable in a clockwise and/or counter-clockwise manner about a central axis of rotation R (pointing in or out of the paper on FIGS. 1A-1C). In an exemplary embodiment, the rotational axis R may be offset at substantially 90 degrees from the vertical axis V. The core may have a substantially cylindrical shape with a substantially circular cross-section having a center aligned along the axis of rotation R. The rotating structure 108 may also include one or more protrusions, e.g., in the form of blades, brushes, bristles, etc., affixed to the outer surface of the rotating core so that part of the protrusions penetrate into the surface of the liquid material. Exemplary rotating structures 108 may include any suitable number of protrusions affixed to the core including, but not limited to, one protrusion to 100,000 protrusions. Some exemplary numbers of protrusions include, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, about 50 to about 100, about 100 to about 200, about 200 to about 300, about 300 to about 400, about 400 to about 500, and the like. Exemplary numbers of protrusions intermediate to the recited exemplary numbers are also part of the invention. The protrusions may be configured on the core in any suitable arrangement including, but not limited to, a regular multi-row or multi-column arrangement, an array pattern, a circular arrangement, a random arrangement, and the like.

Each protrusion may have any suitable shape including, but not limited to, a substantially rectangular shaped protrusion, a saw shaped protrusion wherein the base of the protrusion at the core is wider than the tip farthest from the core, a cylindrical shaped protrusion, and the like. At high rotational speeds and/or in instances where broken protrusions would compromise the purity of the fibers, the saw shape may provide enhanced structural integrity to the protrusions and may prevent break-off of the protrusions during rotation.

In some exemplary embodiments, one or more aspects of the protrusions on the rotating structure 108 may be varied to control the adherence of the liquid material to the protrusions when the liquid material comes into contact with the protrusions, thereby facilitating fiber formation. Exemplary aspects that may be control or configured include, but are not limited to, the surface chemistry of the protrusions, the surface topography of the protrusions (e.g., a rougher texture), a geometry of the protrusions (e.g., a cross-sectional shape of the protrusions), and the like. In addition, configuring these aspects of the protrusions may allow controlling the geometry of the fibers that are formed, fiber width, surface features on the fibers, and the like.

Exemplary protrusions may be formed of any suitable material including, but not limited to, titanium, stainless steel (e.g., 300 and 400 alloys), aluminum (e.g., 6061, 7075), polystyrene, polypropylene, (e.g., UHMW, HDPE, LDPE), ABS, acetal (copolymer and homopolymer), nylon, polycarbonate, polyether ether ketone, polymethyl methacrylate, polysulfone, polytetrafluoroethylene, polyvinylchloride, and the like.

The fiber formation device 100 may include a motion generator 112 for rotating the rotating structure 108 about the axis of rotation R. The motion generator 112 may be used to control one or more aspects of the motion of the rotating structure 108 including, but not limited to, activating and deactivating the rotating structure, timing of the activation and deactivation of the rotating structure, the speed of the rotating structure, changing the speed of the rotating structure, the orientation of the rotational axis R of the rotating structure with reference to the liquid material 104, and the like. In an exemplary embodiment, the rotating structure 108 may be activated a single time to impart a momentary force to surface of the liquid material. In another exemplary embodiment, the rotating structure 108 may be activated and rotated in two or more separate or continuous sessions.

The rotating structure 108 may be coupled to the motion generator 112 using one or more mechanical coupling members 114, e.g., a rod, piston, etc., that reliably and efficiently transfer the motion generated by the motion generator 112 to the rotating structure 108. The motion generator 112 may be coupled to an electrical power source 116, e.g., electrical mains or one or more batteries, that supplies electrical power to power the motion generator 112. The motion generator 112 may also be coupled to a control device or mechanism 118 for controlling aspects of the motion, e.g., the type of motion (linear and/or rotational), activation/deactivation of the motion generator, timing of activation and deactivation of the motion generator, the speed of the motion, the acceleration/deceleration of the motion, and the like.

In an exemplary embodiment, any aspect of the operation of the motion generator 112 may be controlled by the control device or mechanism 118 in a real-time manner by a user as the device is being operated. In another exemplary embodiment, these aspects may also be controlled in a pre-programmed manner in which the motion generator is pre-programmed with instructions on how to control the rotating structure. Exemplary motion generators 112 include, but are not limited to, an electric motor, a pneumatic motor, a microdrive motor, a dental drill, and the like. The exemplary motion generator 112 may be coupled to one or more conduits used to conduct control instructions encoded, for example, in power signals, optical signals or in other signals, to control different aspects of the motion generator 112.

In exemplary embodiments, the spatial and hierarchical structure of the fibers formed by exemplary fiber formation devices, systems and methods may be configured by controlling one or more factors including, but not limited to, the rotational speed of the rotating structure, the concentration of the liquid material, the viscosity of the liquid material, the molecular weight of the liquid material, the volatility of the solvent of the liquid material, and the like. Exemplary embodiments may use different combinations of the exemplary motion generators to create and control desired weaves and/or alignments of the fibers.

In an exemplary embodiment, the motion generator 112 may also impart a lateral or linear motion to the rotating structure 108 to position the rotating structure 108 at a desired position relative to the liquid material 104 on the platform 102. In an exemplary embodiment, the motion generator 112 may be moved toward or away from the liquid material 104 to adjust the depth of penetration of the rotating structure 108 into the liquid material 104.

In one example, before start of the fiber formation process, the rotating structure 108 may be in a deactivated position that is spaced away from the platform 102 by a first distance. This spacing may allow a user to introduce the liquid material 104 onto the platform 102 without the rotating structure 108 obstructing access to the platform 102. After the liquid material 104 is deposited on the platform 102, the rotating structure 108 may be moved linearly by the motion generator toward the platform 102. The rotating structure 108 is then in an activated position ready for the fiber formation process, and is spaced away from the platform 102 by a smaller second distance. The linear motion of the rotating structure 108 toward the platform 102 may be stopped when the desired second distance in achieved or when the rotating structure 108 contacts the surface of the liquid material 104 to a desired depth. Fiber formation may begin when the rotating structure 108 is spaced away from the platform 102 by the second smaller spacing. In an exemplary embodiment, the rotating structure 108 may begin rotation before or during the linear movement of the rotating structure 108 to achieve its activated position. In another exemplary embodiment, the rotating structure 108 may begin rotation only after it has achieved its activated position.

FIGS. 1A-1C illustrate three exemplary stages in the operation of the exemplary fiber formation device. In FIG. 1A, the rotating structure 108 is in a deactivated position in which it is spaced from the liquid material 104 on the platform 102 by a greater first distance. The rotating structure may be rotating or non-rotating in this position. In FIG. 1B, the rotating structure 108 has been moved toward the liquid material 104 on the platform 102 to achieve its activated position. In this position, the rotating structure may contact or dip into the liquid material to a desired depth. In FIG. 1C, the rotating structure 108 is shown to fling a portion of the liquid material 104 away from the contact with the rotating structure 108 and away from the platform 102 in order to form one or more fibers.

In an exemplary embodiment, the motion generator 112 may change the rotational axis R of the rotating structure 108 relative to the surface of the liquid material 104 before and/or during fiber formation, in order to change the angle at which the rotating structure 108 imparts force to the liquid material 104. In an exemplary embodiment, the rotational axis R of the rotating structure 108 may be kept the same during a fiber formation session so that all of the fibers formed during the session are aligned in substantially the same direction. In an exemplary embodiment, the rotational axis R may be changed during a fiber formation session so that the fibers formed during the session are aligned in two or more directions. Exemplary fibers formed in two or more directions may be collected in a mesh or mat structure.

In an exemplary embodiment, before and/or during the fiber formation process, the motion generator 112 may move the rotating structure 108 closer to or farther away from the platform 102, so that the depth of penetration of the rotating structure 108 into the liquid material 104 is, respectively, increased or decreased.

In an exemplary embodiment, the motion generator 112 may not alter the orientation of the rotational axis R of the rotating structure 108 with reference to the liquid material 104, such that the device forms fibers aligned substantially along the same direction. In another exemplary embodiment, the motion generator 112 may alter one or more times the orientation of the rotational axis R of the rotating structure 108 with reference to the liquid material 104. This adjusts the direction along which the rotating structure 108 imparts force to the liquid material 104, and causes the fibers to be formed substantially along two or more directions. The fibers formed substantially along two or more directions may be configured to form a desired multi-fiber structure, e.g., meshes, mats, scaffolds, etc., having a spacing between the overlapping fibers.

In some exemplary embodiments, a gas may be introduced to the liquid material to facilitate formation of a meniscus at the liquid material which, in turn, facilitates fiber formation. Exemplary gases include, but are not limited to, air, carbon dioxide, and the like. In an exemplary embodiment, the gas may be introduced into the liquid material before the liquid material is supplied into the device, for example, by carbonation of the liquid material. In another exemplary embodiment, the fiber formation device 100 may include a gas supply channel (not pictured) for introducing a gas to the liquid material 104. In an exemplary embodiment, the gas supply channel may provide a one-time, intermittent or continual supply of the gas during the operation of the device. The gas may be introduced to the liquid material 104 before or during the time that the rotating structure 108 imparts a force to the surface of the liquid material 104 during fiber formation.

In some exemplary embodiments, one or more agents may be introduced to the liquid material 104 so that the resulting fibers contain the agent. Exemplary agents include, but are not limited to, any suitable biologically active agent, e.g., lipophilic peptides, lipids, nucleotides, proteins, drugs, pharmaceutically active agents, biocidal agents, antimicrobial agents, and the like. In an exemplary embodiment, the agent may be introduced into the liquid material before the liquid material is supplied into the device. In another exemplary embodiment, the fiber formation device may include an agent supply channel (not pictured) for introducing an agent to the liquid material during fiber formation.

Figure 29:
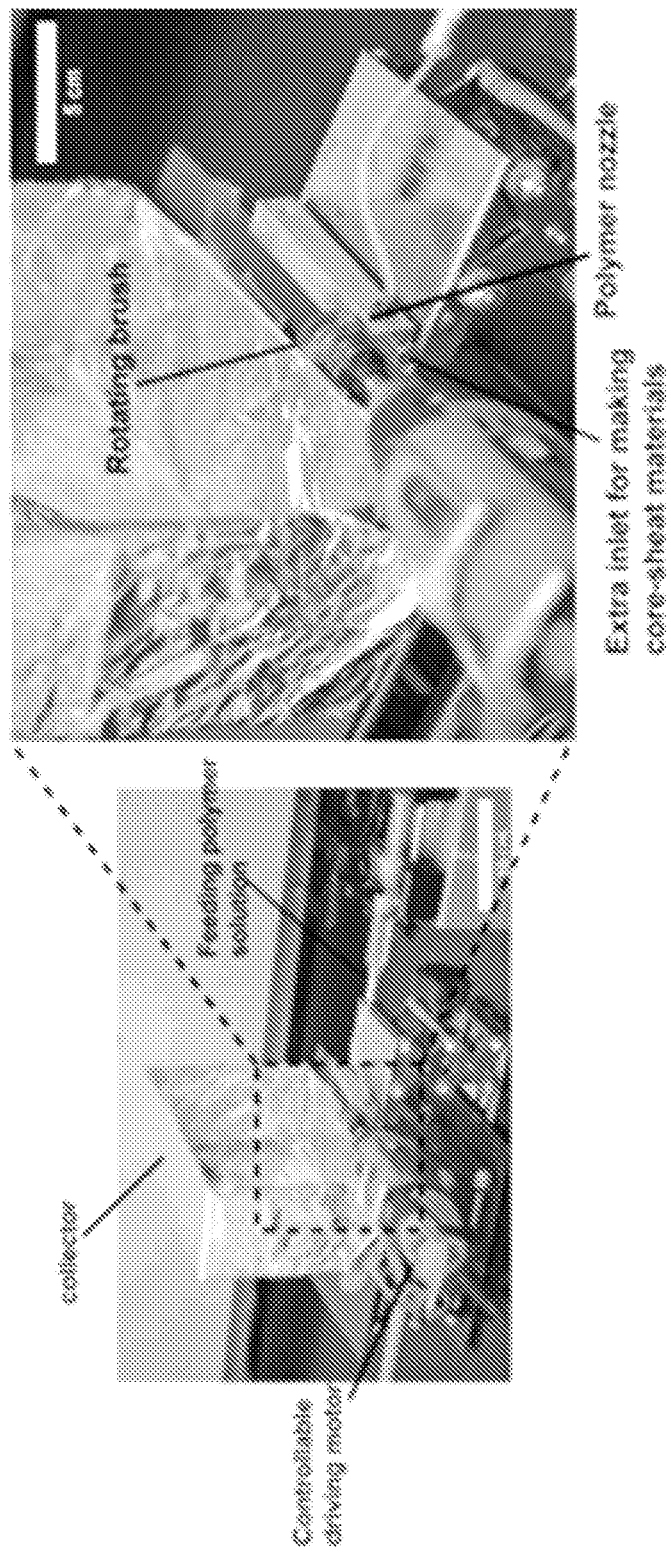
FIG. 29 illustrates an exemplary fiber formation device that employs a rotating brush to impart a force directly to a polymer solution.

FIG. 29 illustrates an exemplary fiber formation device that employs a rotating brush to impart a force directly to a polymer solution. The brush is coupled to a motion generator, e.g., a controllable driving motor, for rotating the brush. The polymer solution is supplied to a stationary platform through a polymer inlet channel that may terminate at a polymer nozzle in the vicinity of the rotating brush. In an exemplary embodiment, the polymer inlet channel may be coupled to a polymer solution supply device, e.g., a syringe pump, and may be used to provide a continuous flow of the polymer solution for formation of fibers. A collector may be provided for collecting the fibers.

In some exemplary embodiments, one or more additional fluid inlet channels may be provided in the vicinity of the rotating brush. In one exemplary embodiment, one or more gas jets may be introduced through an additional fluid inlet channel at the vicinity of the polymer nozzle. The air jets may be used to increase the shear forces experienced by the polymer solution as it is being flung by the rotating brush, thereby facilitating fiber formation. The air jets may also be used to provide double jet spinning, whereby two or more fibers may be wound together to form complex wound fibers. In another exemplary embodiment, one or more materials may be introduced in addition to the polymer solution to form core-sheath fibers.

Figure 2:
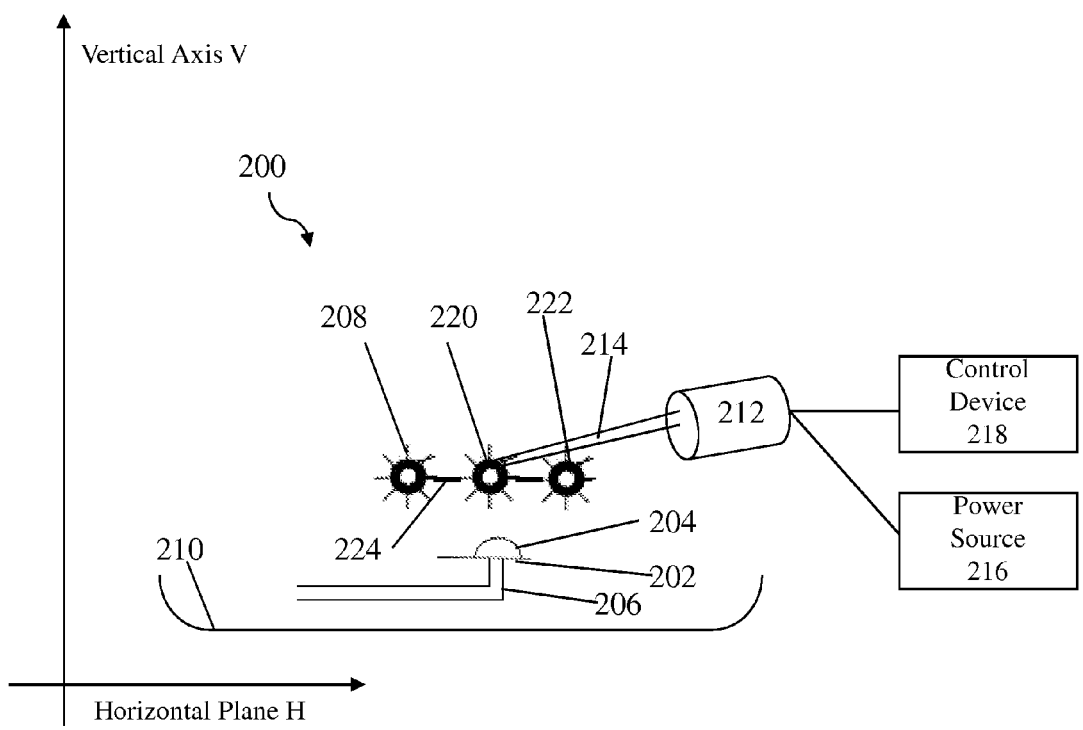
FIG. 2 illustrates an exemplary fiber formation device including a plurality of rotating structures.

FIG. 2 illustrates an exemplary fiber formation device 200 including a plurality of rotating structures 208, 220 and 222. The rotating structures may be supported in a desired configuration relative to one another using a mechanical member 224, e.g., a rod, that is coupled to a motion generator 212. In an exemplary embodiment, the rotating structures may be configured so that they are spaced out from each other along a horizontal plane and impact the liquid material 204 at different regions on its surface. This allows the device 200 to concurrently form multiple fibers as a plurality of forces are applied to the surface of the liquid material at the same time. One of ordinary skill in the art will understand that the number of rotating structures that may be used in exemplary fiber formation devices is not limited to the illustrative number shown in FIG. 2. The features 202, 204, 206, 210, 212, 214, 216 and 218 illustrated in FIG. 2 are similar to and are described in connection with features 102, 104, 106, 110, 112, 114, 116 and 118 in FIG. 1.

Figure 3A:
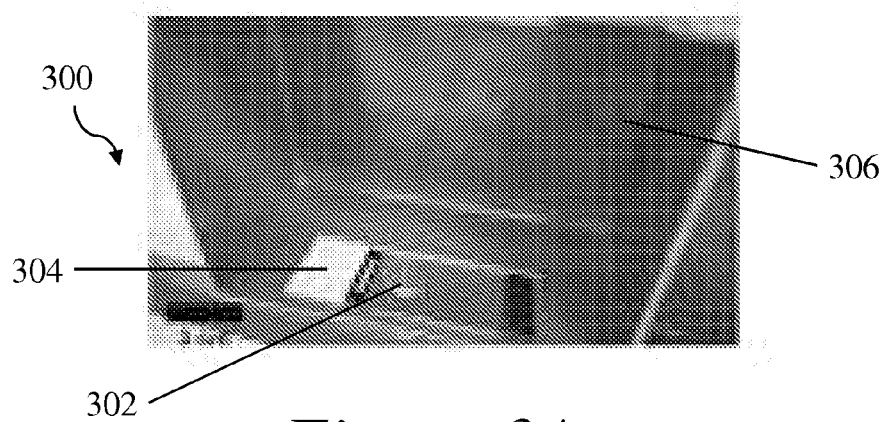
FIG. 3A illustrates an exemplary fiber formation device before the fiber formation process.
Figure 3B:
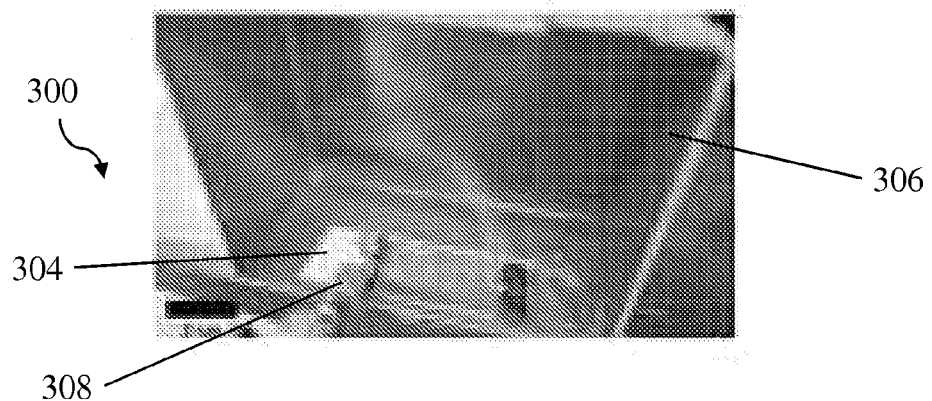
FIG. 3B illustrates the fiber formation device of FIG. 3A during the fiber formation process.
Figure 3C:
FIG. 3C illustrates the fiber formation device of FIGS. 3A and 3B after the fiber formation process.

FIGS. 3A-3C illustrate perspective views of an exemplary fiber formation device 300 that may employ one or more rotating structures for forming fibers. FIG. 3A illustrates the device 300 before the fiber formation process, in which a stationary deposit 302 is supported on a platform 304. The platform 304 may be surrounded by a collection device 306.

In an exemplary embodiment, an exemplary volume of the liquid material provided for fiber formation may range from about one microliter to about 100 milliliters. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

FIG. 3B illustrates the fiber formation device 300 during the fiber formation process, in which a rotating structure 308 is brought into contact with the liquid material 302 to fling portions of the liquid material away from the platform 304 to form fibers 310.

FIG. 3C illustrates the device 300 after the fiber formation process, in which formed fibers 310 are collected on the collection device 306.

The exemplary device 300 illustrated in FIGS. 3A-3C does not employ or require a nozzle for ejecting the liquid material, a spinneret or rotating reservoir containing and ejecting the liquid material, or an electrostatic voltage potential for forming the fibers. Exemplary devices are simpler than those devices in the art as they do not employ a spinneret or an electrostatic voltage potential. In addition, the lack of a nozzle for ejecting the liquid material in exemplary devices avoids the issue of clogging of the nozzle.

FIGS. 4A and 4B illustrate an exemplary fiber formation device 400 in which a rotating structure 402 is rotated to form fibers from a liquid material supplied to the vicinity of the rotating structure 402 using a syringe 404. In the exemplary device 400, the rotating structure 402 may be a brush having steel bristles. The bristles may have an exemplary diameter of about 12.5 mm that is rotated at speeds ranging from about 40,000 rpm to about 60,000 rpm.

The syringe 404 may be used to provide and, optionally, constantly replenish a deposit or droplet of the liquid material in contact with the rotating bristles of the rotating structure 402. In an exemplary embodiment, an exemplary volume of the liquid material provided for fiber formation may range from about one microliter to about 100 milliliters. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

FIG. 4A illustrates the exemplary device 400 before fiber formation in which the rotating structure 402 is not rotating. FIG. 4B illustrates the exemplary device 400 during fiber formation in which the rotating structure 402 is rotating and is in contact with a deposit or a droplet of liquid material supplied by the syringe 404. The rotation of the rotating structure 402 causes formation of one or more fibers 406 from the liquid material. In an exemplary embodiment, the fibers 406 may be collected on one or more collection devices (not pictured).

Figure 5:
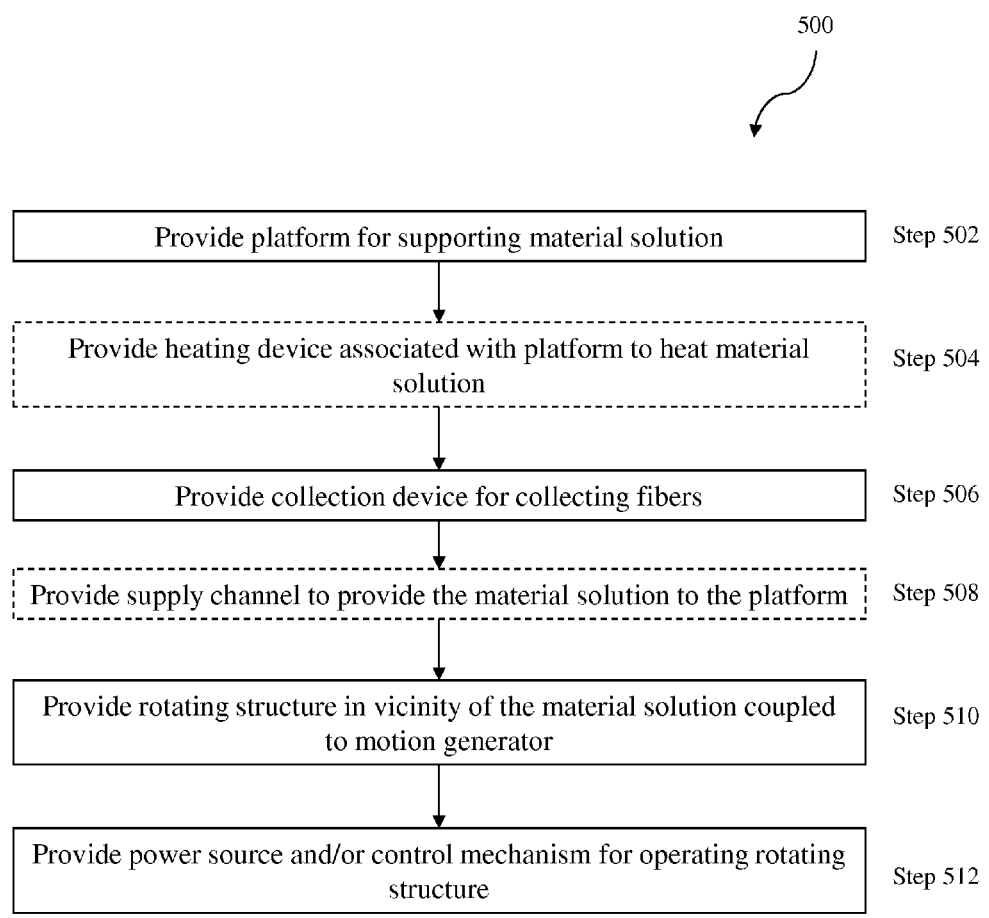
FIG. 5 is a flowchart illustrating an exemplary method for forming or manufacturing an exemplary fiber formation device that employs one or more rotating structures for forming micron, submicron and/or nanometer dimension fibers.

FIG. 5 is a flowchart illustrating an exemplary method 500 for forming or manufacturing an exemplary fiber formation device that employs one or more rotating structures for forming micron, submicron and/or nanometer dimension fibers.

In step 502, one or more platforms are provided for supporting a liquid material. In an exemplary embodiment, the platform is stationary and holds a stationary deposit of the liquid material. In another exemplary embodiment, the platform is movable or moving.

In step 504, optionally, a heating device may be provided associated with the platform to heat and/or melt the liquid material. In an exemplary embodiment, the heating device may be used to melt a polymer and to form fibers from a polymer melt.

In step 506, one or more collection devices are provided for collecting fibers in the vicinity of the platform. In an exemplary embodiment, the collection device is stationary. In another exemplary embodiment, the collection device is movable or moving.

In step 508, optionally, one or more supply channels are provided in the vicinity of the platform for introduction of the liquid material to the platform. The liquid material may be provided once before the fiber formation process or periodically or continually during the fiber formation process.

In step 510, one or more rotating structures are provided in the vicinity of the liquid material for forming fibers. The rotating structures are coupled to one or more motion generators for imparting a rotational motion to the rotating structures.

In step 512, one or more power sources and/or control mechanisms are coupled to the motion generator to respectively power and operate the motion generator. The power source and control mechanism may be provided integrally with or separately from the motion generator. The power sources, e.g., one or more batteries, may provide electrical energy for controlling the motion generator. The control mechanism may be used to start, stop and alter the motion of the motion generator for a fiber formation session, e.g., activation of the rotating structures, the rotational speed of the rotating structures, and the like. The control mechanism may include a processor that may be used to pre-program the operation of the motion generator.

Figure 6:
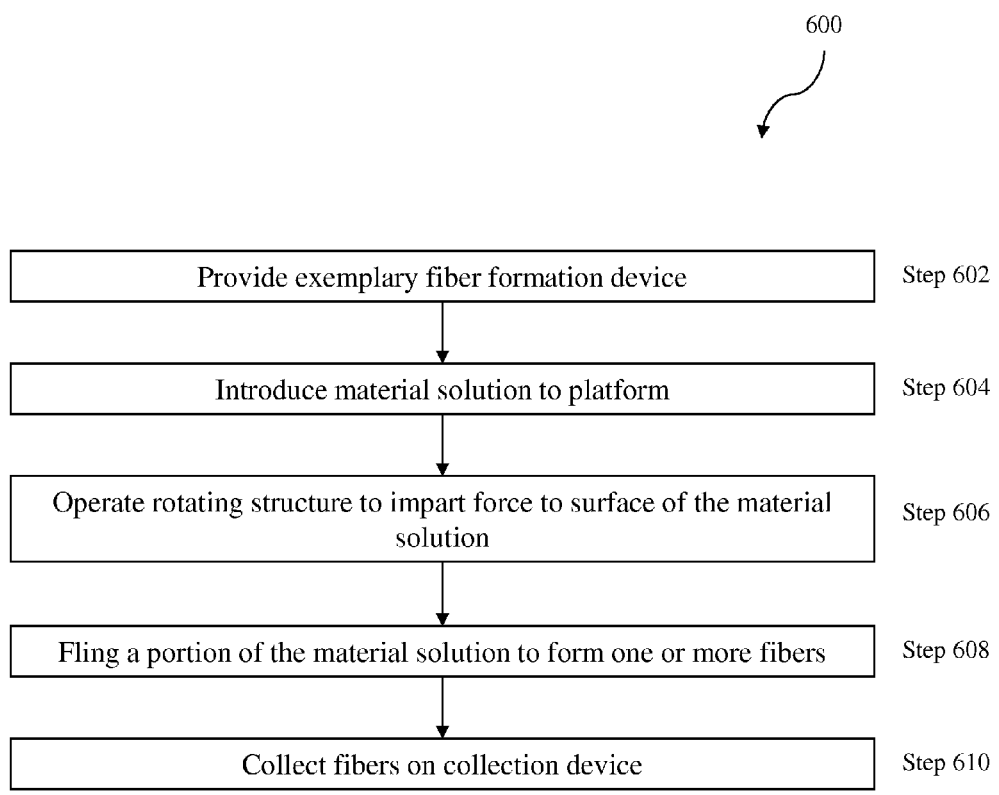
FIG. 6 is a flowchart illustrating an exemplary method for using an exemplary fiber formation device that employs one or more rotating structures to form micron, submicron and/or nanometer dimension fibers.

FIG. 6 is a flowchart illustrating an exemplary method 600 for using an exemplary fiber formation device that employs one or more rotating structures to form micron, submicron and/or nanometer dimension fibers.

In step 602, an exemplary fiber formation device is provided, for example, in accordance with method 500 illustrated in FIG. 5.

In step 604, a liquid material is introduced to the platform, for example, through one or more supply channels provided in the vicinity of the platform. The liquid material may be introduced to the platform one time, two or more times, continuously or periodically. The volume and flow rate of the liquid material introduced to the platform may be kept constant or altered based on the requirements of fiber formation.

In step 606, the one or more rotating structures may be operated in a desired manner (e.g., at desired times, a desired speed, a desired angle of impact, etc.) to impart a force to the surface of the liquid material. The force may be imparted one time, two or more times, continuously or periodically before and/or during the fiber formation process. Optionally, the rotating structure may be moved toward or away from the liquid material to achieve a desired depth of penetration of the surface.

In step 608, a portion of the liquid material is flung by the force of the rotating structure away from the deposit of the liquid material and away from the contact with the rotating structures. Without wishing to be bound by theory, the material is extended and stretched into one or more fibers due to air drag, jet necking and evaporation of the solvent in the liquid material.

In step 610, the resulting fibers are collected on one or more collection devices that may be stationary or moving.

Figure 30:
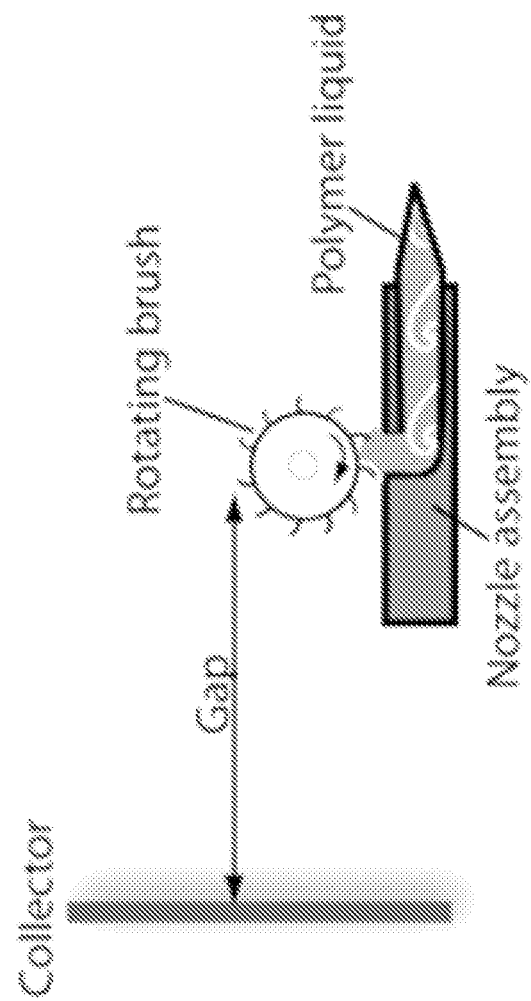
FIG. 30 illustrates an exemplary fiber formation device and exemplary parameters that may be varied during the fiber forming process.

FIG. 30 is a schematic of an exemplary fiber forming device showing exemplary parameters that may be varied for fiber formation, which include, for example, the rotating brush speed, polymer flow rate, solvent volatility, polymer concentration, e.g., viscosity of the polymer solution or polymer melt, gap distance between the rotating brush and the collector, nozzle diameter, brush type and stiffness.

II. Exemplary Rotating Structures and Protrusions

Exemplary embodiments provide one or more rotating structures with an outer surface including one or more exemplary protrusions for forming micron, submicron and/or nanometer dimension fibers. Exemplary embodiments also provide one or more protrusions suitable for use with exemplary rotating structures for forming micron, submicron and/or nanometer dimension fibers. Exemplary embodiments further provide fiber formation devices including one or more rotating structures, with each rotating structure including one or more protrusions.

In some exemplary embodiments, a rotating structure may include one or more protrusions affixed to the outer surface of the rotating structure. In some exemplary embodiments, a rotating structure may include two or more of the same type of protrusion, e.g., protrusions having the same shape and size. In some other exemplary embodiments, a rotating structure may include two or more of different types of protrusions, e.g., protrusions having different shapes and/or different sizes. Exemplary protrusions may penetrate a surface of a liquid material to a desired penetration depth. Exemplary depths of penetration may range from about one nanometer to about one centimeter, but are not limited to this range. Some exemplary penetration depths include, but are not limited to, about one millimeter to about twenty milliliters, about twenty milliliters to about forty milliliters, about forty milliliters to about sixty milliliters, about sixty milliliters to about eighty milliliters, about eighty milliliters to about one hundred milliliters, about one centimeter, and the like. Exemplary penetration depths intermediate to the above-recited exemplary values are also intended to be part of this invention.

Each protrusion may have any suitable shape including, but not limited to, a substantially rectangular shaped protrusion, a saw shaped protrusion wherein the base of the protrusion at the core is wider than the tip farthest from the core, and the like. At high rotational speeds and/or in instances where broken protrusions would compromise the purity of the fibers, the saw shape may provide enhanced structural integrity to the protrusions and may prevent break-off of the protrusions during rotation.

Each protrusion may have any suitable height (taken perpendicular to the rotational axis R along the protrusion from the base to the tip of the protrusion, represented as H) including, but not limited to, about one nanometer to about ten centimeters. Some exemplary heights may include, but are not limited to, 0.1 cm, 0.2 cm, 0.3 cm, 0.4 cm, 0.5 cm, 0.6 cm, 0.7 cm, 0.8 cm, 0.9 cm, one cm, two cm, three cm, four cm, five cm, six cm, seven cm, eight cm, nine cm, ten cm, and the like. Exemplary heights intermediate to the above-recited exemplary values are also intended to be part of this invention.

Each protrusion may have any suitable length (taken along the rotational axis R, represented as L) including, but not limited to, about one nanometer to about fifty centimeters. Some exemplary lengths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary lengths intermediate to the above-recited exemplary values are also intended to be part of this invention.

Each protrusion may have any suitable width (taken as the thickness of the protrusion) including, but not limited to, about one nanometer to about five centimeters. Some exemplary widths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary widths intermediate to the above-recited exemplary values are also intended to be part of this invention.

In an exemplary embodiment in which a protrusion has a substantially conical shape in which the circular face of the cone contacts a rotating structure, the circular face of the protrusion may have an exemplary diameter ranging from about 1 micrometer to about 50 centimeters. Some exemplary diameters may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary diameters intermediate to the above-recited exemplary values are also intended to be part of this invention.

In an exemplary embodiment in which a rectangular face of a protrusion contacts a rotating structure, the rectangular face may have an exemplary length and/or width ranging from about 1 micrometer to about 50 centimeters. Some exemplary lengths and/or widths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary lengths and/or widths intermediate to the above-recited exemplary values are also intended to be part of this invention.

In exemplary embodiments, the aspect ratio of the height to the width or the height to the length of an exemplary protrusion may range from about 1:1 to about 100:1. Some exemplary aspect ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary aspect ratios intermediate to the above-recited exemplary values are also intended to be part of this invention.

Exemplary protrusions may be formed of any suitable material including, but not limited to, titanium, stainless steel (e.g., 300 and 400 alloys), aluminum (e.g., 6061, 7075), polystyrene, polypropylene, (e.g., UHMW, HDPE, LDPE), ABS, acetal (copolymer and homopolymer), nylon, polycarbonate, polyether ether ketone, polymethyl methacrylate, polysulfone, polytetrafluoroethylene, polyvinylchloride, and the like.

Some exemplary protrusions are described herein with reference to FIGS. 7-18. Exemplary protrusions are, however, not limited to the exemplary embodiments illustrated in FIGS. 7-18. The exemplary protrusions and rotating structures illustrated in FIGS. 7-18 are not drawn to scale.

Figure 7:
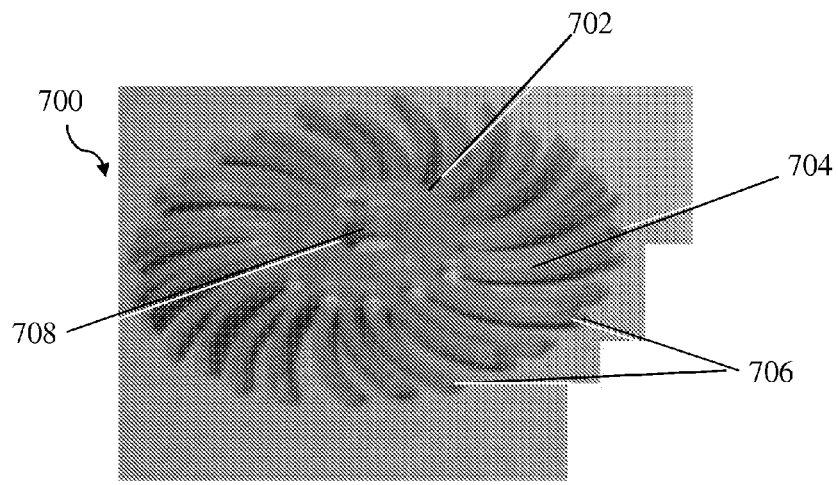
FIG. 7 illustrates an exemplary rotating structure that includes a central core that supports a plurality of protrusions.

FIG. 7 illustrates an exemplary rotating structure 700 that includes a central core 702 that supports a plurality of protrusions 704 on the outer surface of the core 702. In the exemplary embodiment illustrated in FIG. 7, the central core 702 may be configured as a substantially circular ring structure. The outer periphery of the central core 702 may be provided with the plurality of protrusions 704 that extend radially outwardly from the ring structure. In an exemplary embodiment, each protrusion 704 may have a substantially elongated cylindrical structure with a cross-section that is substantially circular in shape. In another exemplary embodiment, each protrusion 704 may have a substantially elongated box-shaped structure with a cross-section that is substantially square or rectangular in shape. In an exemplary embodiment, the protrusions 704 may be formed integrally with the central core 702. In another exemplary embodiment, the protrusions 704 may be formed separately from the central core 702 and may be coupled to the central core 702.

In the exemplary embodiment illustrated in FIG. 7, each protrusion 704 may be an elongated and curved structure that has a length substantially greater than its thickness or width. In an exemplary embodiment, the length of the structure may be greater than the thickness or the width by factors ranging from about two to about fifty (e.g., two, three, four, five, six, seven, eight, nine, ten, eleven, twelve, thirteen, fourteen, fifteen, sixteen, seventeen, eighteen, nineteen, twenty, and the like).

Each protrusion 704 may be curved along the length of the protrusion 704 so that the protrusion curves somewhat in a clockwise or anticlockwise direction from the base of the protrusion attached at the central core 702 to the tip 706 of the protrusion. In this configuration, the tips of the protrusions 704 point along a direction that is at an angle to and away from the radial direction. In operation, the rotating structure 700 may be rotated either in a clockwise direction or an anticlockwise direction so that the rotational direction at the tips 706 falls along the direction in which the terminal ends of the protrusions 704 are pointed. In an exemplary embodiment, all of the protrusions 704 on the central core 702 may be curved either in a clockwise direction or an anticlockwise direction so that the protrusions may be accommodated on the central core 702.

In an exemplary embodiment, the central core 702 may include a central void or space 708 to accommodate a rod member (not pictured). The rod member may be coupled to and support the central core 702 and may extend away from the liquid material in the distal direction. The rod member may, in turn, be coupled to a motion generator (not pictured) that may impart a rotational motion to the rod member, which may cause the core 702 to rotate as well. This, in turn, causes the protrusions 704—that penetrate a liquid material—to rotate while in contact with the liquid material, which causes the protrusions 702 to fling portions of the liquid material to form micron, submicron and/or nanometer dimension fibers.

Figure 8:
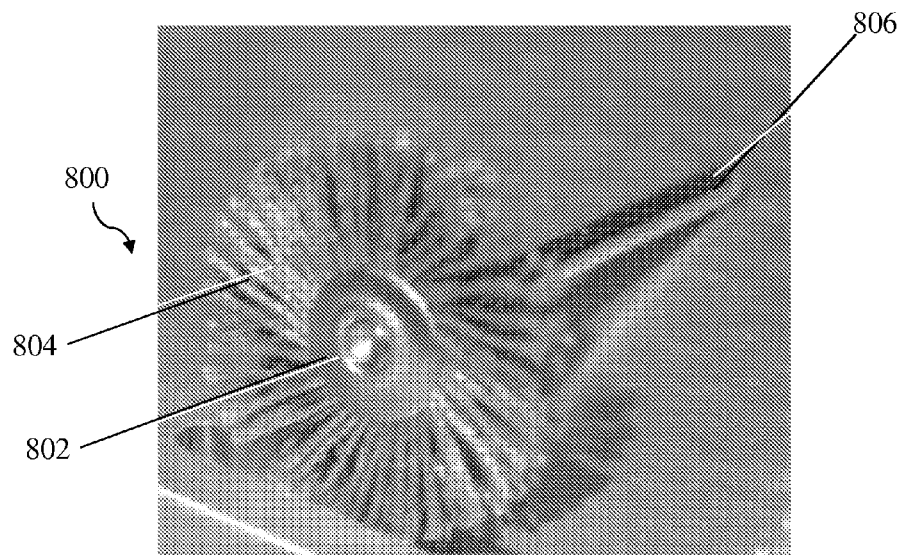
FIG. 8 illustrates another exemplary rotating structure that includes a central core that supports a plurality of protrusions.

FIG. 8 illustrates another exemplary rotating structure 800 that includes a central core 802 that supports a plurality of protrusions 804 on the outer surface of the core 802. In an exemplary embodiment, the core 802 may be configured as one or more ring structures. The outer periphery of the ring structure may be provided with a plurality of protrusions 804 that extend radially outwardly from the ring structure. In an exemplary embodiment, the ring structure may include a pair of ring structures that accommodate and hold ends of the protrusions sandwiched between the ring structures. In the exemplary embodiment illustrated in FIG. 8, the protrusions 804 may be filamentary brush bristles. Exemplary brush bristles may be formed of any suitable material including, but not limited to, natural fibers, synthetic fibers, metal wires (e.g., steel, aluminum, etc.), synthetic resin material including a polyamide, a polyolefin such as polyethylene or polypropylene, a vinylidene halide such as polyvinylidene chloride or polyvinylidene fluoride, or a polyester such as polyethylene terephthalate or polybutylene terephthalate, and the like.

The center of the core 802 may be coupled to and supported by a rod member 806 that extends away from the liquid material in the distal direction. The rod member 806 may, in turn, be coupled to a motion generator (not pictured) that may impart a rotational motion to the rod member 806, which may cause the core 802 to rotate as well. This, in turn, causes the protrusions 804—that penetrate a liquid material—to rotate while in contact with the liquid material, which causes the protrusions 802 to fling portions of the liquid material to form micron, submicron and/or nanometer dimension fibers.

Figure 9A:
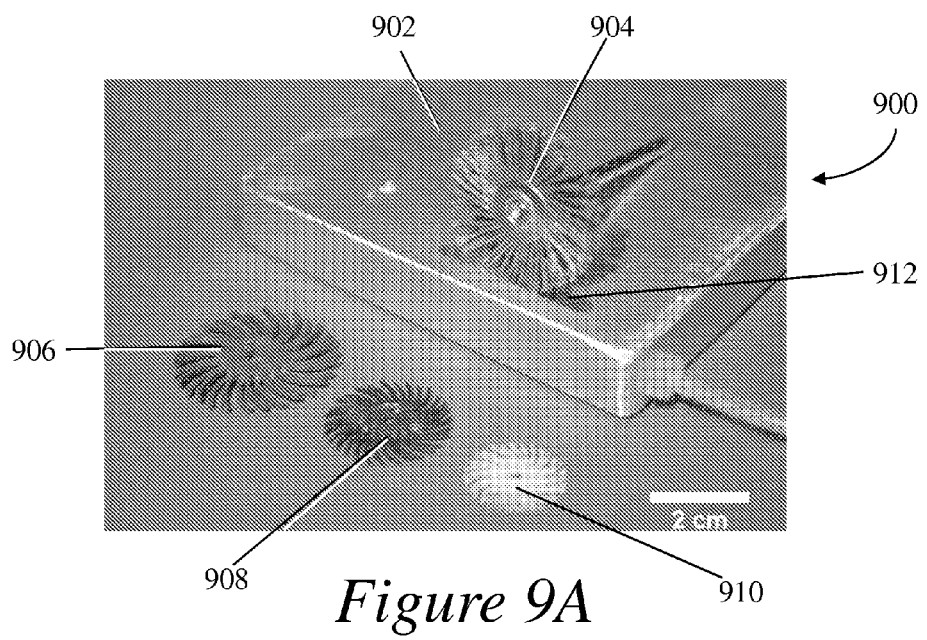
FIGS. 9A and 9B illustrate perspective views of an exemplary fiber formation device including a platform and a rotating structure resting on a platform.
Figure 9B:
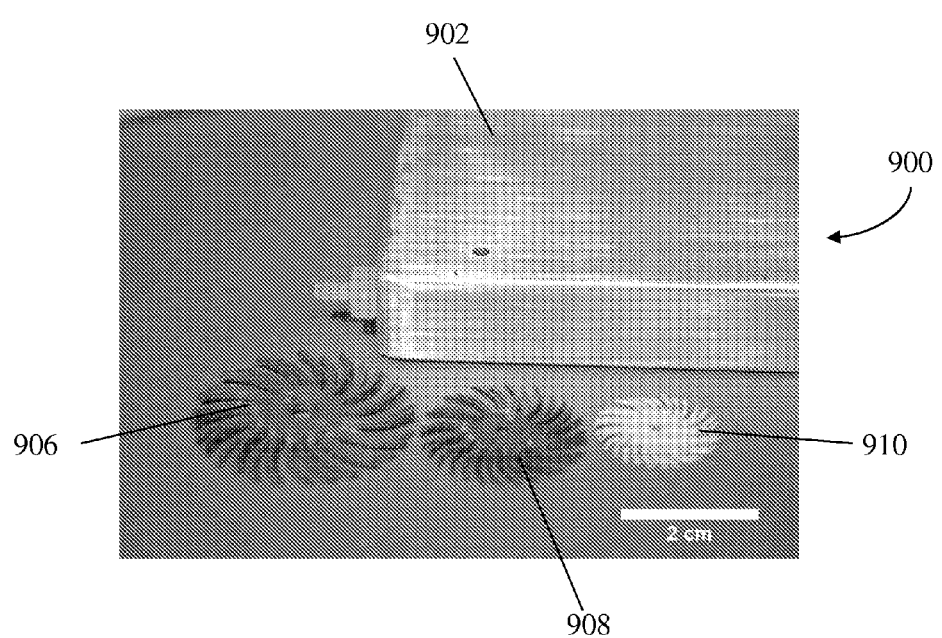

FIGS. 9A and 9B illustrate perspective views of an exemplary fiber formation device 900 including a platform 902 and a rotating structure 904 resting on a platform 902. The exemplary rotating structure 904 may be the exemplary structure 800 illustrated in and described in connection with FIG. 8. In other exemplary embodiments, differently configured rotating structures 906, 908 and 910 may be used in the device 900. The rotating structures 906, 908 and 910 are similar to and are described in connection with exemplary rotating structures 700 of FIG. 7. The rotating structures 906, 908 and 910 may be have different sizes and colors, as illustrated in FIGS. 9A and 9B.

In an exemplary embodiment, the platform 902 may include a depressed region or slit 912 for accommodating the liquid material. During operation, the protrusions on the rotating structure 904 may be placed in the vicinity of the slit 912 or in the slit 912 in order penetrate the surface of the liquid material during the fiber formation process.

Figure 10:
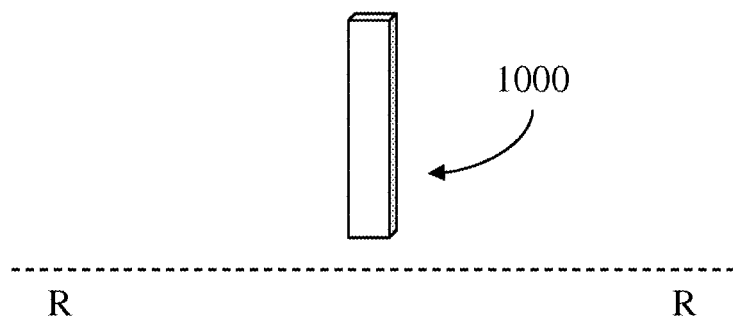
FIG. 10 illustrates an exemplary protrusion that is configured substantially as a rectangular blade.

FIG. 10 illustrates an exemplary protrusion 1000 that is configured substantially as a rectangular blade. The protrusion 1000 may have a substantially box-shaped structure with six rectangular faces and rectangular cross-sections taken along planes parallel to the faces. In an exemplary embodiment, the faces of the protrusion 1000 may be identical in shape and size. In another exemplary embodiment, the protrusion 1000 may include a set of two parallel faces that are larger in area than the other two sets of faces. That is, an exemplary protrusion 1000 may be configured as a blade having a thin edge.

In exemplary embodiments, one or more exemplary protrusions 1000 may be affixed to an outer surface of a rotating structure 1006 configured to rotate about a rotational axis R. In this exemplary configuration, one or more protrusions 1000 may be affixed to the outer surface of the rotating structure 1006 to extend radially outwardly from the outer surface of the rotational structure 1006.

In an exemplary embodiment, a face of the protrusion 1000 that extends along the rotational axis R and is disposed in contact with the outer surface of the rotating structure 1006 may have a substantially smaller area than a face of the protrusion 1000 that extends along the length of the rotating structure 1006 and extends radially outwardly from the rotating structure 1006. In an exemplary embodiment, the ratio between the area of a face of the protrusion 1000 that extends radially outwardly along the length of the rotating structure 1006 to the area of a face that is disposed in contact with the outer surface of the rotating structure 1006 may be range from about 1:1 to about 100:1. Some exemplary ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary ratios intermediate to the above-recited exemplary values are also intended to be part of this invention.

Figure 11A:
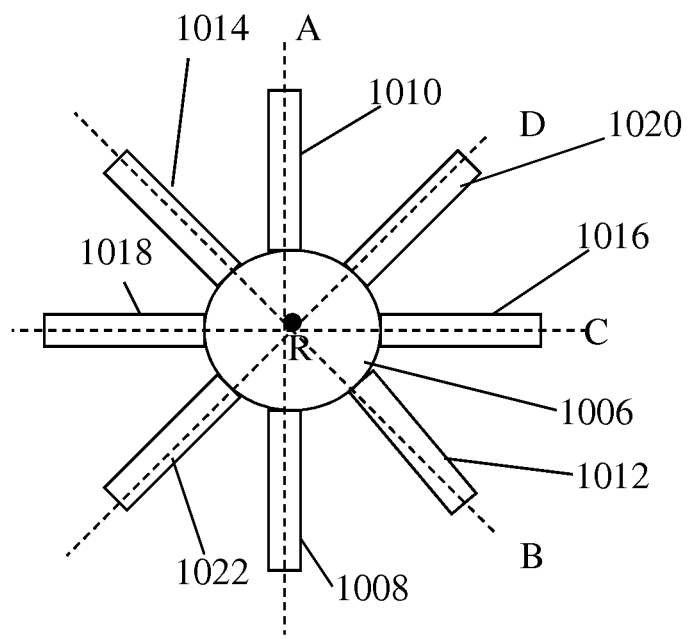
FIG. 11A illustrates a sectional view of an exemplary rotating structure taken along a plane orthogonal to the rotational axis of the rotating structure.
Figure 11B:
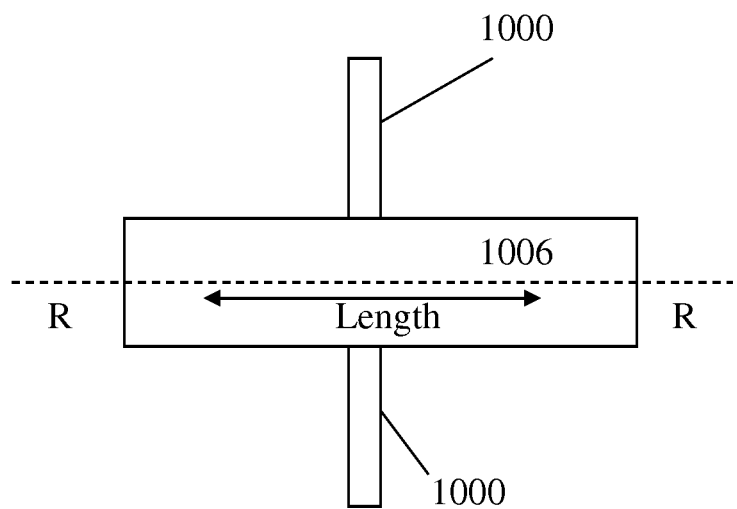
FIG. 11B illustrates a sectional view of the exemplary rotating structure of FIG. 11A taken along a plane extending through the rotational axis.

FIGS. 11A and 11B illustrate an exemplary configuration of two or more protrusions 1000 of the type illustrated in FIG. 10 on an outer surface of a rotating structure 1006. FIG. 11A illustrates a sectional view of an exemplary rotating structure 1006 taken along a plane orthogonal to the rotational axis R of the rotating structure 1006. FIG. 11B illustrates a sectional view of the exemplary rotating structure 1006 of FIG. 11A taken along a plane extending through the rotational axis R. In this exemplary configuration illustrated in FIGS. 11A and 11B, two or more protrusions 1000 may be spaced from each other along two or more different planes extending along and through the rotational axis R so that they are spaced from each other along the cross-sectional periphery of the rotating structure 1006. For example, protrusions 1008 and 1010 may extend radially outwardly from the surface of the rotating structure along plane A, protrusions 1012 and 1014 may extend radially outwardly from the surface of the rotating structure along plane B, protrusions 1016 and 1018 may extend radially outwardly from the surface of the rotating structure along plane C, and protrusions 1020 and 1022 may extend radially outwardly from the surface of the rotating structure along plane D.

Figure 12A:
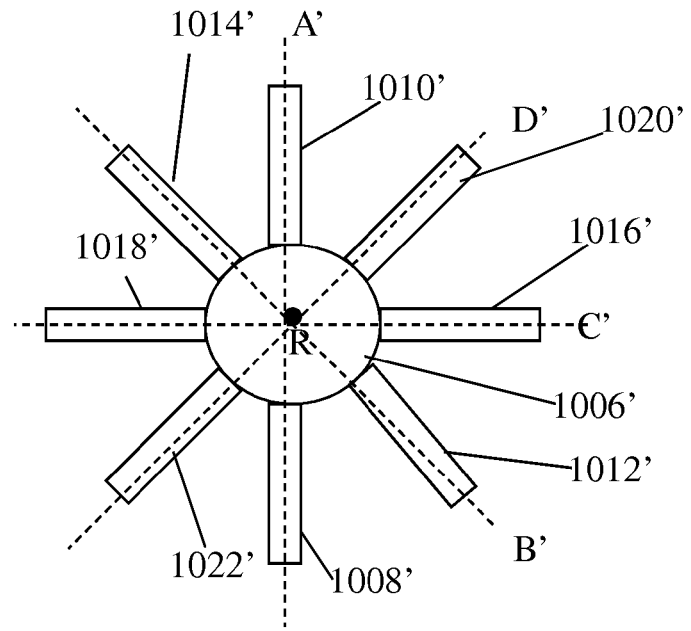
FIG. 12A illustrates a sectional view of an exemplary rotating structure taken along a plane orthogonal to the rotational axis of the rotating structure.
Figure 12B:
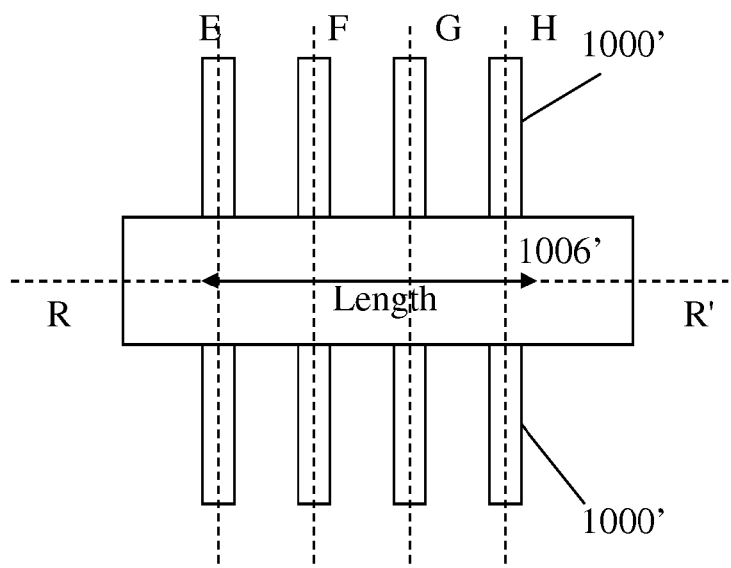
FIG. 12B illustrates a sectional view of the exemplary rotating structure of FIG. 12A taken along a plane extending through the rotational axis.

FIGS. 12A and 12B illustrate an exemplary configuration of two or more protrusions 1000' of the type illustrated in FIG. 10 on an outer surface of a rotating structure 1006'. FIG. 12A illustrates a sectional view of an exemplary rotating structure 1006' taken along a plane orthogonal to the rotational axis R of the rotating structure 1006'. FIG. 12B illustrates a sectional view of the exemplary rotating structure 1006' of FIG. 12A taken along a plane extending through the rotational axis R. In this exemplary configuration illustrated in FIGS. 12A and 12B, two or more protrusions 1000' may be spaced from each other along two or more different planes extending through and along the rotational axis R so that they are spaced from each other along the cross-sectional periphery of the rotating structure 1006'. For example, protrusions 1008' and 1010' may extend radially outwardly from the surface of the rotating structure along plane A', protrusions 1012' and 1014' may extend radially outwardly from the surface of the rotating structure along plane B', protrusions 1016' and 1018' may extend radially outwardly from the surface of the rotating structure along plane C', and protrusions 1020' and 1022' may extend radially outwardly from the surface of the rotating structure along plane D'.

In addition, in the exemplary embodiment illustrated in FIGS. 12A and 12B, two or more protrusions 1000' may be spaced from each other along two or more different planes (e.g., planes E, F, G and H) extending perpendicular to the rotational axis R so that they are spaced along the length of the central core of the rotating structure 1006'.

Figure 13:
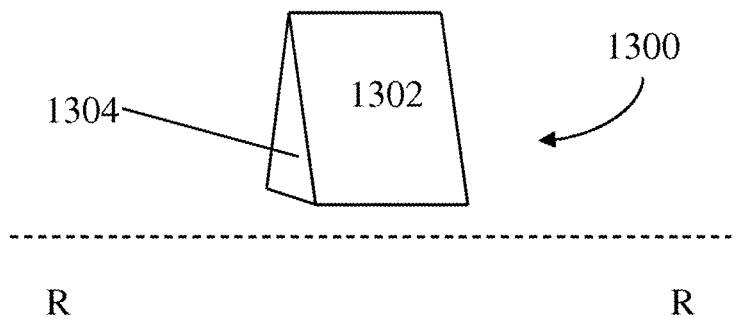
FIG. 13 illustrates an exemplary protrusion that is configured substantially as a saw-shaped blade in which the pointed edge of the saw shape penetrates into a liquid material during the fiber formation process.

FIG. 13 illustrates an exemplary protrusion 1300 that is configured substantially as a saw-shaped blade in which the pointed edge of the saw shape penetrates into a liquid material during the fiber formation process. In exemplary embodiments, one or more exemplary protrusions 1300 may be affixed to an outer surface of a rotating structure 1306 configured to rotate about a rotational axis R. In this exemplary configuration, one or more protrusions 1300 may be affixed to the outer surface of the rotating structure 1306 to extend radially outwardly from the outer surface of the rotational structure 1306.

The protrusion 1300 may include a rectangular face configured to contact an outer surface of a rotating structure 1306 and to extend along its rotational axis R. The protrusion 1300 may include two inclined rectangular faces (e.g., face 1302), and two triangular faces (e.g., face 1304) that extend substantially orthogonally to the face in contact with the rotating structure 1306. Face 1302 of the protrusion 1300 may extend radially outwardly from the rotating structure 1306 along the rotational axis R. Face 1304 of the protrusion 1300 may extend radially outwardly from the rotating structure 1306 substantially orthogonally to the rotational axis R.

In an exemplary embodiment, a face of the protrusion 1300 that extends along the rotational axis R and is disposed in contact with the outer surface of the rotating structure 1306 may have a substantially smaller area than face 1304 of the protrusion 1300 that extends radially outwardly from the rotating structure 1306 along the rotational axis R. In an exemplary embodiment, the ratio between the area of face 1304 to the area of the face that extends along the rotational axis R and is disposed in contact with the outer surface of the rotating structure 1306 that extends radially outwardly along the length of the rotating structure 1306 may range from about 1:1 to about 100:1. Some exemplary ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary ratios intermediate to the above-recited exemplary values are also intended to be part of this invention.

In an exemplary embodiment, a face of the protrusion 1300 that extends along the rotational axis R and is disposed in contact with the outer surface of the rotating structure 1306 may have a substantially smaller area than face 1302 of the protrusion 1300 that extends radially outwardly from the rotating structure 1306 substantially orthogonally to the rotational axis R. In an exemplary embodiment, the ratio between the area of face 1302 to the area of face 1304 may range from about 1:1 to about 100:1. Some exemplary ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary ratios intermediate to the above-recited exemplary values are also intended to be part of this invention.

Figure 14A:
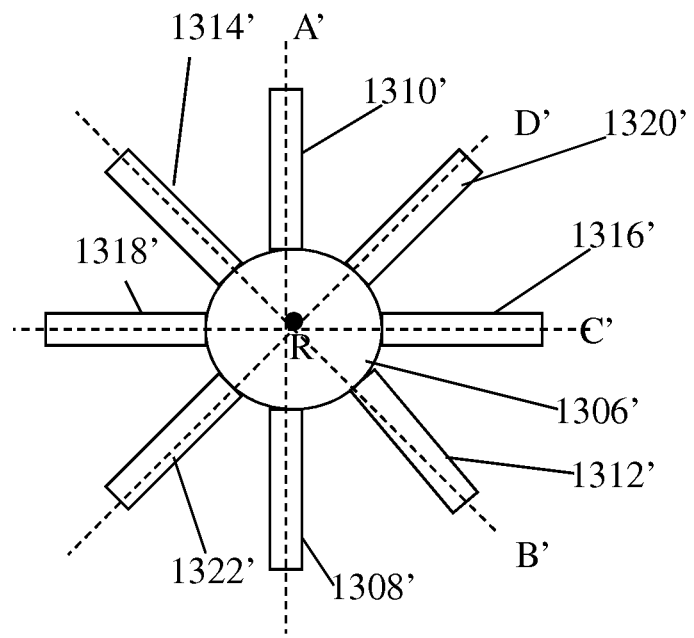
FIG. 14A illustrates a sectional view of an exemplary rotating structure taken along a plane orthogonal to the rotational axis of the rotating structure.
Figure 14B:
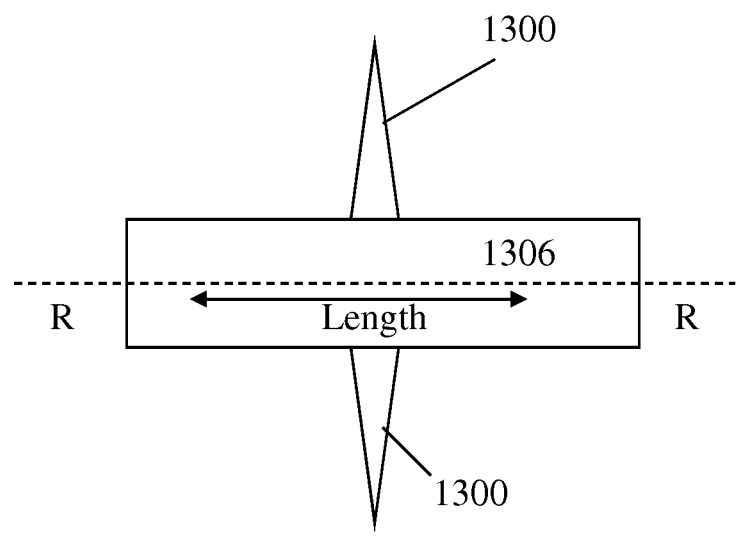
FIG. 14B illustrates a sectional view of the exemplary rotating structure of FIG. 14A taken along a plane extending through the rotational axis.

FIGS. 14A and 14B illustrate an exemplary configuration of two or more protrusions 1300 of the type illustrated in FIG. 13 on an outer surface of a rotating structure 1306. FIG. 14A illustrates a sectional view of an exemplary rotating structure 1306 taken along a plane orthogonal to the rotational axis R of the rotating structure 1306. FIG. 14B illustrates a sectional view of the exemplary rotating structure 1306 of FIG. 14A taken along a plane extending through the rotational axis R. In this exemplary configuration illustrated in FIGS. 14A and 14B, two or more protrusions 1300 may be spaced from each other along two or more different planes extending along and through the rotational axis R so that they are spaced from each other along the cross-sectional periphery of the rotating structure 1306. For example, protrusions 1308 and 1310 may extend radially outwardly from the surface of the rotating structure along plane A, protrusions 1312 and 1314 may extend radially outwardly from the surface of the rotating structure along plane B, protrusions 1316 and 1318 may extend radially outwardly from the surface of the rotating structure along plane C, and protrusions 1320 and 1322 may extend radially outwardly from the surface of the rotating structure along plane D.

Figure 15A:
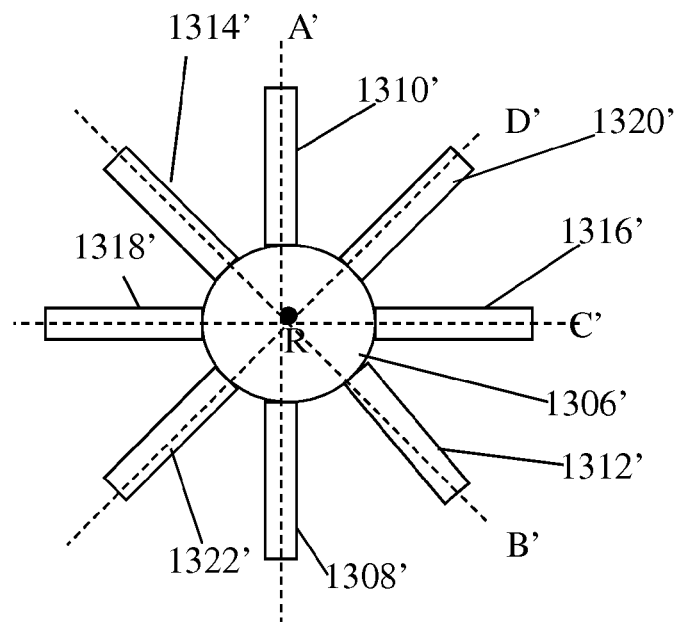
FIG. 15A illustrates a sectional view of an exemplary rotating structure taken along a plane orthogonal to the rotational axis of the rotating structure.
Figure 15B:
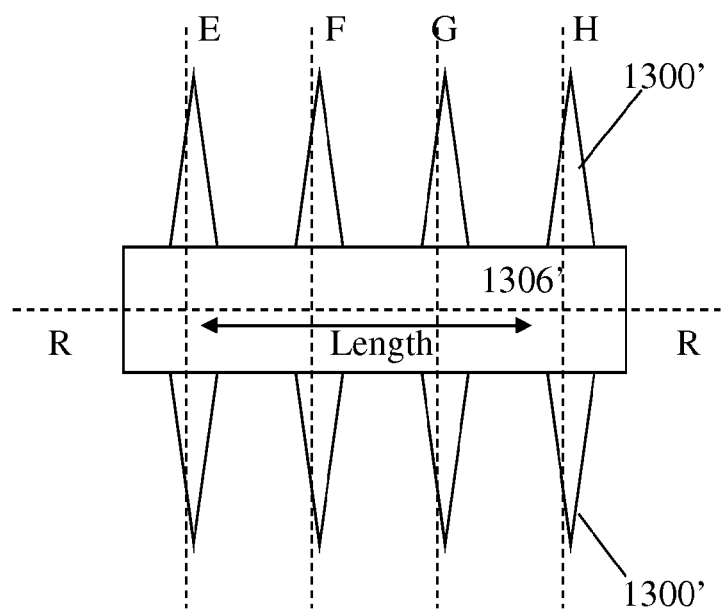
FIG. 15B illustrates a sectional view of the exemplary rotating structure of FIG. 15A taken along a plane extending through the rotational axis.

FIGS. 15A and 15B illustrate an exemplary configuration of two or more protrusions 1300' of the type illustrated in FIG. 13 on an outer surface of a rotating structure 1306'. FIG. 15A illustrates a sectional view of an exemplary rotating structure 1306' taken along a plane orthogonal to the rotational axis R of the rotating structure 1306'. FIG. 15B illustrates a sectional view of the exemplary rotating structure 1306' of FIG. 15A taken along a plane extending through the rotational axis R. In this exemplary configuration illustrated in FIGS. 15A and 15B, two or more protrusions 1300' may be spaced from each other along two or more different planes extending through and along the rotational axis R so that they are spaced from each other along the cross-sectional periphery of the rotating structure 1306'. For example, protrusions 1308' and 1310' may extend radially outwardly from the surface of the rotating structure 1306' along plane A', protrusions 1312' and 1314' may extend radially outwardly from the surface of the rotating structure along plane B', protrusions 1316' and 1318' may extend radially outwardly from the surface of the rotating structure along plane C', and protrusions 1320' and 1322' may extend radially outwardly from the surface of the rotating structure along plane D'.

In addition, in the exemplary embodiment illustrated in FIGS. 15A and 15B, two or more protrusions 1300' may be spaced from each other along two or more different planes (e.g., planes E, F, G and H) extending perpendicular to the rotational axis R so that they are spaced along the length of the central core of the rotating structure 1306'.

Figure 16:
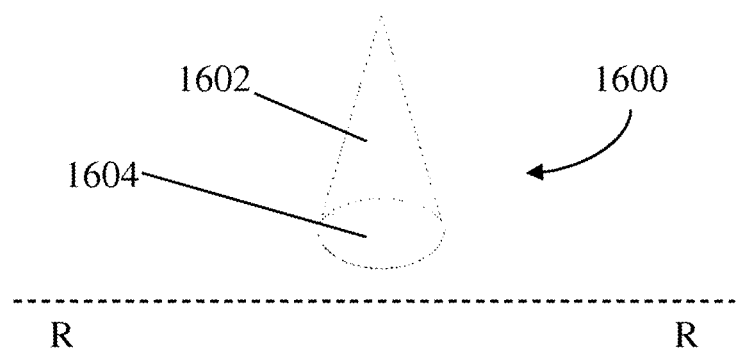
FIG. 16 illustrates an exemplary protrusion that is configured substantially as a conical projection in which the tip of the conical shape penetrates into a liquid material during the fiber formation process.

FIG. 16 illustrates an exemplary protrusion 1600 that is configured substantially as a conical projection in which the tip of the conical shape penetrates into a liquid material during the fiber formation process. n exemplary embodiments, one or more exemplary protrusions 1600 may be affixed to an outer surface of a rotating structure 1606 configured to rotate about a rotational axis R. In this exemplary configuration, one or more protrusions 1600 may be affixed to the outer surface of the rotating structure 1606 to extend radially outwardly from the outer surface of the rotational structure 1606. The protrusion 1600 may include a conical face 1602 that extends radially outwardly from a rotating structure 1606, and a circular face 1604 configured to contact an outer surface of a rotating structure 1606 and to extend along its rotational axis R.

In the exemplary embodiment, face 1604 of the protrusion 1604 that extends along the rotational axis R and is disposed in contact with the outer surface of the rotating structure 1606 may have a substantially smaller area than the conical face 1602 of the protrusion 1602 that extends radially outwardly from the rotating structure 1606. In an exemplary embodiment, the ratio between the area of face 1602 to the area of face 1604 may range from about 1:1 to about 100:1. Some exemplary ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary ratios intermediate to the above-recited exemplary values are also intended to be part of this invention.

Figure 17A:
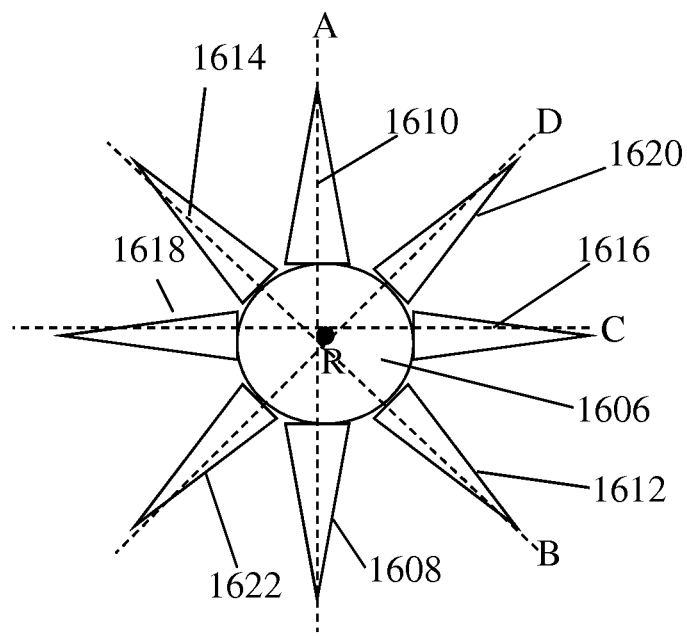
FIG. 17A illustrates a sectional view of an exemplary rotating structure taken along a plane orthogonal to the rotational axis of the rotating structure.
Figure 17B:
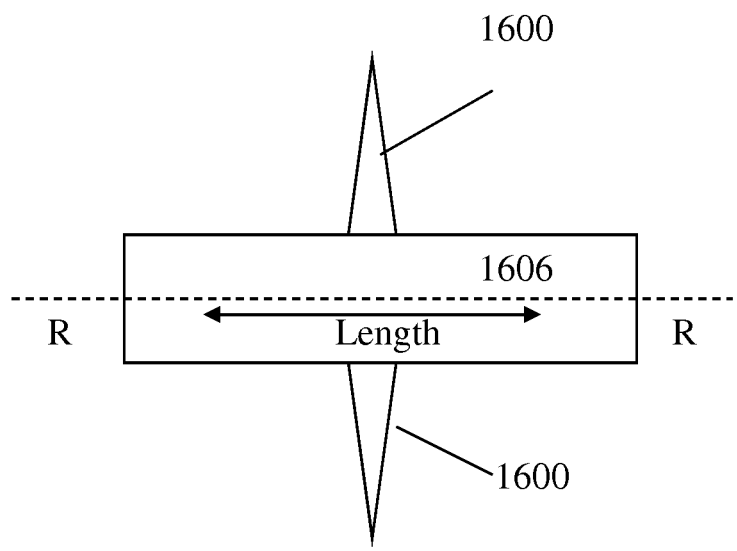
FIG. 17B illustrates a sectional view of the exemplary rotating structure of FIG. 17A taken along a plane extending through the rotational axis.

FIGS. 17A and 17B illustrate an exemplary configuration of two or more protrusions of the type illustrated in FIG. 16 on an outer surface of a rotating structure 1606. FIG. 17A illustrates a sectional view of an exemplary rotating structure 1606 taken along a plane orthogonal to the rotational axis R of the rotating structure 1606. FIG. 17B illustrates a sectional view of the exemplary rotating structure 1606 of FIG. 17A taken along a plane extending through the rotational axis R. In this exemplary configuration illustrated in FIGS. 17A and 17B, two or more protrusions 1600 may be spaced from each other along two or more different planes extending along and through the rotational axis R so that they are spaced from each other along the cross-sectional periphery of the rotating structure 1606. For example, protrusions 1608 and 1610 may extend radially outwardly from the surface of the rotating structure along plane A, protrusions 1612 and 1614 may extend radially outwardly from the surface of the rotating structure along plane B, protrusions 1616 and 1618 may extend radially outwardly from the surface of the rotating structure along plane C, and protrusions 1620 and 1622 may extend radially outwardly from the surface of the rotating structure along plane D.

Figure 18A:
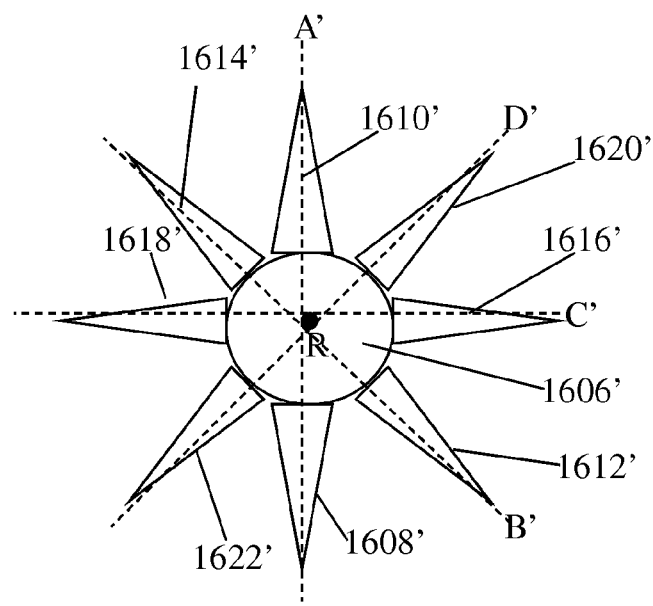
FIG. 18A illustrates a sectional view of an exemplary rotating structure taken along a plane orthogonal to the rotational axis of the rotating structure.
Figure 18B:
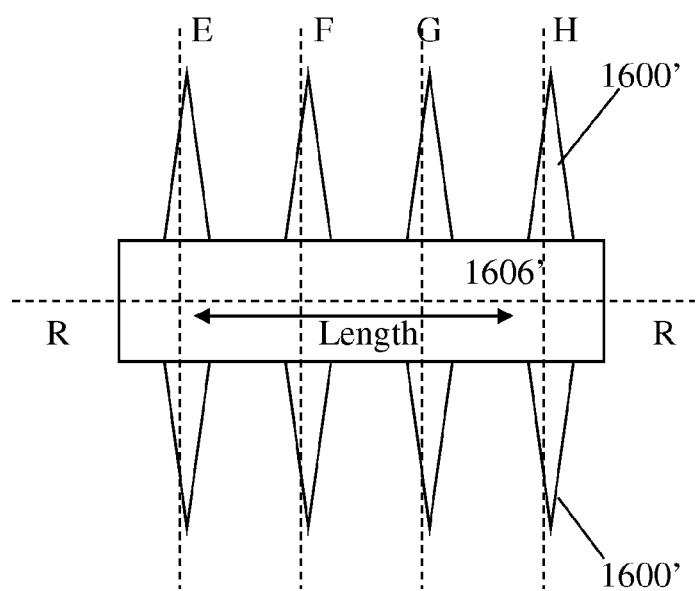
FIG. 18B illustrates a sectional view of the exemplary rotating structure of FIG. 18A taken along a plane extending through the rotational axis.

FIGS. 18A and 18B illustrate an exemplary configuration of two or more protrusions 1600' of the type illustrated in FIG. 16 on an outer surface of a rotating structure 1600'. FIG. 18A illustrates a sectional view of an exemplary rotating structure 1606' taken along a plane orthogonal to the rotational axis R of the rotating structure 1606'. FIG. 18B illustrates a sectional view of the exemplary rotating structure 1606' of FIG. 18A taken along a plane extending through the rotational axis R. In this exemplary configuration illustrated in FIGS. 18A and 18B, two or more protrusions 1600' may be spaced from each other along two or more different planes extending along and through the rotational axis R so that they are spaced from each other along the cross-sectional periphery of the rotating structure 1606'. For example, protrusions 1608' and 1610' may extend radially outwardly from the surface of the rotating structure along plane A', protrusions 1612' and 1614' may extend radially outwardly from the surface of the rotating structure along plane B', protrusions 1616' and 1618' may extend radially outwardly from the surface of the rotating structure along plane C', and protrusions 1620' and 1622' may extend radially outwardly from the surface of the rotating structure along plane D'.

In addition, in the exemplary embodiment illustrated in FIGS. 18A and 18B, two or more protrusions 1600' may be spaced from each other along two or more different planes (e.g., planes E, F, G and H) extending perpendicular to the rotational axis R so that they are spaced along the length of the central core of the rotating structure 1606'.

III. Exemplary Embodiments Employing One or More Gas Jets

Exemplary embodiments provide systems, devices, and methods employing one or more gas jets for forming micron, submicron and/or nanometer dimension fibers. Exemplary fibers formed by the exemplary systems, devices and methods may range in diameter from about one nanometer to about 100 microns, but are not limited to this exemplary range.

Figure 19A:
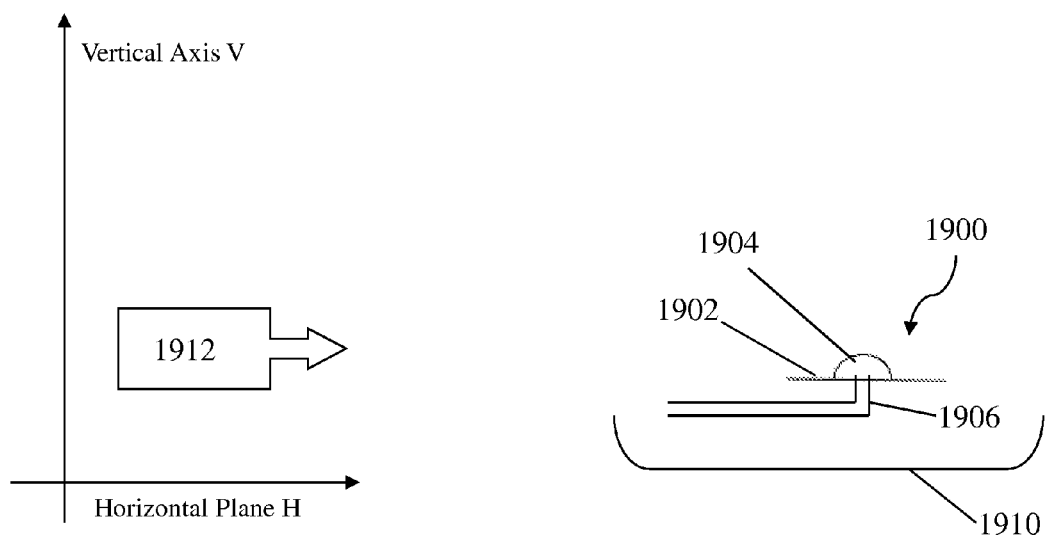
FIG. 19A illustrates an exemplary fiber formation device including a jet nozzle in which a liquid material is not imparted with a force by the jet nozzle.
Figure 19B:
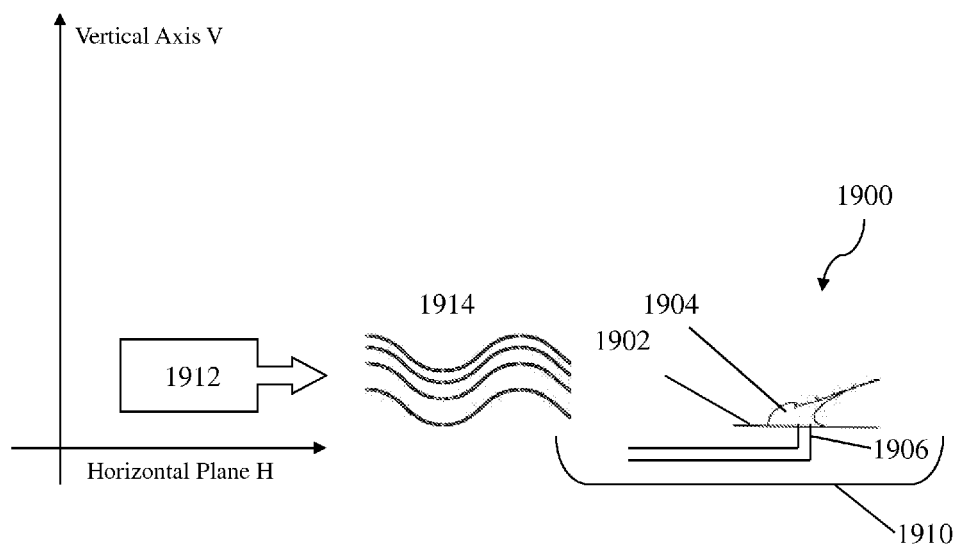
FIG. 19B illustrates the exemplary fiber formation device of FIG. 19A in which the jet nozzle imparts a force to the liquid material at a low angle of impact relative to the horizontal plane.
Figure 19C:
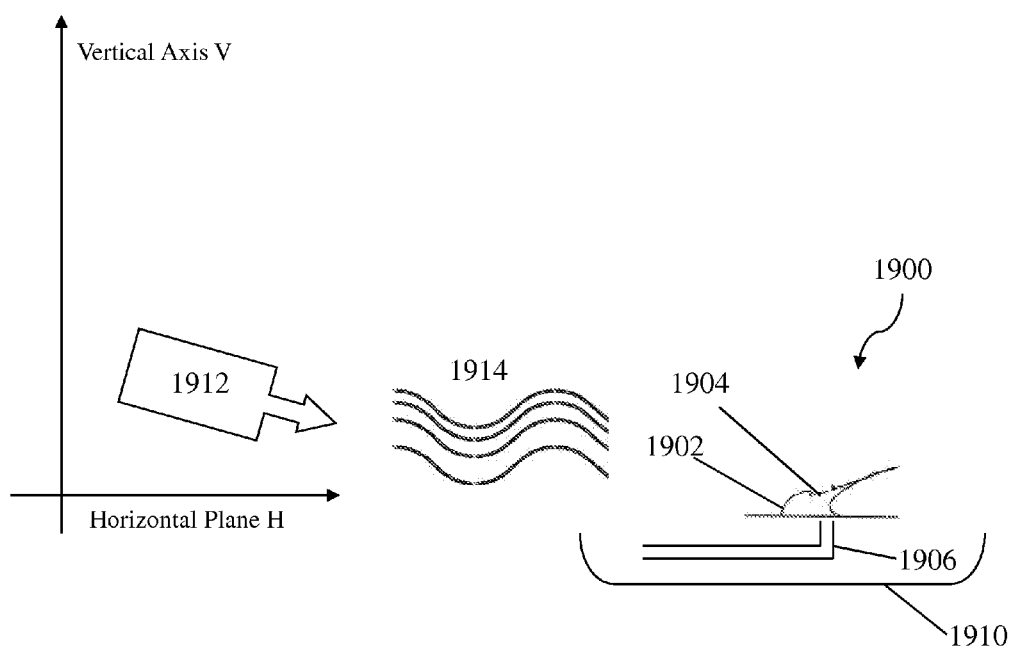
FIG. 19C illustrates the exemplary fiber formation device of FIGS. 19A and 19B in which the jet nozzle imparts a force to the liquid material at a high angle of impact relative to the horizontal plane.

FIGS. 19A-19C illustrate schematic views of an exemplary fiber formation device 1900 that employs one or more gas jets to form one or more fibers. FIG. 19A illustrates the exemplary device 1900 in which a liquid material is not imparted with a force. FIG. 19B illustrates the exemplary device 1900 in which the liquid material is imparted with a force by a gas jet at a low angle of impact relative to the horizontal plane. FIG. 19C illustrates the exemplary device 1900 in which the liquid material is imparted with a force by a gas jet at a high angle of impact relative to the horizontal plane. The exemplary device 1900 illustrated in FIGS. 19A-19C does not employ or require a nozzle for ejecting the liquid material, a spinneret or rotating reservoir containing and ejecting the liquid material, or an electrostatic voltage potential for forming the fibers. Exemplary devices are simpler than devices in the art as they do not employ a spinneret or an electrostatic voltage potential. In addition, the lack of a nozzle for ejecting the liquid material in exemplary devices avoids the issue of clogging of the nozzle associated with devices in the art.

The exemplary fiber formation device 1900 may include a platform 1902 for supporting a deposit 1904 of a liquid material. In an exemplary embodiment, an exemplary volume of the liquid material provided for fiber formation may range from about one microliter to about 100 milliliters. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

In an exemplary embodiment, the deposit 1904 may be a one-time deposit. In another exemplary embodiment, the deposit 1904 may be a continual or intermittently replenished deposit. In exemplary embodiments, the deposit 1904 of the liquid material may be stationary or moving on the platform 1902. The exemplary fiber formation device 1900 may include a supply channel 1906 for supplying the liquid material to the platform 1902. In an exemplary embodiment, the supply channel 1906 may provide a one-time, intermittent or continual supply of the liquid material. Exemplary feed rates of the liquid materials provided by the supply channel 1906 may range from about 0.01 milliliters per minute to about 100 milliliters per minute, although feed rates are not limited to this exemplary range. Some exemplary feed rates include, but are not limited to, about 0.01 milliliters per minute to about 1 milliliter per minute, about 1 milliliter per minute to about 20 milliliters per minute, about 20 milliliters per minute to about 40 milliliters per minute, about 40 milliliters per minute to about 60 milliliters per minute, about 60 milliliters per minute to about 80 milliliters per minute, about 80 milliliters per minute, and the like. Exemplary feed rates intermediate to the recited exemplary rates are also part of the invention.

In an exemplary embodiment, a microfluidic device including one or more microfluidic channels may be provided to supply the liquid material to the platform 1902. In an exemplary embodiment, a macrofluidic device including one or more macrofluidic channels may be provided to supply the liquid material to the platform 1902. In an exemplary embodiment, a microfluidic and a macrofluidic device may be provided to supply the liquid material to the platform 1902.

In an exemplary embodiment, a heating device may be provided at, on or in the vicinity of the platform 1902 for heating and/or melting the liquid material 1904. For example, a polymer delivered to the platform 1902 may be heated by the heating device to form a polymer melt that may, in turn, be used to form fibers. In an exemplary embodiment, a polymer may be heated at a temperature suitable for melting the polymer, e.g., is heated at a temperature of about 100° C. to about 300° C., 100-200° C., about 150-300° C., about 150-250° C., or about 150-200° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Exemplary temperatures intermediate to the recited exemplary temperatures are also part of the invention.

In an exemplary embodiment, one or more air foils or air blades (not pictured) may be provided in the vicinity of the liquid material 1904 for increasing air turbulence experienced by the fibers formed of the liquid material during and/or after fiber formation. To this end, the exemplary fiber formation device 1900 may be used in combination with an air foil as described in connection with FIGS. 13-17 of U.S. Provisional Patent Application Ser. No. 61/414,674, filed Nov. 17, 2010, the entire contents of which are incorporated herein in their entity by reference.

In an exemplary embodiment, the platform 1902 of the device 1900 may include or may be provided with a conduit or hood (not pictured) for providing a desired pathway or for guiding a fiber along a desired pathway to a collection device 1910. The collection device 1910 may be constructed of any suitable material, e.g., a material that can withstand heat and/or that is not sensitive to chemical organic solvents. In one embodiment, the collection device 1910 may be formed of a plastic material, e.g., polypropylene, polyethylene, or polytetrafluoroethylene. In another embodiment, the collection device 1910 may be formed of a metal, e.g., aluminum, steel, stainless steel, tungsten carbide, tungsten alloys, titanium or nickel. A collection device 1910 may have any suitable size or geometrically shape including, but not limited to, round, rectangular, oval, and the like. The collection device 1910 may also be shaped in the form of any living organ, such as a heart, kidney, liver lobe(s), bladder, uterus, intestine, skeletal muscle, or lung shape, or portion thereof. The collection device 1910 may further be shaped as any hollow cavity, organ or tissue, such as a circular muscle structure, e.g., a sphincter or iris. These shapes allow the fibers to be deposited in the form of a living organ for the production of engineered tissue and organs, described in more detail below.

In an exemplary embodiment, the collection device 1910 may be spaced from the platform 1902 and may surround the platform 1902. Although the exemplary collection device 1910 illustrated is stationary, other exemplary collection devices may be moving, e.g., rotating and/or oscillating. A moving collection device 1910 may be used to receive fibers in mesh, mat, woven or unwoven configurations. Exemplary configurations of fibers may enhance the mechanical properties of the collection of fibers.

In an exemplary embodiment in which the collection device 1910 moves during the fiber formation process, the collection device may be coupled to a motion generator that imparts the motion to the collection device 1910. The motion generator may, in turn, be coupled to a source of electrical power for supplying power to the motion generator and to a control device for controlling aspects of its motion, e.g., the type of motion (linear and/or rotational), activation/deactivation of the motion generator, timing of activation and deactivation of the motion generator, the speed of the motion, the acceleration/deceleration of the motion, and the like. An exemplary range for typical linear velocities imparted to an exemplary collection device 1910 may include about 0.0001 m/s to about 4.2 m/s, but is not limited to this exemplary range. Some exemplary linear velocities may include, but are not limited to, about 0.01 m/s, 0.02 m/s, 0.03 m/s, 0.04 m/s, 0.05 m/s, 0.06 m/s, 0.07 m/s, 0.08 m/s, 0.09 m/s, 0.1 m/s, 0.2 m/s, 0.3 m/s, 0.4 m/s, 0.5 m/s, 0.6 m/s, 0.7 m/s 0.8 m/s 0.9 m/s, 1 m/s, 2 m/s, 3 m/s, 4 m/s, 5 m/s, and the like. Exemplary linear speeds intermediate to the recited exemplary speeds are also part of the invention. The motion of the collection device 1910 may be controlled to obtain desired orientations and configurations of the fibers.

In certain embodiments, the collection device 1910 may be maintained at about room temperature, e.g., about 20, 21, 22, 23, 24, 25, 26, 27, 28, 29, or about 30° C. and ambient humidity, e.g., about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90% humidity. The collection device 1910 may be maintained at and the methods may be formed at any suitable temperature and humidity depending on the desired surface topography of the polymeric fibers to be fabricated. For example, increasing humidity from about 30% to about 50% results in the fabrication of porous fibers, while decreasing humidity to about 25% results in the fabrication of smooth fibers. As smooth fibers have more tensile strength than porous fibers, in one embodiment, the devices of the invention are maintained and the methods of the invention are performed in controlled humidity conditions, e.g., humidity varying by about less than about 10%. Exemplary temperature and humidity values intermediate to the recited exemplary temperature and humidity values are also part of the invention.

The exemplary fiber formation device 1900 may include one or more gas nozzles 1912 provided in the vicinity of and spaced from the liquid material 1904. The nozzle 1912 may be couplable and/or coupled to a gas source, and may emit a high-speed jet or stream 1914 of a gas directed at the liquid material 1904 on the platform 1902. Exemplary gases that may be emitted by the nozzle 1912 include, but are not limited to, air, carbon dioxide, and the like. The nozzle 1912 may be configured so that the gas jet contacts a surface of the liquid material 1904 to impart sufficient force or energy to create a meniscus at the location where the gas jet contacts the surface. The force or energy imparted by the gas jet also decouples a portion of the liquid material at the meniscus and flings the portion away from the contact with the gas jet and away from the deposit 1904 of the liquid material, thereby forming a micron, submicron and/or nanometer dimension fiber. The fiber may exit the platform 1902 and may be collected on the collection device 1910.

In an exemplary embodiment, the direction in which the liquid material is flung may be substantially the same as the direction of flow of the gas jet. In an exemplary embodiment, the gas jet may impart a force to the liquid material in a substantially parallel direction to the top surface of the liquid material.

Exemplary embodiments may provide mechanisms for controlling one or more aspects of the operation of the nozzle 1912 including, but not limited to, activation and deactivation of the nozzle, timing of the activation and deactivation of the nozzle, setting and/or changing the speed of the gas jet, setting and/or changing the flow rate of the gas in the gas jet, setting and/or changing the orientation of the nozzle with reference to the liquid material, the distance between the nozzle and the liquid material, and like. In an exemplary embodiment, the nozzle 1912 may be activated a single time to impart a momentary force to the liquid material 1904. In another exemplary embodiment, the nozzle 1912 may be activated intermittently or continuously.

The jet nozzle 1912 may be coupled to a controller or control mechanism that receives control instructions encoded, for example, in power signals, optical signals or in other signals, for controlling different aspects of the operation of the nozzle 1912. The nozzle 1912 may also be coupled to an electrical power supply and conduit that provides electrical power for powering the nozzle. In an exemplary embodiment, any of the aspects of the operation of the nozzle 1912 may be controlled in a real-time manner by a user as the device is being operated. In another exemplary embodiment, these aspects may also be controlled in a pre-programmed manner.

A gas jet may be generated to impact the liquid material 1904 for a time sufficient to form a desired fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

In an exemplary embodiment, the jet nozzle 1912 may be coupled to a motion generator that may impart a lateral or linear motion to the jet nozzle 1912 to position the jet nozzle at a desired position relative to the liquid material 1904 on the platform 1902. In an exemplary embodiment, the vertical and/or horizontal distance between the jet nozzle 1912 and the liquid material 1904 may be changed using the motion generator. In an exemplary embodiment, the angle at which the gas jet imparts a force to the liquid material may be changed using the motion generator.

In the exemplary embodiment illustrated in FIGS. 19A-19C, the nozzle 1912 is spaced from the liquid material 1904 along the horizontal plane H, but not substantially spaced from the liquid material along the vertical axis V. That is, the gas jet impinges upon the surface of the liquid material at a low angle of impact including, but not limited to, from about zero degree to about ten degrees from the horizontal plane (e.g., about zero degrees, one degree, two degrees, three degrees, four degrees, five degrees, six degrees, seven degrees, eight degrees, nine degrees, ten degrees, and the like). In an exemplary embodiment in which the angle of impact is substantially zero degrees, force may applied to the surface of the liquid material substantially parallel to the surface. In the exemplary embodiment illustrated in FIGS. 19A-19C, the nozzle 1912 is spaced from the liquid material 1904 both along the horizontal plane H and along the vertical axis V. That is, the gas jet impinges upon the surface of the liquid material at a higher angle of impact including, but not limited to, from about ten degrees to about fifty degrees from the horizontal plane (e.g., about ten degrees, fifteen degrees, twenty degrees, twenty five degrees, thirty degrees, thirty five degrees, forty degrees, forty five degrees, fifty degrees, and the like). Other angles of impingement are within the scope of this invention.

In an exemplary embodiment, the orientation of the nozzle 1912 with reference to the liquid material 1904 may not be altered during operation of the device, such that the device forms fibers aligned substantially along the same direction. In another exemplary embodiment, the orientation may be altered one or more times in order to adjust the direction along which the gas jet imparts force to the liquid material, thereby causing the fibers to be formed substantially along two or more directions. The fibers formed substantially along two or more directions may be configured to form a desired multi-fiber structure, e.g., meshes, mats, scaffolds, etc., having a desired spacing between overlapping fibers.

In some exemplary embodiments, a gas may be introduced to the liquid material to facilitate formation of a meniscus at the liquid material which, in turn, facilitates decoupling and flinging of a portion of the liquid material by the rotating structure. Exemplary gases include, but are not limited to, air, carbon dioxide, and the like. In an exemplary embodiment, the gas may be introduced into the liquid material before the liquid material is supplied into the device, for example, by carbonation of the liquid material. In another exemplary embodiment, the fiber formation device 1900 may include a gas supply channel (not pictured) for introducing a gas to the liquid material. In an exemplary embodiment, the gas supply channel may provide a one-time, intermittent or continual supply of the gas during the operation of the device. The gas may be introduced to the liquid material before or during the time that the jet nozzle 1912 imparts a force to the surface of the liquid material in order to form a fiber.

In some exemplary embodiments, one or more agents may be introduced to the liquid material so that the resulting fibers contain the agent. Exemplary agents include, but are not limited to, any suitable biologically active agent, e.g., lipophilic peptides, lipids, nucleotides, proteins, drugs, pharmaceutically active agents, biocidal agents, antimicrobial agents, and the like. In an exemplary embodiment, the agent may be introduced into the liquid material before the liquid material is supplied into the device. In another exemplary embodiment, the fiber formation device 1900 may include an agent supply channel (not pictured) for introducing an agent to the liquid material before the liquid material is introduced to the device or during the formation of the fibers.

Figure 20:
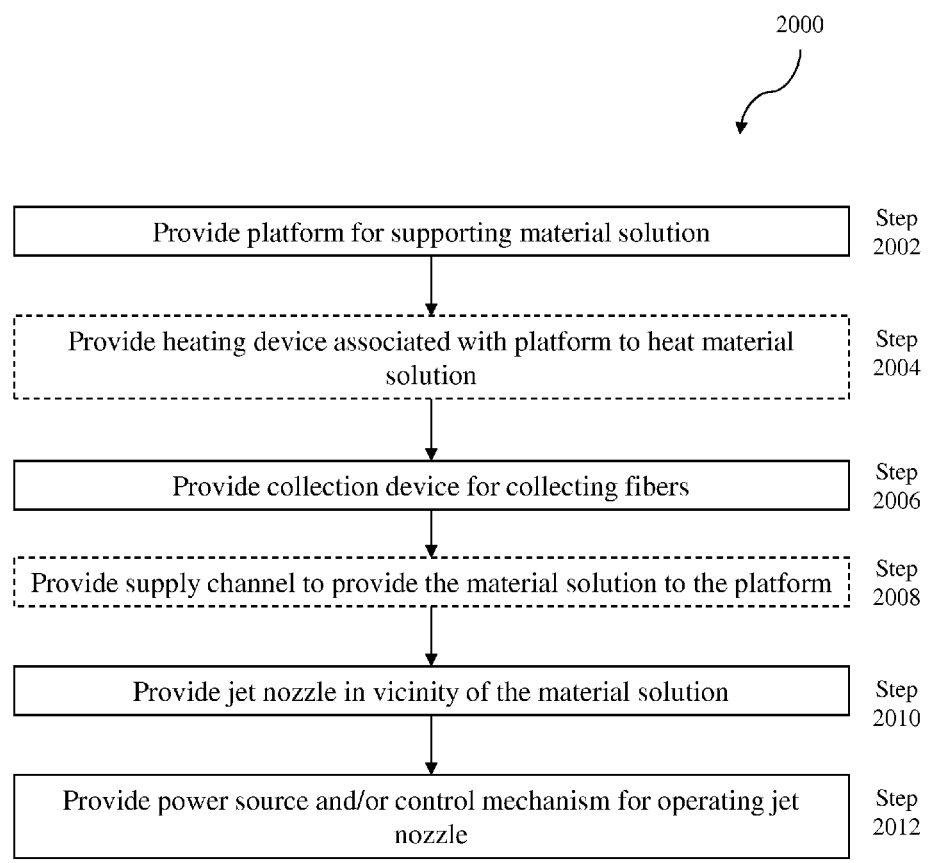
FIG. 20 is a flowchart illustrating an exemplary method for forming or manufacturing the exemplary fiber formation device of FIGS. 19A-19C.

FIG. 20 is a flowchart illustrating an exemplary method 2000 for forming or manufacturing the exemplary fiber formation device 1900 of FIGS. 19A-19C.

In step 2002, one or more platforms are provided for supporting a liquid material. In an exemplary embodiment, the platform is stationary and holds a stationary deposit of the liquid material. In another exemplary embodiment, the platform is movable or moving.

In step 2004, optionally, a heating device may be provided associated with the platform to heat and/or melt the liquid material. In an exemplary embodiment, the heating device may be used to melt a polymer and to form fibers from a polymer melt.

In step 2006, one or more collection devices are provided for collecting fibers in the vicinity of the platform. In an exemplary embodiment, the collection device is stationary. In another exemplary embodiment, the collection device is movable or moving.

In step 2008, optionally, one or more supply channels are provided in the vicinity of the platform for introduction of the liquid material to the platform. The liquid material may be provided on a one-time basis before the fiber formation process or periodically or continually before and/or during the fiber formation process.

In step 2010, one or more jet nozzles are provided in the vicinity of the liquid material for forming fibers.

In step 2012, one or more power sources and/or control mechanisms are coupled to the jet nozzle to respectively power and operate the jet nozzle. The power source and control mechanism may be provided integrally with or separately from the jet nozzle. The power sources, e.g., one or more batteries, an AC power supply, etc., may provide electrical energy for powering the nozzle. The control mechanism may be used to start, stop and alter the gas flow for a fiber formation session, e.g., activation of the nozzle, the speed of the gas jet emitted by the nozzle, and the like. The control mechanism may include a processor that may be used to pre-program the operation of the jet nozzle.

Figure 21:
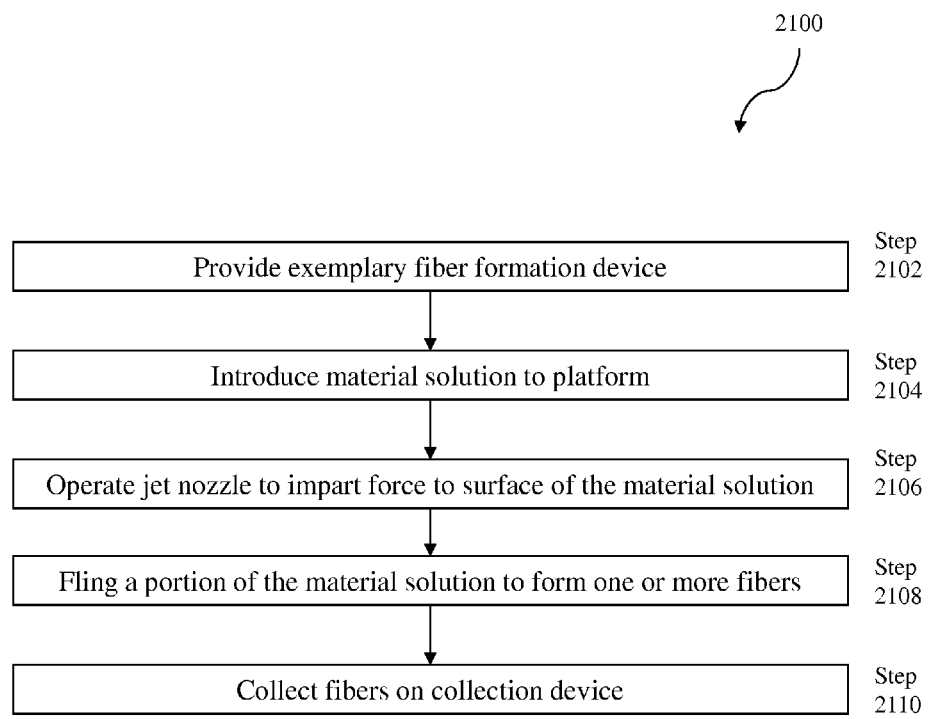
FIG. 21 is a flowchart illustrating an exemplary method for using the exemplary fiber formation device of FIGS. 19A-19C to form fibers from a liquid material.

FIG. 21 is a flowchart illustrating an exemplary method 2100 for using the exemplary fiber formation device 1900 of FIGS. 19A-19C to form fibers from a liquid material.

In step 2102, an exemplary fiber formation device is provided, for example, in accordance with method 2000 illustrated in FIG. 20.

In step 2104, a liquid material is introduced to the platform, for example, through one or more supply channels provided in the vicinity of the platform. The liquid material may be introduced to the platform one time, two or more times, continuously or periodically. The volume and flow rate of the liquid material introduced to the platform may be kept constant or altered based on the requirements of fiber formation.

In step 2106, the jet nozzle may be operated in a desired manner (e.g., at a desired flow rate, a desired speed, a desired angle of impact, desired times) to impart a force to the surface of the liquid material. The force may be imparted one time, two or more times, continuously or periodically before and/or during the fiber formation process.

In step 2108, a portion of the liquid material is flung by the force away from the deposit of the liquid material and away from the jet nozzle. Without wishing to be bound by theory, the material is extended and stretched into one or more fibers due to air drag, jet necking and evaporation of the solvent in the liquid material.

In step 2110, the resulting fibers are collected on one or more collection devices that may be stationary or moving.

IV. Exemplary Miniaturized Fiber Formation Systems and Devices

Exemplary embodiments provide miniaturized systems, miniaturized devices, and methods using miniaturized systems and devices for forming micron, submicron and/or nanometer dimension fibers on and/or within the body of an animal, e.g., human, domesticated animal, wild animal, and the like. Any of the exemplary fiber formation devices discussed elsewhere in this application may be miniaturized as well.

An exemplary miniaturized device or system may be used, for example, by a healthcare professional, like a surgeon, to form fibers directly within the body to speed up wound healing and homeostasis and as biodegradable and biocompatible scaffolds in vivo to encourage organ and tissue regeneration. Exemplary fibers formed by the exemplary miniaturized systems, devices and methods may range in diameter from about one nanometer to about 100 microns, but are not limited to this exemplary range. Exemplary diameters may include, but are not limited to, about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 microns. Exemplary diameters intermediate to the recited diameters are also part of the invention.

Exemplary liquid materials used to form the fibers may include, but are not limited to, bio-compatible fibers, such as biodegradable polymers, biodegradable proteins, and the like.

Exemplary devices may have a range of sizes but are generally sufficiently small to be inserted, wholly or in part, inside a cavity formed inside the body. Some exemplary devices may have volumes as small as a few cubic millimeters. Some exemplary devices may be sufficiently small to fit within the palm of a human hand (see, e.g., FIGS. 22, 37, 39, and 40).

Figure 22:
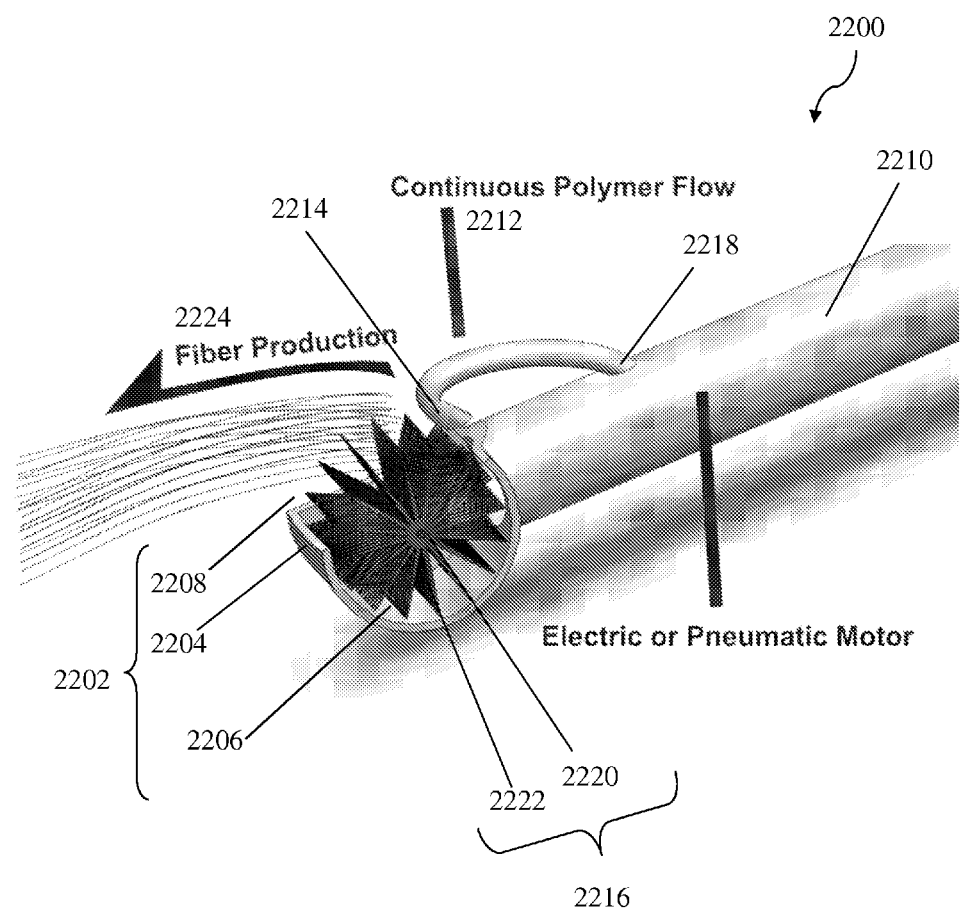
FIG. 22 illustrates a perspective view of an exemplary miniaturized fiber formation device that may be used, e.g., as part of a laparoscopic tool for laparoscopic procedures.

FIG. 22 illustrates a perspective view of an exemplary miniaturized fiber formation device 2200 that may be used as part of a laparoscopic tool for laparoscopic procedures. The exemplary device 2200 illustrated in FIG. 22 does not employ or require a nozzle for ejecting the liquid material, a spinneret or rotating reservoir for containing and ejecting liquid material, or an electrostatic voltage potential for forming the fibers. Exemplary devices are simpler than devices in the art as they do not employ a spinneret or an electrostatic voltage potential. In addition, the lack of a nozzle for ejecting the liquid material in exemplary devices avoids the issue of clogging of the nozzle.

The exemplary miniaturized fiber formation device 2200 may include a miniaturized body portion 2202 formed at or coupled to a first end of the device proximal to the body cavity. The miniaturized body portion 2202 may be introduced into the body cavity and may have any suitable size and shape for insertion into the body cavity. In the exemplary embodiment illustrated in FIG. 22, the body portion 2202 may have a side wall 2204 that has a semi-cylindrical structure in one exemplary embodiment. The side wall 2204 of the body portion 2202 may define a miniaturized cavity 2206 within which a miniaturized rotating structure may be housed. The body portion 2202 may have one or more orifices 2208 through which one or more jets or fibers of the liquid material may exit the body portion 2202. The orifice 2208 may be located at any suitable location, e.g., in the side wall 2204 of the body portion 2202. The orifice 2208 may have any suitable sectional shape and may be provided in suitable numbers, locations and configurations to control the shape and properties of the resulting fibers 2224. In an exemplary embodiment, the body portion 2202 of the device may include a conduit or hood (not pictured) at or near the orifice 2208 for providing a desired pathway or for guiding the fiber along a desired pathway to a desired region in the body cavity.

The exemplary miniaturized fiber formation device 2200 may include a miniaturized insertion portion 2210 formed at or coupled to the body portion 2202 for inserting the body portion 2202 into the body cavity. In an exemplary embodiment, the insertion portion 2210 may be configured as a hand-held portion that may be gripped by the user to guide the device to a desired position on or within the body. In an exemplary embodiment, the device 2200 may be used as a laparoscopic tool and may be inserted into a cavity in the body. In this exemplary embodiment, the outer diameter of the insertion portion 2210 may be suitably small in order for insertion into the body, for example, through a catheter or opening in the body. In the exemplary embodiment illustrated in FIG. 22, the insertion portion 2210 may have a substantially elongated cylindrical structure with a substantially circular cross section.

In an exemplary embodiment, the miniaturized fiber formation device 2200 may include one or more miniaturized reservoirs (not pictured) for holding a liquid material that may be introduced into the cavity of the body. The reservoir may be formed of a suitable material including, but not limited to, ceramic, metal, polymer, etc., depending on the specific applications of the device. An exemplary reservoir may have a volume ranging from about one microliter to about 100 milliliters for holding the liquid material. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges.

In another exemplary embodiment illustrated in FIG. 22, the miniaturized fiber formation device 2200 may not include a reservoir that may be introduced into the body cavity, but may include a supply channel 2212 for supplying the liquid material from outside the cavity of the body. The outer diameter of the supply channel 2212 may be suitably small for insertion into the body, for example, through a catheter or opening in the body. A first end 2214 of the supply channel 2212 proximal to the body cavity may open on or in the vicinity of one or more miniaturized rotating structures 2216 in order to feed the liquid material from a storage device to the rotating structure. A second end 2218 of the supply channel 2212 distal to the body cavity 2202 may be coupled to another supply channel or to a storage device holding the liquid material.

In an exemplary embodiment, an exemplary volume of the liquid material provided for fiber formation may range from about one microliter to about 100 milliliters. Some exemplary volumes include, but are not limited to, about one microliter to about 100 microliters, about 1 milliliter to about 20 milliliters, about 20 milliliters to about 40 milliliters, about 40 milliliters to about 60 milliliters, about 60 milliliters to about 80 milliliters, about 80 milliliters to about 100 milliliters, but are not limited to these exemplary ranges. Exemplary volumes intermediate to the recited volumes are also part of the invention.

In an exemplary embodiment, the supply channel 2212 may provide the liquid material in the form of a deposit provided in contact with or in the vicinity of the rotating structure 2216. In an exemplary embodiment, the supply channel 2212 may provide a constantly replenishing deposit. In an exemplary embodiment, the supply channel 2212 may provide a one-time, intermittent or continual supply of the liquid material to the rotating structure 2216 during its operation. Exemplary feed rates of the liquid materials provided by the supply channel 2212 may range from about 0.01 milliliters per minute to about 100 milliliters per minute, although feed rates are not limited to this exemplary range. Some exemplary feed rates include, but are not limited to, about 0.01 milliliters per minute to about 1 milliliter per minute, about 1 milliliter per minute to about 20 milliliters per minute, about 20 milliliters per minute to about 40 milliliters per minute, about 40 milliliters per minute to about 60 milliliters per minute, about 60 milliliters per minute to about 80 milliliters per minute, about 80 milliliters per minute, and the like. Exemplary feed rates intermediate to the recited rates are also part of the invention.

In an exemplary embodiment, the supply channel 2212 may provide the liquid material in the form of one or more droplets that form at the tip of the first end 2214 in the vicinity of the rotating structure 2216. In an exemplary embodiment, the supply channel 2212 may provide a constantly replenishing droplet. In an exemplary embodiment, the supply channel 2212 may provide a one-time, intermittent or continual supply of the liquid material to the rotating structure 2216 during its operation. Exemplary feed rates of the liquid materials provided by the supply channel 2212 may range from about 0.01 milliliters per minute to about 100 milliliters per minute, although feed rates are not limited to this exemplary range. Some exemplary feed rates include, but are not limited to, about 0.01 milliliters per minute to about 1 milliliter per minute, about 1 milliliter per minute to about 20 milliliters per minute, about 20 milliliters per minute to about 40 milliliters per minute, about 40 milliliters per minute to about 60 milliliters per minute, about 60 milliliters per minute to about 80 milliliters per minute, about 80 milliliters per minute, and the like. Exemplary feed rates intermediate to the recited rates are also part of the invention.

The exemplary miniaturized fiber formation device 2200 may include one or more miniaturized rotating structures 2216 housed within the cavity 2206 of the body portion 2202 in the vicinity of the proximal end 2214 of the supply channel 2212. Exemplary speeds of rotation may range from about 100 rpm to about 500,000 rpm, although rotational speeds are not limited to this exemplary range. Sufficient rotational speeds and times for operating the devices of the invention to form a fiber may be dependent on the concentration of the material and the desired features of the formed fiber. Exemplary devices employing rotational motion may be rotated at a speed of about 1,000 rpm-50,000 rpm, about 1,000 rpm to about 40,000 rpm, about 1,000 rpm to about 20,000 rpm, about 5,000 rpm-20,000 rpm, about 5,000 rpm to about 15,000 rpm, or about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, or about 24,000 rpm. Ranges and values intermediate o the above recited ranges and values are also contemplated to be part of the invention. For example, rotating speeds of about 10,000 rpm-15,000 rpm, or 8,000 rpm-12,000 rpm are intended to be encompassed by the methods of the invention. In one embodiment, devices employing rotational motion may be rotated at a speed greater than about 1,000 rpm, greater than about 1,500 rpm, greater than about 2,000 rpm, greater than about 2,500 rpm, greater than about 3,000 rpm, greater than about 3,050 rpm, greater than about 3,100 rpm, greater than about 3,150 rpm, greater than about 3,200 rpm, greater than about 3,250 rpm, greater than about 3,300 rpm, greater than about 3,350 rpm, greater than about 3,400 rpm, greater than about 3,450 rpm, greater than about 3,500 rpm, greater than about 3,550 rpm, greater than about 3,600 rpm, greater than about 3,650 rpm, greater than about 3,700 rpm, greater than about 3,750 rpm, greater than about 3,800 rpm, greater than about 3,850 rpm, greater than about 3,900 rpm, greater than about 3,950 rpm, or greater than about 4,000 rpm.

The rotating structure 2216 may be rotated to impact the liquid material for a time sufficient to form a desired fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

The rotating structure 2216 may be configured in any suitable manner so that, upon rotation, the rotating structure 2116 contacts a surface of the liquid material supplied at the first end 2214 of the supply channel 2212 to impart sufficient force or energy to create a meniscus at the location where the rotating structure 2216 contacts the surface of the liquid material. The force or energy imparted by the rotating structure 2216 also decouples a portion of the liquid material at the meniscus and flings the portion away from the contact with the rotating structure 2216 and from the first end 2214 of the supply channel 2212, thereby forming a micron, submicron and/or nanometer dimension fiber. In an exemplary embodiment, the direction in which the liquid material is flung may be substantially the same as the tangential direction of motion of the point of the rotating structure that contacts the liquid material. The fiber may exit the body portion 2202 of the device through the orifice 2208 and into the body cavity.

Figure 38:
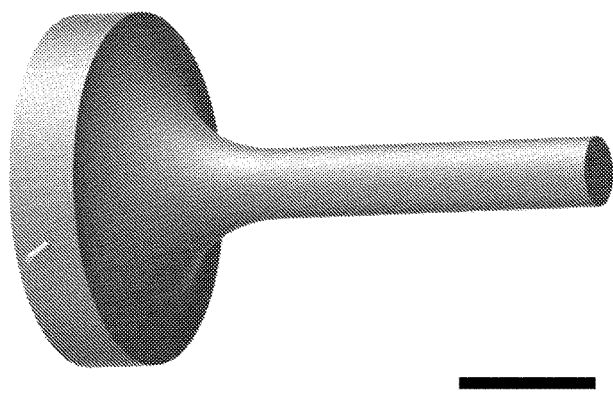
FIG. 38 is a CAD render of a mandrel which has one bristle. In this manifestation, the bristle is 350 μm in diameter and protrudes 2 mm from the surface of the mandrel, and the mandrel is 25 mm in diameter at the section closest to the bristle. Scale bar represents 2 cm.

In the exemplary embodiment illustrated in FIG. 22, the rotating structure 2216 may include a central core 2220 rotatable in a clockwise and/or counter-clockwise manner about a central axis of rotation R. The core 2220 may have a substantially cylindrical shape with a substantially circular cross-section having a center aligned along the axis of rotation R in one exemplary embodiment. The rotating structure 2216 may also include one or more protrusions 2222, e.g., in the form of blades, brushes, bristles, etc., affixed to the outer surface of the rotating core 2220. Exemplary rotating structures may include any suitable number of protrusions 2222 affixed to the core 2220 including, but not limited to, one protrusion to 100,000 protrusions. Some exemplary numbers of protrusions include, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, about 50 to about 100, about 100 to about 200, about 200 to about 300, about 300 to about 400, about 400 to about 500, and the like. Exemplary numbers of protrusions intermediate to the recited exemplary numbers are also part of the invention. The protrusions 2222 may be configured on the core 2220 in any suitable arrangement including, but not limited to, a regular multi-row or multi-column arrangement, an array arrangement, a circular arrangement, a random arrangement, and the like. An exemplary central core of a rotating structure, e.g., a mandrel, comprising a single protrusion for illustrative purposes is depicted in FIG. 38.

Each protrusion 2222 may have any suitable shape including, but not limited to, a substantially rectangular shaped protrusion, a saw shaped protrusion wherein the base of the protrusion at the core is wider than the tip farthest from the core, and the like. At high rotational speeds and/or in instances where broken protrusions would compromise the purity of the fibers, the saw shape may provide enhanced structural integrity to the protrusions and may prevent break-off of the protrusions during rotation.

Each protrusion 2222 may have any suitable height (taken perpendicular to the rotational axis R along the protrusion from the base to the tip of the protrusion, represented as H) including, but not limited to, about one nanometer to about ten centimeters. Some exemplary heights may include, but are not limited to, 0.1 cm, 0.2 cm, 0.3 cm, 0.4 cm, 0.5 cm, 0.6 cm, 0.7 cm, 0.8 cm, 0.9 cm, one cm, two cm, three cm, four cm, five cm, six cm, seven cm, eight cm, nine cm, ten cm, and the like. Exemplary heights intermediate to the above-recited exemplary values are also intended to be part of this invention.

Each protrusion 2222 may have any suitable length (taken along the rotational axis R, represented as L) including, but not limited to, about one nanometer to about fifty centimeters. Some exemplary lengths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary lengths intermediate to the above-recited exemplary values are also intended to be part of this invention.

Each protrusion 2222 may have any suitable width (taken as the thickness of the protrusion) including, but not limited to, about one nanometer to about five millimeters. Some exemplary widths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary widths intermediate to the above-recited exemplary values are also intended to be part of this invention.

In exemplary embodiments, the protrusion 2222 may penetrate the liquid material to any suitable depth for forming a fiber including, but not limited to, about one nanometer to about one centimeter. Some exemplary penetration depths include, but are not limited to, about one millimeter to about twenty milliliters, about twenty milliliters to about forty milliliters, about forty milliliters to about sixty milliliters, about sixty milliliters to about eighty milliliters, about eighty milliliters to about one hundred milliliters, about one centimeter, and the like. Exemplary penetration depths intermediate to the above-recited exemplary values are also intended to be part of this invention.

Exemplary aspect ratios of the width to the height of the protrusions may range from about 1:1 to about 1:100 in some exemplary embodiments. Some exemplary aspect ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary aspect ratios intermediate to the above-recited exemplary values are also intended to be part of this invention.

The protrusions 2222 may be formed of any suitable material including, but not limited to, titanium, stainless steel (e.g., 300 and 400 alloys), aluminum (e.g., 6061, 7075), polystyrene, polypropylene, (e.g., UHMW, HDPE, LDPE), ABS, acetal (copolymer and homopolymer), nylon, polycarbonate, polyether ether ketone, polymethyl methacrylate, polysulfone, polytetrafluoroethylene, polyvinylchloride, and the like.

The exemplary miniaturized fiber formation device 2200 may include a motion generator (not pictured) for rotating the rotating structure 2216 about the axis of rotation R. The motion generator may be used to control one or more aspects of the motion of the rotating structure 2216 including, but not limited to, activating and deactivating the rotating structure, timing of the activation and deactivation of the rotating structure, setting and/or changing the speed of the rotating structure, setting and/or changing the orientation of the rotational axis R of the rotating structure with reference to the rest of the device, and the like. In an exemplary embodiment, these aspects may be controlled in a real-time manner by a user as the device is being operated. In another exemplary embodiment, these aspects may also be controlled in a pre-programmed manner in which the motion generator is pre-programmed with instructions on how to control the rotating structure. Exemplary motion generators include, but are not limited to, an electric motor, a pneumatic motor, a microdrive motor, a dental drill, and the like. The exemplary motion generator may be coupled to one or more conduits having electrically conductive wiring for supplying electrical power to the motion generator from outside the body cavity. The conduits may also be used to conduct control instructions encoded, for example, in power signals, optical signals or in other signals, to control different aspects of the motion generator.

In an exemplary embodiment, the rotating structure 2216 may be activated a single time. In another exemplary embodiment, the rotating structure 2216 may be activated and rotated in two or more separate sessions or continuously.

In an exemplary embodiment, the motion generator may not alter the orientation of the rotational axis R of the rotating structure with reference to the rest of the device, such that the device forms fibers aligned substantially along the same direction. In another exemplary embodiment, the motion generator may alter one or more times the orientation of the rotational axis R of the rotating structure with reference to the rest of the device. This adjusts the direction along which the protrusions 2222 impart force to the liquid material, and cause the fibers to be formed substantially along two or more directions. The fibers formed substantially along two or more directions may be configured to form a desired multi-fiber structure, e.g., meshes, mats, scaffolds, etc., having a desired spacing between overlapping fibers.

In an exemplary embodiment, the motion generator may move the rotating structure closer to or farther away from the first end 2214 of the supply channel 2212, so that the depth of penetration of the protrusions 2222 into the liquid material is, respectively, increased or decreased.

In an exemplary embodiment, the motion generator may be miniaturized. For example, the motion generator may be housed within the insertion portion 2210 of the device 2200. In another exemplary embodiment, the motion generator may be non-miniaturized and may remotely control the motion of the rotating structure 2216 from outside the body cavity, e.g., through cables or a rotating rod. An exemplary rod extending between an external motion generator and a motion generator to be inserted into a body cavity may be formed of a medical grade stainless steel (e.g., 316 alloy). Thus, a larger and more powerful motion generator may still be used to spin fibers inside a small body cavity using a miniaturized rotating structure 2216.

The exemplary miniaturized fiber formation device 2200 may include one or more collection devices that may be miniaturized or non-miniaturized. The collection device may be stationary or may move in a rotational manner, a linear manner, or a combination of rotational and linear motions. The collection device may be an inert object or a living organism. In an exemplary miniaturized device used for laparoscopic procedures, an exemplary collection device may be a wound, a muscle, or any other body cavity or organ. In an exemplary embodiment in which the collection device is a cavity in an animal body, the cavity may be expanded to create space for surgical work and to create desirable environmental conditions for the surgery. In exemplary embodiments, the cavity may be expanded using one or more gases, e.g., carbon dioxide, and/or using one or more mechanical components, e.g., expandable spheres, expandable rods.

Figure 37:
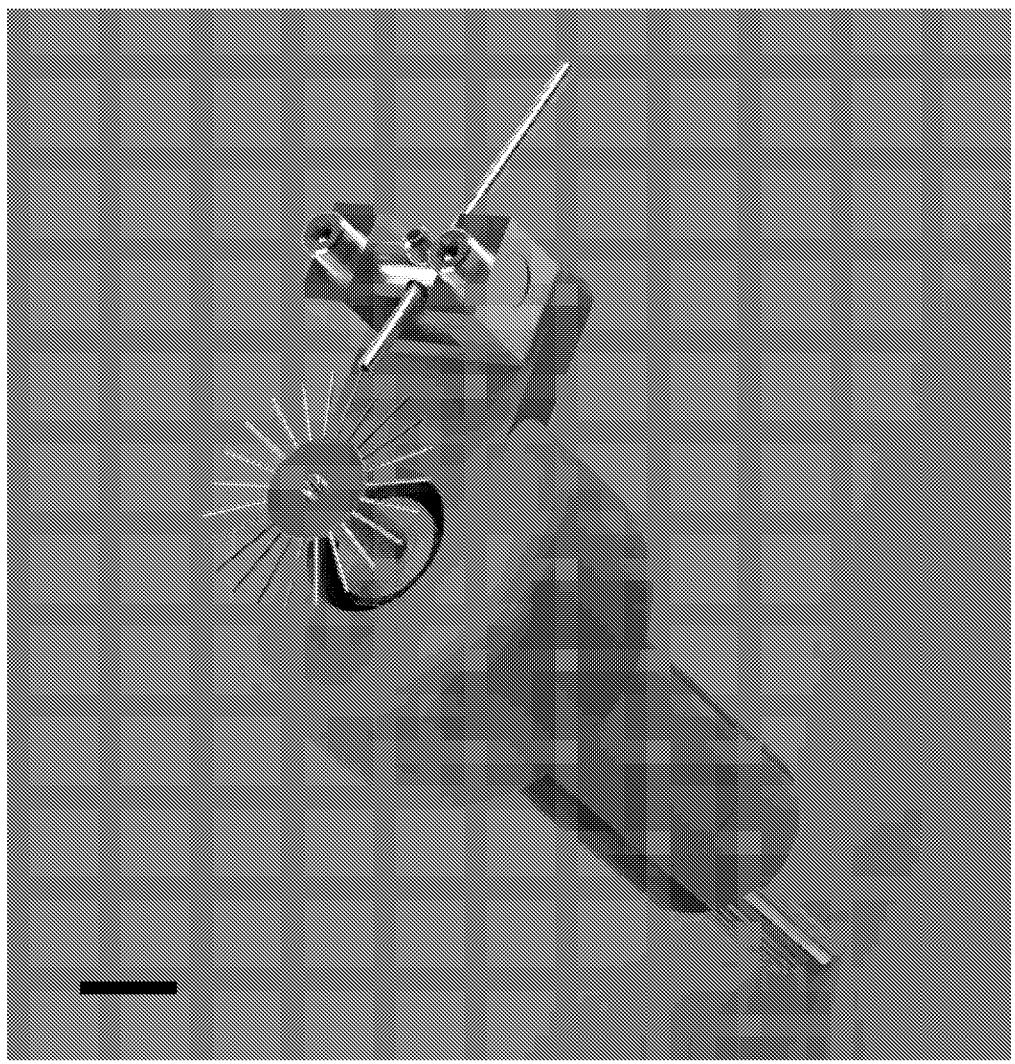
FIG. 37 depicts a conceptual design for a handheld polymeric fiber device. A rotary motor (electric or pneumatic) is coupled to a mandrel in which one or many bristles extend. A polymer solution is fed into the bristle path, resulting in micro- to nano-meter sized fibers. Scale bar represents 2 cm.
Figure 39:
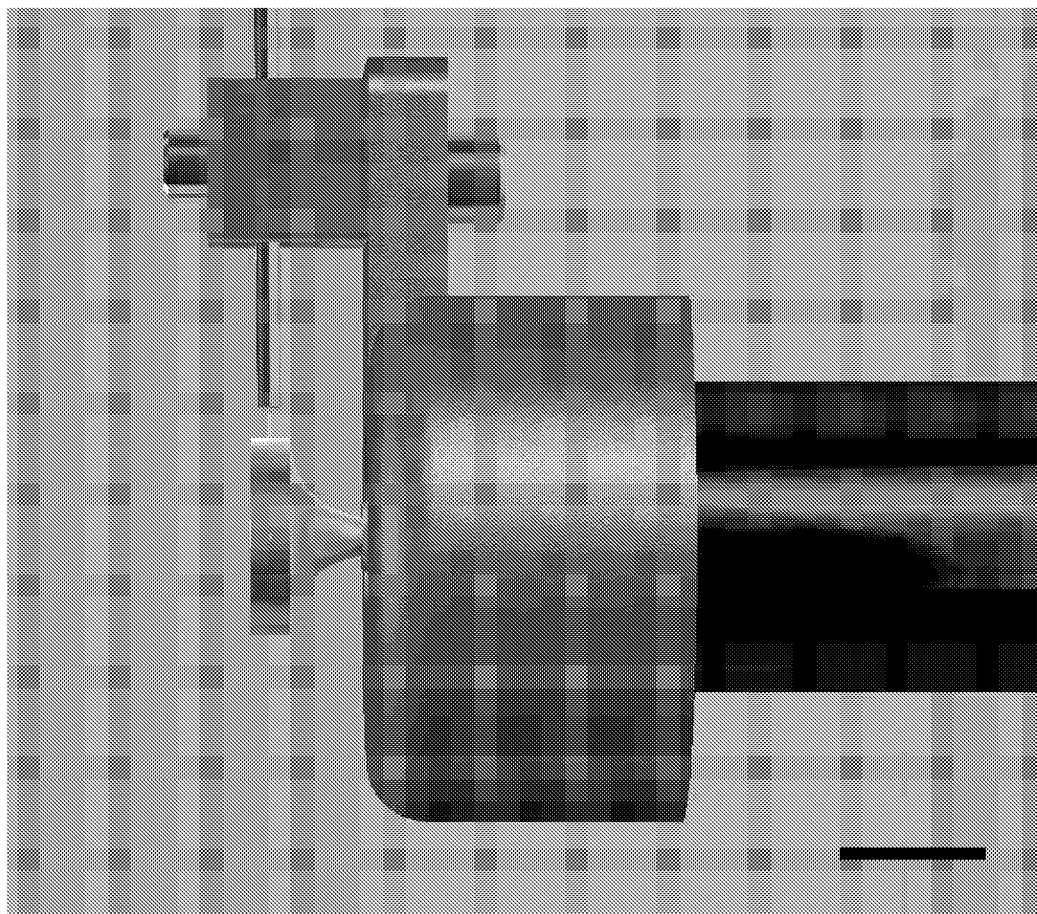
FIG. 39 depicts a side view of the conceptual design for a handheld polymeric fiber device. In this manifestation, the tube which provides the polymer solution can be adjusted to vary the penetration depth of the bristles into the polymer droplet. Scale bar represents 2 cm.
Figure 40:
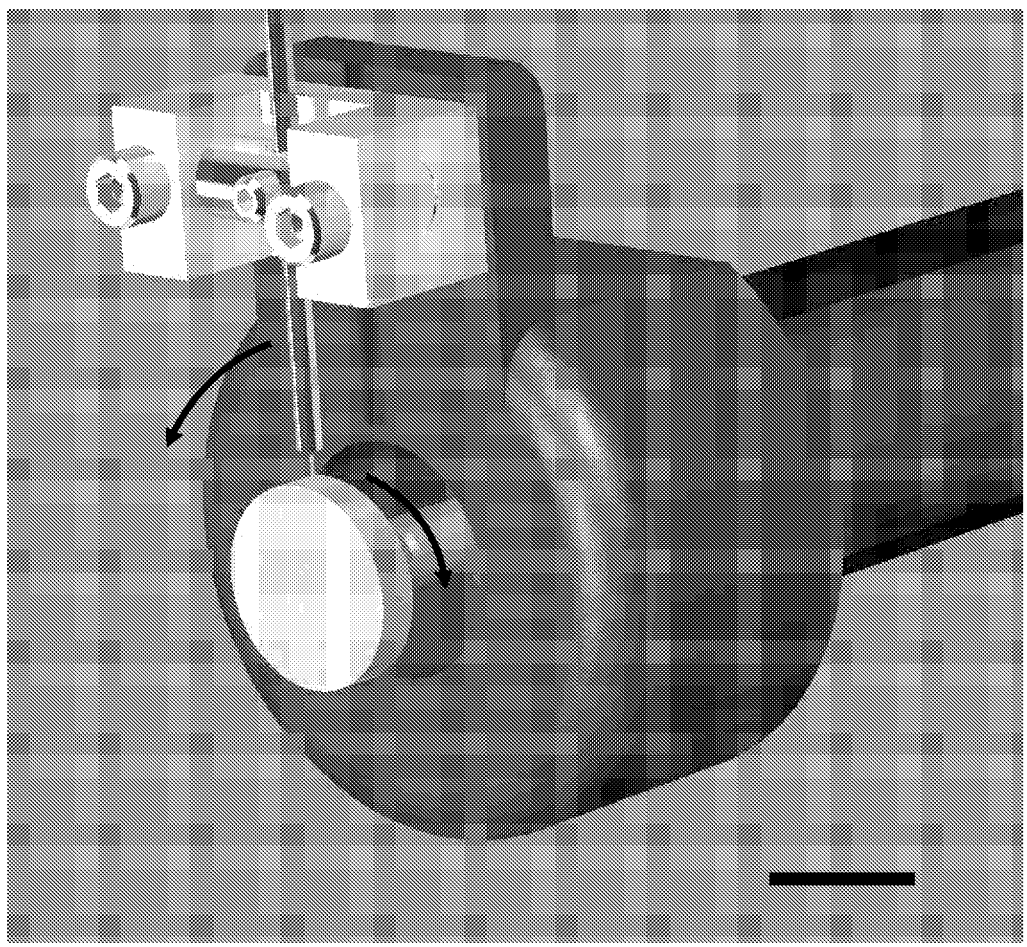
FIG. 40 is an isometric view of the conceptual design for a handheld polymeric fiber device. In this manifestation, the tube which provides the polymer solution can be adjusted to vary the penetration depth of the bristles into the polymer droplet. Arrows represent resulting fiber trajectory, depending on the motor rotation direction. Scale bar represents 2 cm.

Additional exemplary miniaturized devices sufficiently small to fit within the palm of a human hand are depicted in FIGS. 37, 39, and 40. FIG. 37 provides a perspective of an exemplary fiber forming device in which a rotary motor (electric or pneumatic) is coupled to a mandrel in which one or many bristles extend. A polymer solution is fed into the bristle path, resulting in micro- to nanometer sized fibers. FIG. 39 provides a side view of the exemplary fiber forming device depicted in FIG. 37 in showing a tube which provides the polymer solution can be adjusted to vary the penetration depth of the bristles into the polymer droplet. FIG. 40 provides an isometric view of the exemplary fiber forming device depicted in FIG. 37 in which the tube which provides the polymer solution can be adjusted to vary the penetration depth of the bristles into the polymer droplet.

In some exemplary embodiments, a gas may be introduced to the liquid material to facilitate formation of a meniscus at the liquid material which, in turn, facilitates decoupling and flinging of a portion of the liquid material by the rotating structure. Exemplary gases include, but are not limited to, air, carbon dioxide, and the like. In an exemplary embodiment, the gas may be introduced into the liquid material before the liquid material is supplied into the device, for example, by carbonation of the liquid material. In another exemplary embodiment, the miniaturized fiber formation device 2200 may include a gas supply channel (not pictured) for introducing a gas to the liquid material from outside the body cavity. In an exemplary embodiment, the gas supply channel may provide a one-time, intermittent or continual supply of the gas during the operation of the device. The outer diameter of the gas supply channel may be suitably small in order for insertion into the body, for example, through a catheter or opening in the body. A first end of the gas supply channel proximal to the body cavity may open on or in the vicinity of the first end 2214 of the supply channel 2212 to introduce the gas to the liquid material. A second end of the gas supply channel distal to the body cavity may be coupled to another gas supply channel or to a storage device holding the gas. The gas may be introduced to the liquid material before or during the time that the rotating structure 2216 imparts a force to the surface of the liquid material in order to form a fiber.

In some exemplary embodiments, one or more agents may be introduced to the liquid material so that the resulting fibers contain the agent. Exemplary agents include, but are not limited to, any suitable biologically active agent, e.g., lipophilic peptides, lipids, nucleotides, proteins, drugs, pharmaceutically active agents, biocidal agents, antimicrobial agents, and the like. In an exemplary embodiment, the agent may be introduced into the liquid material before the liquid material is supplied into the device. In another exemplary embodiment, the miniaturized fiber formation device 2200 may include an agent supply channel (not pictured) for introducing an agent to the liquid material from outside the body cavity before or during fiber formation.

The components of exemplary miniaturized fiber formation devices that are inserted into a body cavity are typically sterilized before insertion into the body cavity. In exemplary embodiments, the insertable components of an exemplary miniaturized fiber formation device or the entirety of an exemplary miniaturized fiber formation device may be formed of materials that may be sterilized without degradation, e.g., by autoclaving, using UV light, using ethylene oxide sterilization, etc.

The small sizes of exemplary miniaturized fiber formation devices allow insertion into a body cavity, for example, through a wound, a surgical incision, a catheter, a port, or a main artery. Exemplary devices may be used for in vivo manufacturing of organs or tissues. Exemplary devices may be used to build a cylindrical organ, cavity filling tissue, organ banding, etc. Exemplary devices may be used for modular assembly of a tissue construct. Tissue or organ sections may be assembled from varying positions or at varying times using exemplary devices.

Exemplary miniaturized fiber formation devices may have many applications including, but not limited to, use in closing wounds, laparoscopic procedures, in vivo manufacturing of organs or tissues, miniaturization for surgical applications, mass production of protein fibers, mass production of ultra strong protein fibers, bio-functional fibrous scaffolds for in vitro tissue engineering applications, bio-functional fibrous scaffolds for in vivo tissue engineering applications, bio-functional suture threads, ultra-strong fiber and fabric production, bio-functional protein or polymer filters, protective clothing or coverings, etc.

Exemplary miniaturized fiber formation devices may be used for non-medical or biologic applications such as fiber reinforcing small cavities on high performance sporting, or military equipment, ultra-small fibrous constructs, or large delicate constructs where very small disruptions to the structure are necessary to deliver fibrous coatings. Exemplary devices may be adapted into handheld devices for at home or forward deployable fiber fabrication for customizable wound dressings or fabrics.

V. Exemplary Hand-Held Fiber Formation Devices

Exemplary embodiments provide hand-held systems and devices for forming micron, submicron and/or nanometer dimension fibers using one or more rotating structures.

In an exemplary embodiment, the exemplary device 2200 of FIG. 22 may be used in a hand-held manner to form fibers. The insertion portion 2210 may be configured for gripping by a user in order direct the body portion 2202 in a desired direction and orientation for forming fibers. The exemplary features of the device 2200 are described with reference to FIG. 22.

In an exemplary embodiment, the hand-held device 2200 may be a miniaturized device. In another exemplary embodiment, the hand-held device 2200 may be a non-miniaturized device.

In some exemplary embodiments, a rotating structure may include one or more protrusions affixed to the outer surface of the rotating structure. Sufficient rotational speeds and times for operating the devices of the invention to form a fiber may be dependent on the concentration of the material and the desired features of the formed fiber. Exemplary speeds of rotation of the rotating structure may range from about 100 rpm to about 500,000 rpm, although rotational speeds are not limited to this exemplary range. Certain exemplary devices employing rotational motion may be rotated at a speed of about 1,000 rpm-50,000 rpm, about 1,000 rpm to about 40,000 rpm, about 1,000 rpm to about 20,000 rpm, about 5,000 rpm-20,000 rpm, about 5,000 rpm to about 15,000 rpm, or about 1,000, 1,500, 2,000, 2,500, 3,000, 3,500, 4,000, 4,500, 5,000, 5,500, 6,000, 6,500, 7,000, 7,500, 8,000, 8,500, 9,000, 9,500, 10,000, 10,500, 11,000, 11,500, 12,000, 12,500, 13,000, 13,500, 14,000, 14,500, 15,000, 15,500, 16,000, 16,500, 17,000, 17,500, 18,000, 18,500, 19,000, 19,500, 20,000, 20,500, 21,000, 21,500, 22,000, 22,500, 23,000, 23,500, or about 24,000 rpm. Ranges and values intermediate to the above recited ranges and values are also contemplated to be part of the invention. For example, rotating speeds of about 10,000 rpm-15,000 rpm, or 8,000 rpm-12,000 rpm are intended to be encompassed by the methods of the invention. In one embodiment, devices employing rotational motion may be rotated at a speed greater than about 1,000 rpm, greater than about 1,500 rpm, greater than about 2,000 rpm, greater than about 2,500 rpm, greater than about 3,000 rpm, greater than about 3,050 rpm, greater than about 3,100 rpm, greater than about 3,150 rpm, greater than about 3,200 rpm, greater than about 3,250 rpm, greater than about 3,300 rpm, greater than about 3,350 rpm, greater than about 3,400 rpm, greater than about 3,450 rpm, greater than about 3,500 rpm, greater than about 3,550 rpm, greater than about 3,600 rpm, greater than about 3,650 rpm, greater than about 3,700 rpm, greater than about 3,750 rpm, greater than about 3,800 rpm, greater than about 3,850 rpm, greater than about 3,900 rpm, greater than about 3,950 rpm, or greater than about 4,000 rpm.

An exemplary rotating structure may be rotated to impact the liquid material for a time sufficient to form a desired fiber, such as, for example, about 1 minute to about 100 minutes, about 1 minute to about 60 minutes, about 10 minutes to about 60 minutes, about 30 minutes to about 60 minutes, about 1 minute to about 30 minutes, about 20 minutes to about 50 minutes, about 5 minutes to about 20 minutes, about 5 minutes to about 30 minutes, or about 15 minutes to about 30 minutes, about 5-100 minutes, about 10-100 minutes, about 20-100 minutes, about 30-100 minutes, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 minutes, or more. Times and ranges intermediate to the above-recited values are also intended to be part of this invention.

In some exemplary embodiments, a rotating structure may include two or more of the same type of protrusion, e.g., protrusions having the same shape and size. In some other exemplary embodiments, a rotating structure may include two or more of different types of protrusions, e.g., protrusions having different shapes and/or different sizes. Exemplary protrusions may penetrate a surface of a liquid material to a desired penetration depth. Exemplary depths of penetration may range from about one nanometer to about one centimeter, but are not limited to this range. Some exemplary penetration depths include, but are not limited to, about one millimeter to about twenty milliliters, about twenty milliliters to about forty milliliters, about forty milliliters to about sixty milliliters, about sixty milliliters to about eighty milliliters, about eighty milliliters to about one hundred milliliters, about one centimeter, and the like. Exemplary penetration depths intermediate to the above-recited exemplary values are also intended to be part of this invention.

Each protrusion may have any suitable shape including, but not limited to, a substantially rectangular shaped protrusion, a saw shaped protrusion wherein the base of the protrusion at the core is wider than the tip farthest from the core, and the like. At high rotational speeds and/or in instances where broken protrusions would compromise the purity of the fibers, the saw shape may provide enhanced structural integrity to the protrusions and may prevent break-off of the protrusions during rotation.

Each protrusion may have any suitable height (taken perpendicular to the rotational axis R along the protrusion from the base to the tip of the protrusion, represented as H) including, but not limited to, about one nanometer to about ten centimeters. Some exemplary heights may include, but are not limited to, 0.1 cm, 0.2 cm, 0.3 cm, 0.4 cm, 0.5 cm, 0.6 cm, 0.7 cm, 0.8 cm, 0.9 cm, one cm, two cm, three cm, four cm, five cm, six cm, seven cm, eight cm, nine cm, ten cm, and the like. Exemplary heights intermediate to the above-recited exemplary values are also intended to be part of this invention.

Each protrusion may have any suitable length (taken along the rotational axis R, represented as L) including, but not limited to, about one nanometer to about fifty centimeters. Some exemplary lengths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary lengths intermediate to the above-recited exemplary values are also intended to be part of this invention.

Each protrusion may have any suitable width (taken as the thickness of the protrusion) including, but not limited to, about one nanometer to about five centimeters. Some exemplary widths may include, but not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary widths intermediate to the above-recited exemplary values are also intended to be part of this invention.

In an exemplary embodiment in which a protrusion has a substantially conical shape in which the circular face of the cone contacts a rotating structure, the circular face of the protrusion may have an exemplary diameter ranging from about 1 micrometer to about 50 centimeters. Some exemplary diameters may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary diameters intermediate to the above-recited exemplary values are also intended to be part of this invention.

In an exemplary embodiment in which a rectangular face of a protrusion contacts a rotating structure, the rectangular face may have an exemplary length and/or width ranging from about 1 micrometer to about 50 centimeters. Some exemplary lengths and/or widths may include, but are not limited to, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 cm, and the like. Exemplary lengths and/or widths intermediate to the above-recited exemplary values are also intended to be part of this invention.

In exemplary embodiments, the aspect ratio of the height to the width or the height to the length of an exemplary protrusion may range from about 1:1 to about 100:1. Some exemplary aspect ratios may include, but are not limited to, 1:1, 5:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 100:1, and the like. Exemplary aspect ratios intermediate to the above-recited exemplary values are also intended to be part of this invention.

Exemplary protrusions may be formed of any suitable material including, but not limited to, titanium, stainless steel (e.g., 300 and 400 alloys), aluminum (e.g., 6061, 7075), polystyrene, polypropylene, (e.g., UHMW, HDPE, LDPE), ABS, acetal (copolymer and homopolymer), nylon, polycarbonate, polyether ether ketone, polymethyl methacrylate, polysulfone, polytetrafluoroethylene, polyvinylchloride, and the like.

Exemplary fibers formed by exemplary hand-held systems and devices may range in diameter from about one nanometer to about 100 microns, but are not limited to this exemplary range.

VI. Configuration of Existing Devices with Exemplary Fiber Formation Systems and Devices Existing systems and devices may be configured and customized to include one or more components of an exemplary fiber formation device for formation of micron, submicron and/or nanometer fibers. In an exemplary embodiment, an exemplary fiber formation device may be coupled to a surgical tool for insertion into a body cavity and may be used to form fibers in the body cavity.

Figure 23:
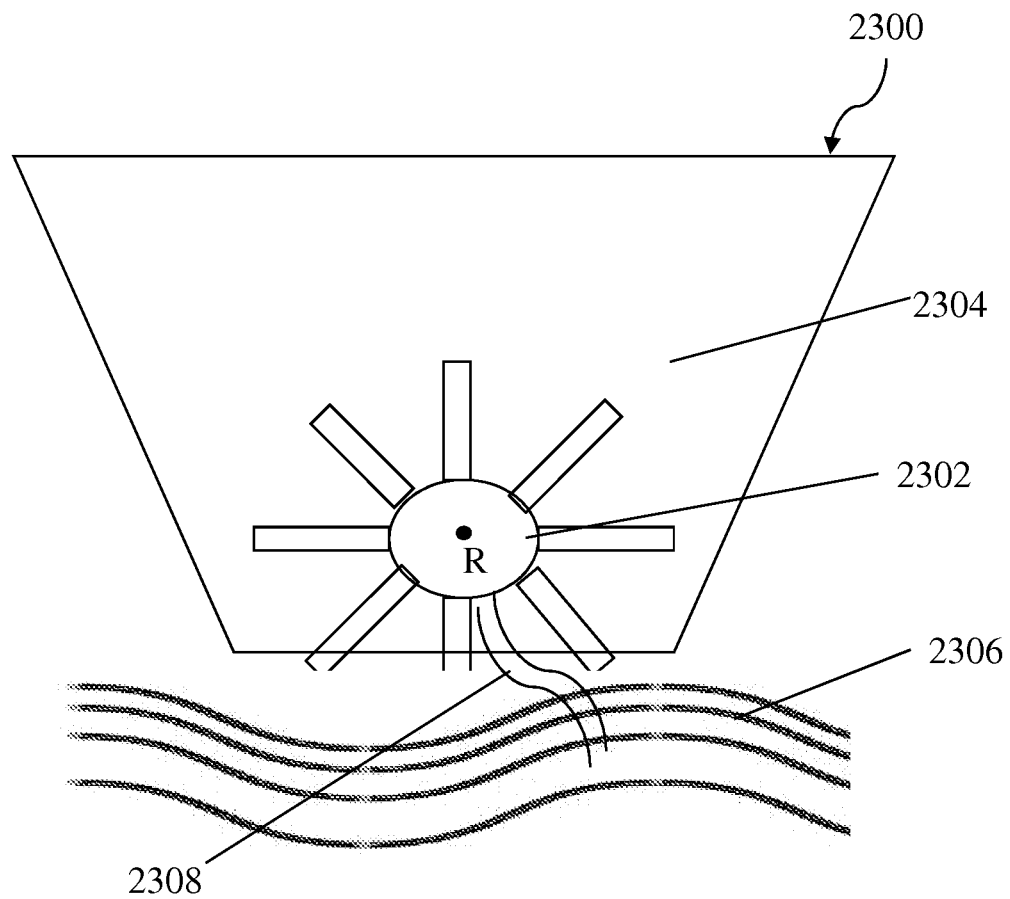
FIG. 23 illustrates an exemplary vessel that may be customized by attachment of one or more exemplary rotating structures provided in accordance with exemplary embodiments.

In another exemplary embodiment illustrated in FIG. 23, an exemplary fiber formation device or one or more components of an exemplary fiber formation device may be attached to an existing system that may be disposed over and/or in contact with a liquid for forming fibers from the liquid. Exemplary existing systems may include, but are not limited to, a boat, a ship, a platform that may float or be provided over the liquid, a vehicle that may travel of a deposit of the liquid, and the like.

FIG. 23 illustrates an exemplary vessel 2300 that may be customized by attachment of one or more exemplary rotating structures 2302 to an outer surface of the vessel 2300, for example, to a face 2304 of the vessel 2300. One or more supply channels 2308 may be provided with the vessel 2300 so that one or more liquid materials (e.g., a polymer melt, polymer solution, and the like) may be supplied to the outside of the vessel 2300. In an exemplary embodiment, an exemplary volume of the liquid material provided for fiber formation may range from about one microliter to about 100 liters. Some exemplary volumes include, but are not limited to, about one liter to about 100 liters, about 1 liter to about 20 liters, about 20 liters to about 40 liters, about 40 liters to about 60 liters, about 60 liters to about 80 liters, about 80 liters to about 100 liters, but are not limited to these exemplary ranges. Exemplary volumes intermediate to the recited volumes are also part of the invention.

In an exemplary embodiment, the vessel 2300, e.g., a boat or other vehicle, may float or be provided over a liquid 2306, for example, a hydrocarbon liquid (e.g., oil). During operation of the vessel 2300, the polymer material may be supplied to the liquid 2306 through the supply channel 2308. The rotating structure 2302—which may contact the surface of the liquid 2306—may be rotated at a suitable speed and around rotational axis R so that the rotation of the rotating structure 2302 imparts a force to the polymer material floating on top of the liquid 2306. This may cause formation of fibers from the polymer material, as described above with reference to FIGS. 1A-1C. In an exemplary embodiment, the fibers may be formed in a suitable two-dimensional structure, e.g., mesh, mat, and the like, with a desired spacing between overlapping fibers. The fiber structure may absorb part or all of the liquid 2308 within the spacings between overlapping fibers.

Exemplary rotating structure 2302 may be coupled to a motion generator (not pictured) that imparts the rotational motion to the rotating structure 2302. The motion generator may also impart a lateral motion to the rotating structure 2302, for example, to lower and raise the rotating structure from the liquid surface 2306, to alter the rotational axis R of the rotating structure 2302 relative to the liquid surface 2306, and the like. An exemplary motion generator may be coupled to a control device that controls one or more aspects of the motion of the rotating structure. An exemplary motion generator may be coupled to a source of electrical power to power its motion.

In an exemplary application of the exemplary vessel 2300 of FIG. 23, an undesirable leak of a liquid (e.g., oil) on a hard surface (e.g., a road) or a water body (e.g., a lake) may be cleaned up using the exemplary customized vessel 2300. For example, as the customized vessel 2300 floats on a water body, the supply channel 2308 may supply a polymer material to the surface of the oil and the rotating structure 2302 attached to the vessel 2300 may be operated to form fibers from the polymer material. The formed fibers may absorb the oil floating on the surface of the water body, and may subsequently be removed from the surface of the water body, e.g., using a net.

VII. Combination of Exemplary Embodiments with Air Jet-Spinning Vessels and Air Foils Any of the exemplary fiber formation devices, systems and methods described herein may be used in combination with an air jet-spinning vessel as described in connection with FIGS. 8-12 of U.S. Provisional Patent Application Ser. No. 61/414,674, filed Nov. 17, 2010, the entire contents of which are incorporated herein in their entity by reference.

Any of the exemplary fiber formation devices, systems and methods described herein may be used in combination with an air foil as described in connection with FIGS. 13-17 of U.S. Provisional Patent Application Ser. No. 61/414,674, filed Nov. 17, 2010, the entire contents of which are incorporated herein in their entity by reference.

Any of the exemplary fiber formation devices, systems and methods described herein may be used in combination with an air jet-spinning vessel as described in connection with FIGS. 8-12 and in combination with an air foil as described in connection with FIGS. 13-17 of U.S. Provisional Patent Application Ser. No. 61/414,674, filed Nov. 17, 2010, the entire contents of which are incorporated herein in their entity by reference.

VIII. Exemplary Micron, Submicron, and Nanometer Dimension Fibers

Any of the exemplary fiber formation devices, systems and methods described herein may be used to form one or more micron, submicron and/or nanometer dimension fibers. In one embodiment, the devices, systems and methods of the invention result in the fabrication of micron, submicron and/or nanometer dimension polymeric fiber having a diameter of about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 33, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, 10, 20, 30, 40, or about 50 micrometers.

The polymeric fibers formed using the methods and devices of the invention may be of any length. Some exemplary fiber lengths may include, but are not limited to, one nm to about 100 nm, about 1 mm to about 100 mm, 1 cm to about 100 cm, 1 foot to about 100 feet, 1 yard to about 100 yards, and the like. Exemplary fiber lengths intermediate to the recited lengths are also part of the invention.

In one embodiment, the length of the polymeric fibers is dependent on the length of time the device is in motion and/or the amount of polymer fed into the system. Additionally, the polymeric fibers may be cut to a desired length using any suitable instrument.

In one embodiment of the invention, a plurality of micron, submicron and/or nanometer dimension polymeric fibers are formed. The plurality of micron, submicron and/or nanometer dimension polymeric fibers may be of the same diameter or of different diameters. In exemplary embodiments, the spatial and hierarchical structure of the fibers formed by exemplary fiber formation devices, systems and methods may be configured by controlling one or more factors including, but not limited to, the rotational speed of a rotating structure, the concentration of the liquid material, the viscosity of the liquid material, the molecular weight of the liquid material, the volatility of the solvent of the liquid material, and the like.

In one embodiment, the methods of the invention result in the fabrication of a plurality of aligned (e.g., uniaxially aligned) micron, submicron and/or nanometer dimension polymeric fibers.

The fibers produced according to the methods disclosed herein can be, for example, used as extracellular matrix and, together with cells, may also be used in forming engineered tissue. Such tissue is useful not only for the production of prosthetic devices and regenerative medicine, but also for investigating tissue developmental biology and disease pathology, as well as in drug discovery and toxicity testing. The polymeric fibers of the invention may also be combined with other substances, such as, therapeutic agents, in order to deliver such substances to the site of application or implantation of the polymeric fibers. The polymeric fibers produced according to the methods disclosed herein may also be used to generate food products, membranes and filters.

Exemplary fibers formed using exemplary fiber formation devices, systems and methods have numerous applications and advantages. For example, exemplary fiber formation devices, systems and methods may be used to create three-dimensional tissue engineered scaffolds directly from extracellular matrix proteins without hazardous effects and interruption in protein biological activities. Exemplary fiber formation devices, systems and methods may be used to integrate living cells into these micro- and nano-scale polymeric scaffolds to generate cell-encapsulated threads which is not feasible using other technique of nanofiber fabrication known in the art. Exemplary fiber formation devices, systems and methods may be used to fabricate nanofiber assemblies from small quantities of polymer liquids. Exemplary fiber formation devices, systems and methods may be used to fabricate nanofiber assemblies from polymer melts as well as polymer solutions due to the independence of the methods and devices of the present invention on solution conductivity. Exemplary fiber formation devices, systems and methods may be used to fabricate nanofibers from in-situ cross-linked polymer solutions due to the high rate of nanofiber production.

In an exemplary embodiment, fibers formed by exemplary fiber formation devices, systems and methods may be contacted with a plurality of living cells. Exemplary fiber formation devices and systems may include mechanisms for adding the living cells to the material before and/or during the fiber formation process and/or to the fibers after the fiber formation process. Exemplary living cells that may be used include, but are not limited to, stem cells, muscle cells, neuronal cells, endothelial cells, epithelial cells, and the like. The living cells may be mixed in with the liquid material before, during and/or after the fiber formation process to produce cell-encapsulated fibers. The living cells may be cultured such that a living tissue is produced. The contacted fibers may be cultured in an appropriate medium.

In an exemplary embodiment, fibers formed by exemplary fiber formation devices, systems and methods may be contacted with one or more biologically active agents. Exemplary fiber formation devices and systems may include mechanisms for adding the agents to the material before and/or during the fiber formation process and/or to the fibers after the fiber formation process. Exemplary agents that may be used include, but are not limited to, lipophilic peptides, lipids, nucleotides, proteins, drugs, biocidal agents, antimicrobial agents, and the like. The agents may be mixed in with the liquid material before, during and/or after the fiber formation process to produce agent-covered fibers. The contacted fibers may be configured into a mat and/or mesh structure to form a microbial and biological protective textile.

In an exemplary embodiment, fibers formed by exemplary fiber formation devices, systems and methods may be contacted with one or more pharmaceutically active agents. Exemplary fiber formation devices and systems may include mechanisms for adding the agents to the material before and/or during the fiber formation process and/or to the fibers after the fiber formation process. The agents may be mixed in with the liquid material before, during and/or after the fiber formation process to produce agent-covered fibers. The contacted fibers may be configured into a mat and/or mesh structure to form a microbial and biological protective textile.

Exemplary micron, submicron and/or nanometer dimension fibers formed by exemplary devices, systems and methods may have any suitable application including, but not limited to, use in tissue engineering, delivery of a therapeutic agent, controlled release of a therapeutic agents, use in a drug delivery device, use in wound dressing, use in enzyme immobilization, use in a biosensor, forming a membrane, forming a filter, forming a fiber, forming a net, forming a food item, forming a medicinal item, forming a cosmetic item, forming a fiber structure inside a body cavity, and the like.

Mat, mesh and/or woven structures formed with exemplary fibers may be used in non-lethal weapons, for example, nets.

Exemplary embodiments may be used to form fibers that are implanted into a body, for example, as a cell delivery device. Exemplary applications of implantable fibers include, but are not limited to, cell delivery devices, cell stability devices, biological pacemakers, etc. Natural polymers, synthetic polymers, protein fibers, etc., may be used to form the threads using exemplary fiber formation devices. The threads may be functionalized to aid in reducing an immune response and in promoting cell viability and integration.

The fibers produced according to the methods disclosed herein can be, for example, used as extracellular matrix and, together with cells, may also be used in forming engineered tissue. Such tissue is useful not only for the production of prosthetic devices and regenerative medicine, but also for investigating tissue developmental biology and disease pathology, as well as in drug discovery and toxicity testing. The polymeric fibers of the invention may also be combined with other substances, such as, therapeutic agents, in order to deliver such substances to the site of application or implantation of the polymeric fibers. The polymeric fibers produced according to the methods disclosed herein may also be used to generate food products, membranes and filters.

In another aspect, the present invention provides methods for identifying a compound that modulates a tissue function.

The methods include, providing a tissue produced using the devices of the invention and according to the methods of the invention; contacting the tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound that modulates a tissue function.

In yet another aspect, the present invention provides methods for identifying a compound useful for treating or preventing a tissue disease. The methods include, providing a tissue produced using the devices of the invention and according to the methods of the invention; contacting the tissue with a test compound; and determining the effect of the test compound on a tissue function in the presence and absence of the test compound, wherein a modulation of the tissue function in the presence of said test compound as compared to the tissue function in the absence of the test compound indicates that the test compound modulates a tissue function, thereby identifying a compound useful for treating or preventing a tissue disease.

The tissue function may be any suitable physiological activity associate with the particular tissue type, e.g., a biomechanical activity, e.g., contractility, cell stress, cell swelling, and rigidity, or an electrophysiological activity.

In one embodiment, the methods include applying a stimulus to the tissue.

In another embodiment, a plurality of living tissues are contacted with a test compound simultaneously.

Exemplary fiber formation devices may be used to form fibers that are thermally conductive and that may be used to conduct thermal energy, i.e., heat. Exemplary fiber formation devices may be used to form fibers that are magnetically reactive. Examples of magnetically active materials that may be used to form fibers include, but are not limited, to ferrofluids (colloidal suspensions of magnetic particles) and various dispersions of electrically conducting polymers. Ferrofluids containing particles approximately 10 nanometers in diameter, polymer-encapsulated magnetic particles about 1-2 microns in diameter, and polymers with a glass transition temperature below room temperature are particularly useful.

Exemplary fiber formation devices may be used to form fibers that are electrically conductive and that may be used to conduct electrical energy, e.g., as wires. The fibers formed may include conductive particles, e.g., particles of metal like gold, that impart an electrically conductive property to the fibers. In an exemplary embodiment, the material solution used to form the fibers may include the conductive particles. In another exemplary embodiment, the conductive particles may be integrated into the fibers as the fibers are being formed and/or after formation. Examples of electrically active materials that may be used to form fibers are polymers including, but not limited to, electrically conducting polymers such as polyanilines and polypyrroles, ionically conducting polymers such as sulfonated polyacrylamides are related materials, and electrical conductors such as carbon black, graphite, carbon nanotubes, metal particles, and metal-coated plastic or ceramic materials.

In an exemplary embodiment, the fibers may have a fixed electrical impedance. In another exemplary embodiment, the fibers may have a variable electrical impedance. In an exemplary embodiment, the structural configuration of the fibers may be adjusted to vary the electrical impedance. For example, the fiber structure may be squeezed together before use or during use to increase the concentration of the conductive particles, which decreases the electrical impedance, and vice versa.

Exemplary conductive fibers formed by exemplary fiber formation devices may be used in various electrically conductive applications including, but not limited to, integrated circuits, medical devices that are supplied with electrical power, etc.

Some exemplary fibers produced according to the methods of the invention and using exemplary devices of the invention are illustrated and described in connection with FIGS. 24-28 and 41-43. However, fibers formed by exemplary embodiments are not limited to the illustrative embodiments shown in FIGS. 24-28 and 41-43.

Figure 24A:
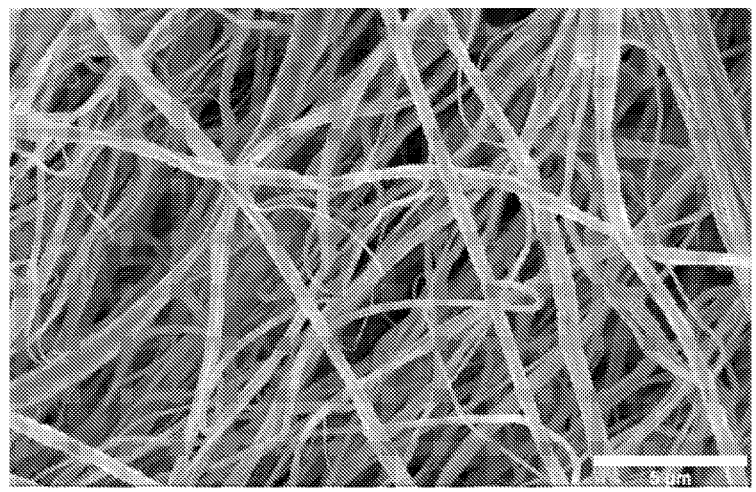
FIG. 24A illustrates a scanning electron micrograph (SEM) image of fibers having an exemplary mean diameter of about 340.5 nanometers formed by an exemplary fiber formation device.

FIG. 24A illustrates a scanning electron micrograph (SEM) image of fibers having an exemplary mean diameter of about 340.5 nanometers formed by an exemplary fiber formation device. The fibers are formed of a polylactic acid (PLA) solution including about 8% by weight of PLA in chloroform ($CHCl_3$). The exemplary fibers were formed by an exemplary device fiber formation device including a rotating structure provided with saw-shaped protrusions.

Figure 24B:
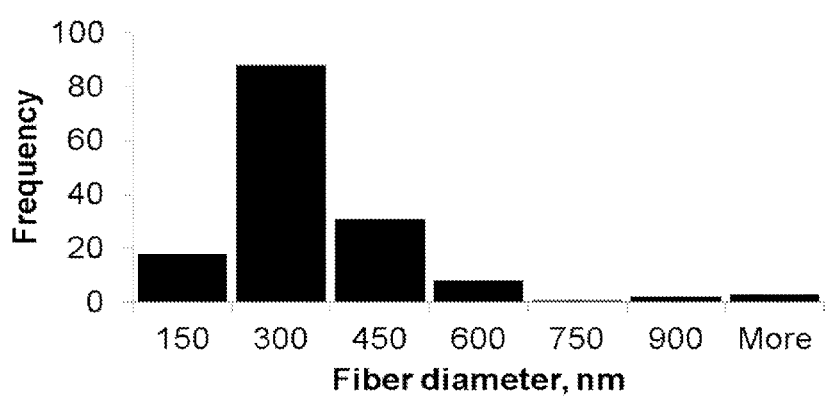
FIG. 24B illustrates a histogram corresponding to the fibers of FIG. 24A of the frequency (along the y-axis) of the number of fibers having different mean fiber diameters in nanometers (along the x-axis).

Exemplary mean diameters of the fibers illustrated in FIG. 24A range from about 150 nanometers to about 900 nanometers and higher. FIG. 24B illustrates a histogram corresponding to the fibers of FIG. 24A of the frequency (along the y-axis) of the number of fibers having different mean fiber diameters in nanometers (along the x-axis). The mean diameter over all of the fibers formed is about 340.5 nanometers.

Figure 25A:
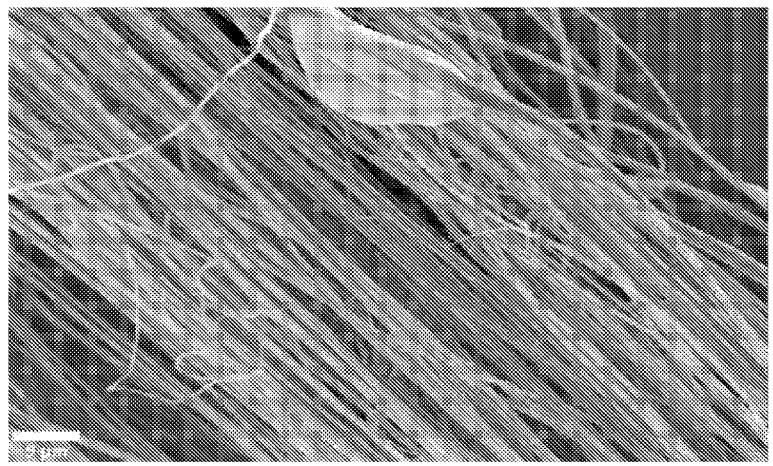
FIG. 25A illustrates a scanning electron micrograph (SEM) image of fibers having an exemplary mean diameter of about 416 nanometers formed by an exemplary fiber formation device.

FIG. 25A illustrates a scanning electron micrograph (SEM) image of fibers having an exemplary mean diameter of about 416 nanometers formed by an exemplary fiber formation device. The fibers are formed of a polylactic acid (PLA) solution including about 8% by weight of PLA dissolved in chloroform ($CHCl_3$) and DMF (90:1). The exemplary fibers were formed by an exemplary device fiber formation device including a rotating structure provided with saw-shaped protrusions rotated at about 30,000 rpm.

Figure 25B:
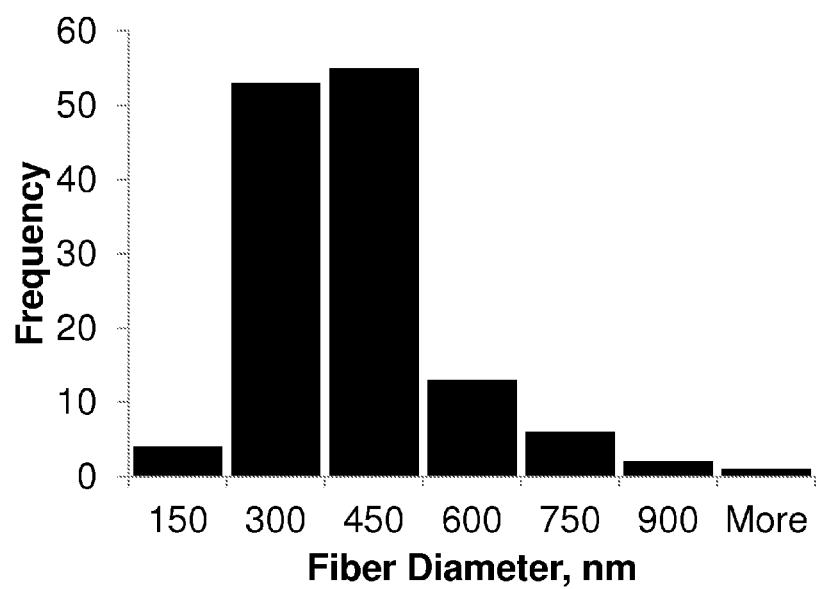
FIG. 25B illustrates a histogram corresponding to the fibers of FIG. 25A of the frequency (along the y-axis) of the number of fibers having different mean fiber diameters in nanometers (along the x-axis).

Exemplary mean diameters of the fibers illustrated in FIG. 25A range from about 150 nanometers to about 900 nanometers and higher. FIG. 25B illustrates a histogram corresponding to the fibers of FIG. 25A of the frequency (along the y-axis) of the number of fibers having different mean fiber diameters in nanometers (along the x-axis). The mean diameter over all of the fibers formed is about 416 nanometers.

Figure 26:
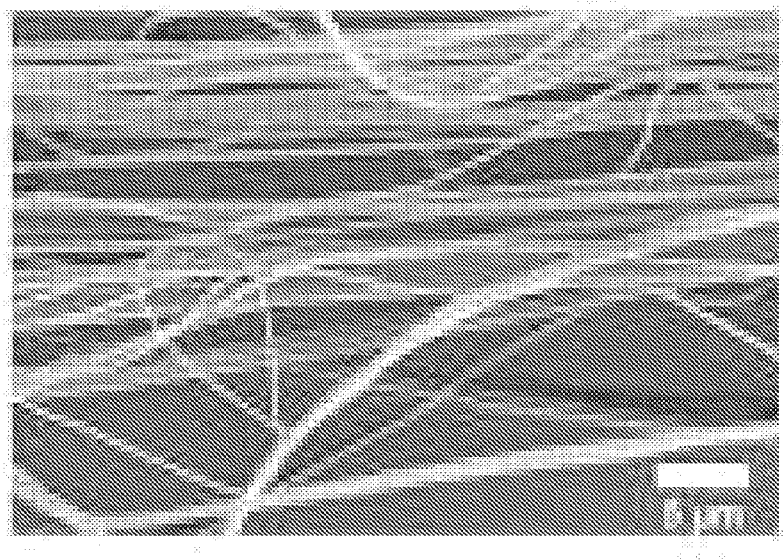
FIG. 26 illustrates a scanning electron micrograph (SEM) image of fibers having an exemplary mean diameter of about 360 nanometers (with an exemplary mean error margin of about 10 nanometers) formed by an exemplary fiber formation device.

FIG. 26 illustrates a scanning electron micrograph (SEM) image of fibers produced using the exemplary device depicted in FIGS. 3A-3C. The fibers were formed by continuously feeding the polymer solution to a platform (a glass slide) through a microchannel. The polymer solution was a polylactic acid (PLA) solution including about 8% by weight of PLA in chloroform ($CHCl_3$). The exemplary fibers were formed by an exemplary fiber formation device including a rotating structure which was rotated continuously at a mean rotational speed of about 8000 rpm. The fibers depicted have an exemplary mean diameter of about 360 nanometers (with an exemplary mean error margin of about 10 nanometers).

Figure 27:
FIG. 27 illustrates a scanning electron micrograph (SEM) image of fibers having an exemplary mean diameter of about 110 nanometers (with an exemplary mean error margin of about 5 nanometers) formed by an exemplary fiber formation device.

FIG. 27 illustrates a scanning electron micrograph (SEM) image of fibers produced using the exemplary device depicted in FIGS. 3A-3C. The fibers were formed by continuously feeding the polymer solution to a platform (a glass slide) through a microchannel. The polymer solution was a polyethylene oxide (PEO) solution including about 2.5% by weight of PEO in a water-ethanol mixture. The exemplary fibers were formed by an exemplary fiber formation device including a rotating structure which was rotated continuously at a mean rotational speed of about 8000 rpm. The fibers depicted have an exemplary mean diameter of about 110 nanometers (with an exemplary mean error margin of about 5 nanometers).

Figure 28:
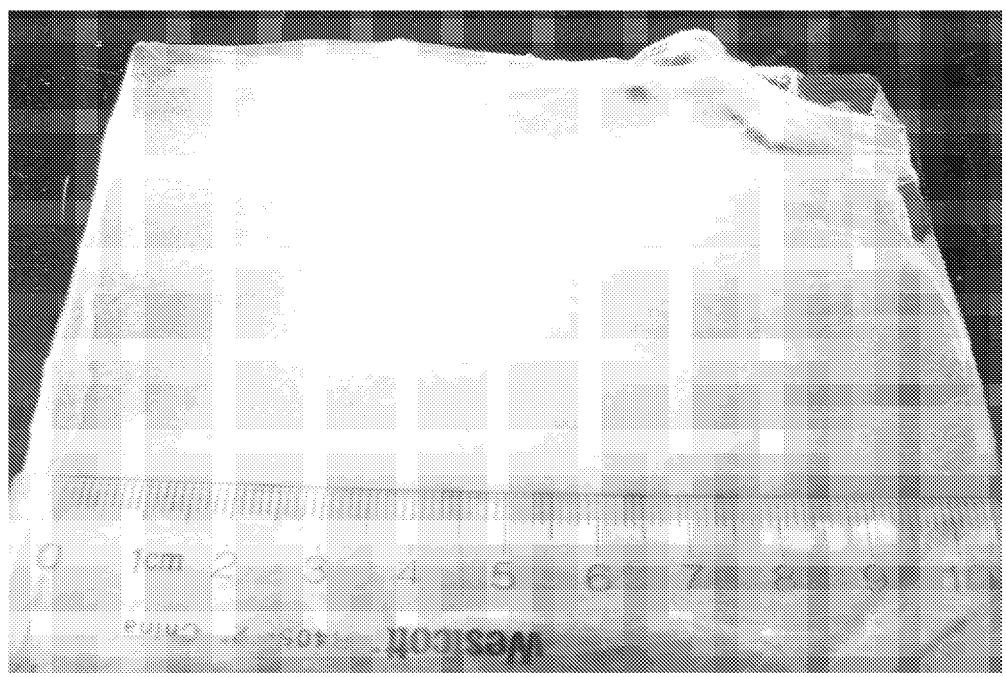
FIG. 28 illustrates a top view of a mesh structure of multiple fibers formed by an exemplary fiber formation device.

FIG. 28 illustrates a top view of a mesh structure of multiple fibers formed of a polymer solution by an exemplary fiber formation device. The polymer solution was a polylactic acid (PLA) solution including about 8% by weight of PLA in chloroform. The exemplary fibers were formed by an exemplary fiber formation device including a rotating structure which was rotated continuously for about 60 seconds at about 60,000 rpm. Due to the high rate of production, the fiber density was relatively high and yielded an opaque mesh structure formed of the fibers.

Figure 41:
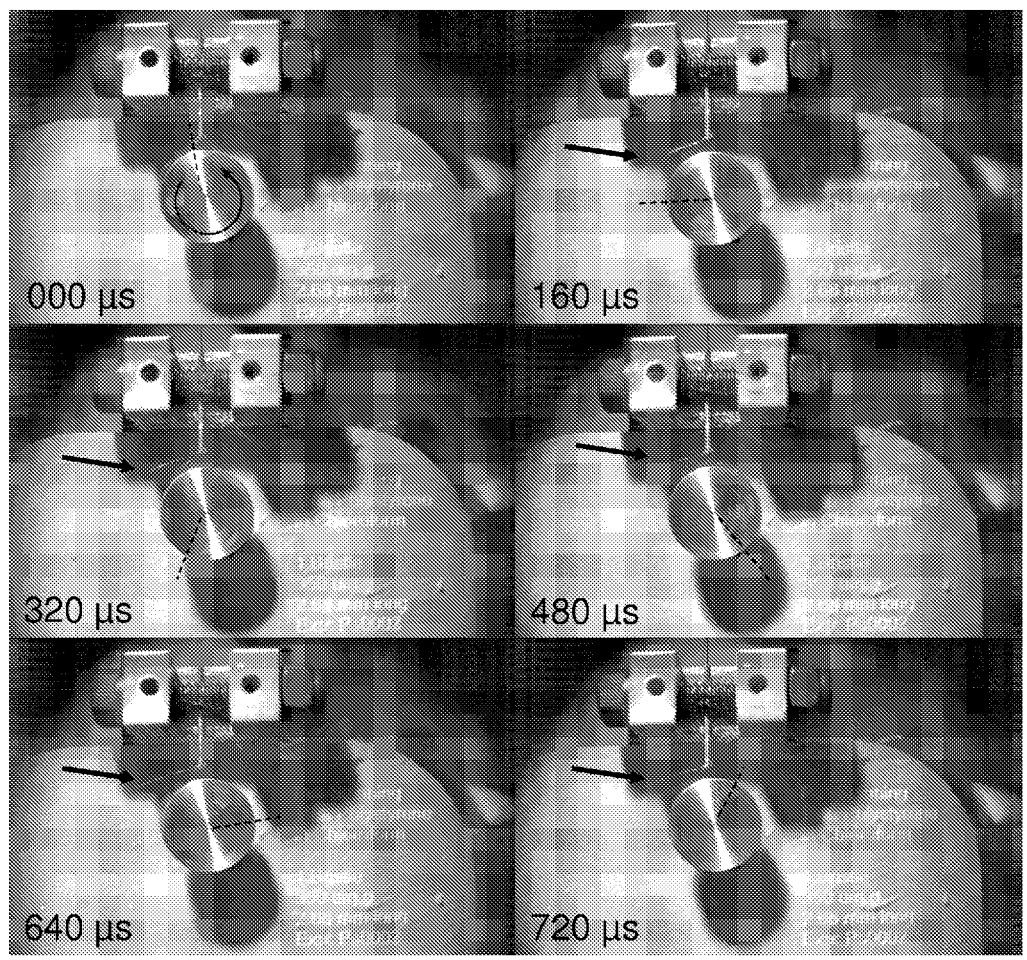
FIG. 41 is a multi-panel image sequence taken using high speed videography illustrating the production of a polymer fiber from a single bristle.

FIG. 41 is a multi-panel image sequence taken using high speed videography illustrating the production of a polymer fiber from a single bristle. A 25 mm central core or mandrel with a single stainless steel bristle, whose dimensions are 350 μm in diameter and 2 mm from the mandrel surface, was rotated in the presence of a polymer droplet. As the bristle passed through the droplet, a polymer fiber was produced. Dashed lines represent the approximate bristle location. Straight arrows indicate the resulting polymer fiber. The curved arrow represents the direction of rotation.

Figure 42:
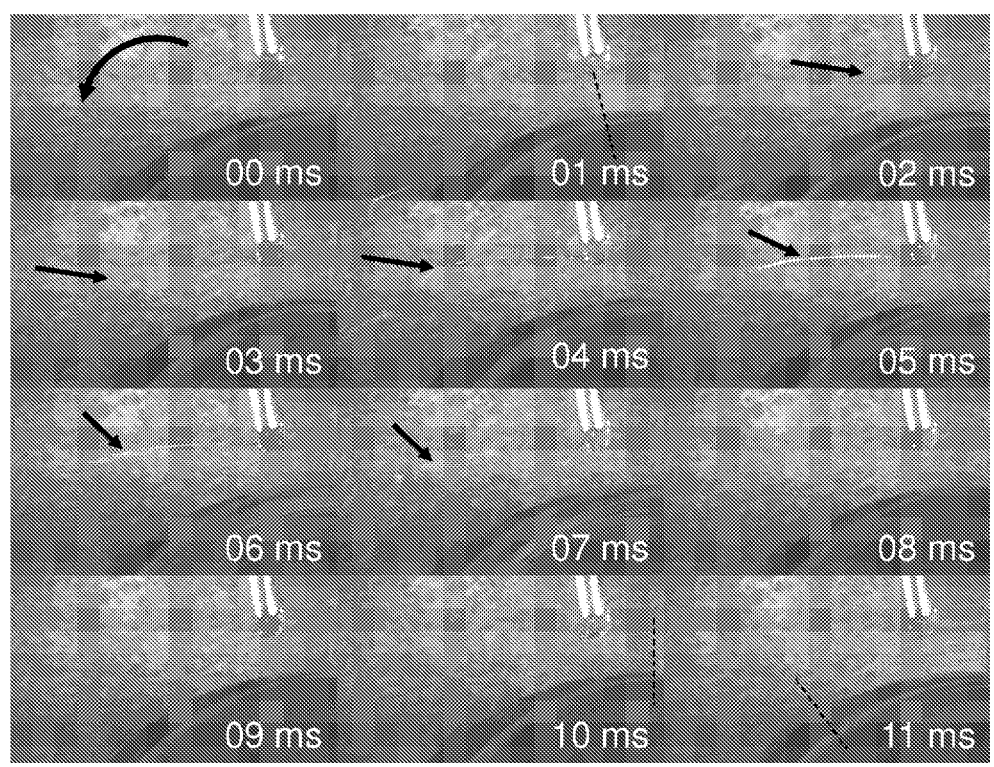
FIG. 42 is a multi-panel image sequence taken using high speed videography illustrating the production of a polymer fiber from a single bristle.

FIG. 42 is a multi-panel image sequence taken using high speed videography illustrating the production of a polymer fiber from a single bristle. A 25 mm mandrel with a single stainless steel bristle, whose dimensions are 350 μm in diameter and 2 mm from the mandrel surface, was rotated in the presence of a polymer droplet. As the bristle passed through the droplet, a polymer fiber was produced. Dashed lines represent the approximate bristle location. Straight arrows indicate the resulting polymer fiber. The curved arrow represents the direction of rotation.

Figure 43:
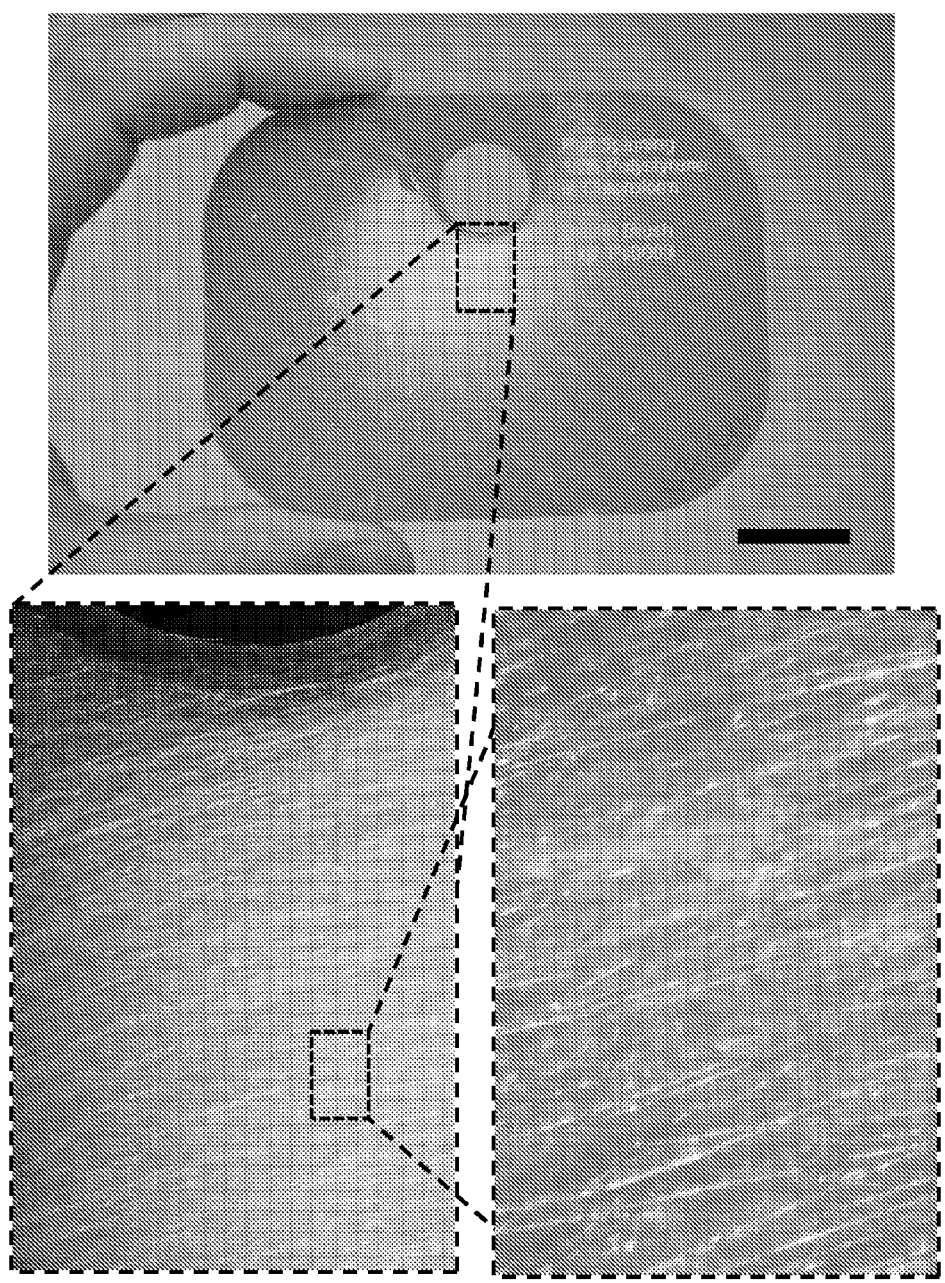
FIG. 43 depicts an exemplary sample of produced polymeric fibers.

FIG. 43 depicts an exemplary sample of produced polymeric fibers. Fibers were produced from 15% polystyrene dissolved in chloroform. A multi-bristle mandrel was rotated at 16,000 RPM in the presence of a polymer droplet whose size was kept consistent by replenishing polymer from a stainless steel tube to produce aligned polymer fibers. Scale bar represents 2 cm.

IX. Use of Exemplary Embodiments in Configuring Fiber Surface Texture and Porosity Exemplary embodiments may be used to create fibers that have a desired surface texture, e.g., rough, smooth, etc. Exemplary embodiments may also be used to create fibers and/or multi-fiber structures (e.g., meshes, mats, etc.) having a desired porosity, i.e., having a desired pore size.

Fiber surface texture and porosity is a function of different factors including, but not limited to, the force imparted to the surface of the liquid material, the depth of penetration of a rotating structure in the liquid material, the volatility of a solvent in the liquid material which affects the solvent evaporation rate, the mechanical characteristics of the liquid material, the temperature and the humidity of the atmosphere surrounding the fibers as they are formed, and the like.

In an exemplary embodiment, the type of solvent may be altered to alter solvent volatility, and therefore the solvent evaporation rate. The evaporation rate of the solvent in the material solution affects the surface texture and porosity of the fibers. Increasing solvent evaporation rates typically result in smoother fibers having lower porosity. A solvent with a higher volatility may be used to form smoother fibers having lower porosity, and vice versa.

In an exemplary embodiment, the temperature of the atmosphere surrounding the fibers may be increased to increase the solvent evaporation rate, and vice versa. Higher temperatures may be used to form smoother fibers having lower porosity, and vice versa. In certain embodiments, the fibers may be formed in an environment at exemplary temperatures including, but not limited to, about 20, 21, 22, 23, 24, 25, 26, 27, 28, 29, or about 30° C.

In an exemplary embodiment, the humidity of the atmosphere surrounding the fibers may be decreased to increase the solvent evaporation rate, and vice versa. Lower humidity may be used to form smoother fibers having lower porosity, and vice versa. In certain embodiments, the fibers may be formed in an environment at exemplary humidity including, but not limited to, about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90% humidity. For example, increasing humidity from about 30% to about 50% results in the fabrication of porous fibers, while decreasing humidity to about 25% results in the fabrication of smooth fibers. As smooth fibers have more tensile strength than porous fibers, in one embodiment, the devices of the invention may be maintained and the methods of the invention may be performed in controlled humidity conditions, e.g., humidity varying by about less than about 10%.

In an exemplary embodiment, the protrusions of an exemplary rotating structure may be configured to increase the jet surface area of the liquid material to increase the solvent evaporation rate, and vice versa.

In some exemplary embodiments, one or more of the above factors may be altered in combination to affect the surface texture and porosity of the fibers.

X. Exemplary Liquid Materials

The fiber formation devices, systems and methods of the invention may be used to make fibers from a range of materials. Exemplary materials are discussed below and include synthetic polymers, such as polyethylene, polypropylene, poly(lactic acid), etc. In some exemplary embodiments, the synthetic polymers may be specifically synthesized to possess domains along the backbone that may be activated for specific purposes including, but not limited to, specific binding, folding, unfolding, etc. Exemplary materials may also include natural polymers, such as chitosan, alginate, gelatin, etc. Exemplary materials may also include naturally occurring polymers e.g., biogenic polymers, e.g., polymers capable of fibrillogenesis, e.g., proteins, polysaccharides, lipids, nucleic acids or combinations thereof. Exemplary materials may also include other suitable materials, e.g., metallic or ceramic materials.

Exemplary biogenic polymers, e.g., fibrous proteins, for use in the devices and methods of exemplary embodiments include, but are not limited to, alginate, silk (e.g., fibroin, sericin, etc.), keratins (e.g., alpha-keratin which is the main protein component of hair, horns and nails, beta-keratin which is the main protein component of scales and claws, etc.), elastins (e.g., tropoelastin, etc.), fibrillin (e.g., fibrillin-1 which is the main component of microfibrils, fibrillin-2 which is a component in elastogenesis, fibrillin-3 which is found in the brain, fibrillin-4 which is a component in elastogenesis, etc.), fibrinogen/fibrins/thrombin (e.g., fibrinogen which is converted to fibrin by thrombin during wound healing), fibronectin, laminin, collagens (e.g., collagen I which is found in skin, tendons and bones, collagen II which is found in cartilage, collagen III which is found in connective tissue, collagen IV which is found in extracellular matrix protein, collagen V which is found in hair, etc.), vimentin, neurofilaments (e.g., light chain neurofilaments NF-L, medium chain neurofilaments NF-M, heavy chain neurofilaments NF-H, etc.), microtubules (e.g., alpha-tubulin, beta-tubulin, etc.), amyloids (e.g., alpha-amyloid, beta-amyloid, etc.), actin, myosins (e.g., myosin I-XVII, etc.), titin which is the largest known protein (also known as connectin), etc.

Exemplary biogenic polymers, e.g., fibrous polysaccharides, for use in the devices and methods of exemplary embodiments include, but are not limited to, chitin which is a major component of arthropod exoskeletons, hyaluronic acid which is found in extracellular space and cartilage (e.g., D-glucuronic acid which is a component of hyaluronic acid, D-N-acetylglucosamine which is a component of hyaluronic acid, etc.), etc.

Exemplary biogenic polymers, e.g., glycosaminoglycans (GAGs) (carbohydrate polymers found in the body), for use in the devices and methods of exemplary embodiments include, but are not limited to, heparan sulfate founding extracelluar matrix, chondroitin sulfate which contributes to tendon and ligament strength, keratin sulfate which is found in extracellular matrix, etc.

Any suitable liquid material may be used in exemplary embodiments to form micron, submicron and/or nanometer dimension fibers. Exemplary materials may include polymers, for example, any naturally occurring polymer including, but not limited to, proteins, polysaccharides, lipids, nucleic acids or combinations of these; any synthetic polymer including, but not limited to, polyesters, polyamides, polyolefin, polycarbonates, polyurethanes, polyanhydrides; and/or any inorganic polymer, including but not limited to, polysilanes, silicones, polyphosphazenes, polygermanes, etc. Other exemplary polymers including, but are not limited to, biocompatible or nonbiocompatible polymers, for example, poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol), poly(acrylic acid), polyacrylamide, poly(ethylene-co-vinyl acetate), poly(ethylene glycol), poly(methacrylic acid), polylactides (PLA), polyglycolides (PGA), poly(lactide-co-glycolides) (PLGA), polyanhydrides, polyphosphazenes, polygermanes, polyorthoesters, polyesters, polyamides, polyolefins, polycarbonates, polyaramides, polyimides, and copolymers and derivatives thereof.

Exemplary materials may include one or more metals or alloys including, but not limited to, titanium, stainless steel, aluminum, etc.

In certain embodiments of the invention, the methods include mixing a biologically active agent, e.g., a polypeptide, protein, nucleic acid molecule, nucleotide, lipid, biocide, antimicrobial, or pharmaceutically active agent, with the polymer before and/or during the fabrication process of the polymeric fibers.

In other embodiments, a plurality of living cells is mixed with the polymer during the fabrication process of the polymeric fibers. In such embodiments, biocompatible polymers (e.g., hydrogels) may be used.

In one embodiment the polymers for use in the devices and methods of the invention may be mixtures of two or more polymers and/or two or more copolymers. In one embodiment the polymers for use in the devices and methods of the invention may be a mixture of one or more polymers and or more copolymers. In another embodiment, the polymers for use in the devices and methods of the invention may be a mixture of one or more synthetic polymers and one or more naturally occurring polymers.

In one embodiment, the polymer is not sugar, e.g., raw sugar, or sucrose. In another embodiment, the polymer is not floss sugar.

In one embodiment, a polymer for use in the methods of the invention is a synthetic polymer. In one embodiment, the polymer is biocompatible. Suitable biocompatible polymers, include, but are not limited to, for example, poly(urethanes), poly(siloxanes) or silicones, poly(ethylene), poly(vinyl pyrrolidone), poly(2-hydroxy ethyl methacrylate), poly(N-vinyl pyrrolidone), poly(methyl methacrylate), poly(vinyl alcohol), poly(acrylic acid), polyacrylamide, poly(ethylene-co-vinyl acetate), poly(ethylene glycol), poly(methacrylic acid), polylactides (PLA), polyglycolides (PGA), poly(lactide-co-glycolides) (PLGA), polyanhydrides, polyphosphazenes, polygermanes, and polyorthoesters, and copolymers and derivatives thereof.

In another embodiment, polymers for use in the polymeric fibers of the invention are not biocompatible. Suitable non-biocompatible polymers, include, but are not limited to, for example, polyesters, polyamides, polyolefins, polycarbonates, polyaramides, polyimides, and copolymers and derivatives thereof.

In yet another embodiment, polymers for use in the polymeric fibers of the invention are naturally occurring polymers. Non-limiting examples of such naturally occurring polymers include, for example, polypeptides, proteins, e.g., capable of fibrillogenesis, polysaccharides, e.g., alginate, lipids, nucleic acid molecules, and combinations thereof.

In one embodiment, a single polymer is used to fabricate the polymeric fibers of the invention. In another embodiment, two, three, four, five, or more polymers are used to fabricate the polymeric fibers of the invention. In one embodiment the polymers for use in the methods of the invention may be mixtures of two or more polymers and/or two or more copolymers. In one embodiment the polymers for use in the methods of the invention may be a mixture of one or more polymers and or more copolymers. In another embodiment, the polymers for use in the methods of the invention may be a mixture of one or more synthetic polymers and one or more naturally occurring polymers.

A polymer for use in the methods of the invention may be supplied to a platform as a polymer solution. Accordingly, the methods of the invention may further comprise dissolving the polymer in a solvent (e.g., chloroform, water, ethanol, isopropanol) prior to supplying the polymer.

Alternatively, the polymer may be supplied to the platform as a polymer melt and, thus, in one embodiment, the portion of the platform supporting the polymer is heated at a temperature suitable for melting the polymer, e.g., heated at a temperature of about 100° C.-300° C., 100° C.-200° C., about 150-300° C., about 150-250° C., or about 150-200° C., 200° C.-250° C., 225° C.-275° C., 220° C.-250° C., or about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Ranges and temperatures intermediate to the recited temperature ranges are also part of the invention. In such embodiments, the platform may further comprise a heating element to heat and/or melt the polymer.

In one embodiment, the polymeric fibers formed according to the methods of the invention are further contacted with an agent to produce or increase the size of pores or number of pores per surface unit area in the polymeric fibers.

The polymeric fibers formed according to the methods of the invention may be contacted with additional agents and optionally cultured in an appropriate medium, such as a tissue culture medium. Contacting the polymeric fibers with the additional agents will allow the agents to, for example, coat (fully or partially) the fibers, or in the case of for example cells, to intercalate between fibers. Contacting the polymer with additional agents during the fabrication of the polymeric fibers also allows the agents to be incorporated into the polymeric fibers themselves.

In one embodiment, a plurality of polymeric fibers may be contacted, e.g., seeded, with a plurality of living cells, e.g., vascular smooth muscle cells, myocytes (e.g., cardiac myocytes), skeletal muscle, myofibroblasts, airway smooth muscle cells, osteoblasts, myoblasts, neuroblasts, fibroblasts, glioblasts, germ cells, hepatocytes, chondrocytes, keratinocytes, connective tissue cells, glial cells, epithelial cells, endothelial cells, vascular endothelial cells, hormone-secreting cells, cells of the immune system, neural cells, and cells that will differentiate into contractile cells (e.g., stem cells, e.g., embryonic stem cells or adult stem cells, progenitor cells or satellite cells). In one embodiment, polymeric fibers treated with a plurality of living cells may be cultured in an appropriate medium in vitro. Such cultured cells exhibit characteristics and functions typical of such cells in vivo. The plurality of living cells may comprise one or more types of cells, such as described in U.S. Provisional Application No. 61/306,736 and PCT Application No. PCT/US09/060,224, entitled "Tissue Engineered Mycocardium and Methods of Productions and Uses Thereof", filed Oct. 9, 2009, the entire contents of each of which are incorporated herein by reference.

The cells may be normal cells, abnormal cells (e.g., those derived from a diseased tissue, or those that are physically or genetically altered to achieve a abnormal or pathological phenotype or function), normal or diseased muscle cells derived from embryonic stem cells or induced pluripotent stem cells.

The term "progenitor cell" is used herein to refer to cells that have a cellular phenotype that is more primitive (e.g., is at an earlier step along a developmental pathway or progression than is a fully differentiated cell) relative to a cell which it can give rise to by differentiation. Often, progenitor cells also have significant or very high proliferative potential. Progenitor cells can give rise to multiple distinct differentiated cell types or to a single differentiated cell type, depending on the developmental pathway and on the environment in which the cells develop and differentiate.

The term "progenitor cell" is used herein synonymously with "stem cell."

The term "stem cell" as used herein, refers to an undifferentiated cell which is capable of proliferation and giving rise to more progenitor cells having the ability to generate a large number of mother cells that can in turn give rise to differentiated, or differentiable daughter cells. The daughter cells themselves can be induced to proliferate and produce progeny that subsequently differentiate into one or more mature cell types, while also retaining one or more cells with parental developmental potential. The term "stem cell" refers to a subset of progenitors that have the capacity or potential, under particular circumstances, to differentiate to a more specialized or differentiated phenotype, and which retains the capacity, under certain circumstances, to proliferate without substantially differentiating. In one embodiment, the term stem cell refers generally to a naturally occurring mother cell whose descendants (progeny) specialize, often in different directions, by differentiation, e.g., by acquiring completely individual characters, as occurs in progressive diversification of embryonic cells and tissues. Cellular differentiation is a complex process typically occurring through many cell divisions. A differentiated cell may derive from a multipotent cell which itself is derived from a multipotent cell, and so on. While each of these multipotent cells may be considered stem cells, the range of cell types each can give rise to may vary considerably. Some differentiated cells also have the capacity to give rise to cells of greater developmental potential. Such capacity may be natural or may be induced artificially upon treatment with various factors. In many biological instances, stem cells are also "multipotent" because they can produce progeny of more than one distinct cell type, but this is not required for "stem-ness." Self-renewal is the other classical part of the stem cell definition. In theory, self-renewal can occur by either of two major mechanisms. Stem cells may divide asymmetrically, with one daughter retaining the stem state and the other daughter expressing some distinct other specific function and phenotype. Alternatively, some of the stem cells in a population can divide symmetrically into two stems, thus maintaining some stem cells in the population as a whole, while other cells in the population give rise to differentiated progeny only. Formally, it is possible that cells that begin as stem cells might proceed toward a differentiated phenotype, but then "reverse" and re-express the stem cell phenotype, a term often referred to as "dedifferentiation" or "reprogramming" or "retrodifferentiation".

The term "embryonic stem cell" is used to refer to the pluripotent stem cells of the inner cell mass of the embryonic blastocyst (see U.S. Pat. Nos. 5,843,780, 6,200,806, the contents of which are incorporated herein by reference). Such cells can similarly be obtained from the inner cell mass of blastocysts derived from somatic cell nuclear transfer (see, for example, U.S. Pat. Nos. 5,945,577, 5,994,619, 6,235,970, which are incorporated herein by reference). The distinguishing characteristics of an embryonic stem cell define an embryonic stem cell phenotype. Accordingly, a cell has the phenotype of an embryonic stem cell if it possesses one or more of the unique characteristics of an embryonic stem cell such that that cell can be distinguished from other cells. Exemplary distinguishing embryonic stem cell characteristics include, without limitation, gene expression profile, proliferative capacity, differentiation capacity, karyotype, responsiveness to particular culture conditions, and the like.

The term "adult stem cell" or "ASC" is used to refer to any multipotent stem cell derived from non-embryonic tissue, including fetal, juvenile, and adult tissue. Stem cells have been isolated from a wide variety of adult tissues including blood, bone marrow, brain, olfactory epithelium, skin, pancreas, skeletal muscle, and cardiac muscle. Each of these stem cells can be characterized based on gene expression, factor responsiveness, and morphology in culture. Exemplary adult stem cells include neural stem cells, neural crest stem cells, mesenchymal stem cells, hematopoietic stem cells, and pancreatic stem cells.

In one embodiment, progenitor cells suitable for use in the claimed devices and methods are Committed Ventricular Progenitor (CVP) cells as described in PCT Application No. PCT/US09/060,224, entitled "Tissue Engineered Myocardium and Methods of Productions and Uses Thereof", filed Oct. 9, 2009, the entire contents of which are incorporated herein by reference.

Cells for seeding can be cultured in vitro, derived from a natural source, genetically engineered, or produced by any other means. Any natural source of prokaryotic or eukaryotic cells may be used. Embodiments in which the polymeric fibers contacted with a plurality of living cells are implanted in an organism can use cells from the recipient, cells from a conspecific donor or a donor from a different species, or bacteria or microbial cells.

In one embodiment of the invention, a plurality of polymeric fibers is contacted with a plurality of muscle cells and cultured such that a living tissue is produced. In another embodiment of the invention, a plurality of polymeric fibers is contacted with a plurality of muscle cells and cultured such that a living tissue is produced, and the living tissue is further contacted with neurons, and cultured such that a living tissue with embedded neural networks is produced.

In one particular embodiment, the living tissue is an anisotropic tissue, e.g., a muscle thin film.

In other embodiments of the invention, a plurality of polymeric fibers is contacted with a biologically active polypeptide or protein, such as, collagen, fibrin, elastin, laminin, fibronectin, integrin, hyaluronic acid, chondroitin 4-sulfate, chondroitin 6-sulfate, dermatan sulfate, heparin sulfate, heparin, and keratan sulfate, and proteoglycans. In one embodiment, the polypeptide or protein is lipophilic.

In still other embodiments, the polymeric fibers are contacted with nucleic acid molecules and/or nucleotides, or lipids.

A plurality of polymeric fibers may also be contacted with a pharmaceutically active agent. Suitable pharmaceutically active agents include, for example, anesthetics, hypnotics, sedatives and sleep inducers, antipsychotics, antidepressants, antiallergics, antianginals, antiarthritics, antiasthmatics, antidiabetics, antidiarrheal drugs, anticonvulsants, antigout drugs, antihistamines, antipruritics, emetics, antiemetics, antispasmodics, appetite suppressants, neuroactive substances, neurotransmitter agonists, antagonists, receptor blockers and reuptake modulators, beta-adrenergic blockers, calcium channel blockers, disulfiram and disulfiram-like drugs, muscle relaxants, analgesics, antipyretics, stimulants, anticholinesterase agents, parasympathomimetic agents, hormones, anticoagulants, antithrombotics, thrombolytics, immunoglobulins, immunosuppressants, hormone agonists/antagonists, vitamins, antimicrobial agents, antineoplastics, antacids, digestants, laxatives, cathartics, antiseptics, diuretics, disinfectants, fungicides, ectoparasiticides, antiparasitics, heavy metals, heavy metal antagonists, chelating agents, gases and vapors, alkaloids, salts, ions, autacoids, digitalis, cardiac glycosides, antiarrhythmics, antihypertensives, vasodilators, vasoconstrictors, antimuscarinics, ganglionic stimulating agents, ganglionic blocking agents, neuromuscular blocking agents, adrenergic nerve inhibitors, anti-oxidants, vitamins, cosmetics, anti-inflammatories, wound care products, antithrombogenic agents, antitumoral agents, antiangiogenic agents, anesthetics, antigenic agents, wound healing agents, plant extracts, growth factors, emollients, humectants, rejection/anti-rejection drugs, spermicides, conditioners, antibacterial agents, antifungal agents, antiviral agents, antibiotics, biocidal agents, anti-biofouling agents, tranquilizers, cholesterol-reducing drugs, antitussives, histamine-blocking drugs, or monoamine oxidase inhibitors.

Other suitable pharmaceutically active agents include growth factors and cytokines. Growth factors useful in the present invention include, but are not limited to, transforming growth factor-α ("TGF-α"), transforming growth factor-β("TGF-β"), platelet-derived growth factors including the AA, AB and BB isoforms ("PDGF"), fibroblast growth factors ("FGF"), including FGF acidic isoforms 1 and 2, FGF basic form 2, and FGF 4, 8, 9 and 10, nerve growth factors ("NGF") including NGF 2.5s, NGF 7.0s and beta NGF and neurotrophins, brain derived neurotrophic factor, cartilage derived factor, bone growth factors (BGF), basic fibroblast growth factor, insulin-like growth factor (IGF), vascular endothelial growth factor (VEGF), granulocyte colony stimulating factor (G-CSF), insulin like growth factor (IGF) I and II, hepatocyte growth factor, glial neurotrophic growth factor (GDNF), stem cell factor (SCF), keratinocyte growth factor (KGF), transforming growth factors (TGF), including TGFs alpha, beta, beta1, beta2, and beta3, skeletal growth factor, bone matrix derived growth factors, and bone derived growth factors and mixtures thereof. Cytokines useful in the present invention include, but are not limited to, cardiotrophin, stromal cell derived factor, macrophage derived chemokine (MDC), melanoma growth stimulatory activity (MGSA), macrophage inflammatory proteins 1 alpha (MIP-1alpha), 2, 3 alpha, 3 beta, 4 and 5, IL-1, IL-2, IL-3, IL-4, IL-5, IL-6, IL-7, IL-8, IL-9, IL-10, IL-11, IL-12, IL-13, TNF-α, and TNF-β. Immunoglobulins useful in the present invention include, but are not limited to, IgG, IgA, IgM, IgD, IgE, and mixtures thereof.

Other agents that may be used to contact the polymeric fibers of the invention, include, but are not limited to, growth hormones, leptin, leukemia inhibitory factor (LIF), tumor necrosis factor alpha and beta, endostatin, angiostatin, thrombospondin, osteogenic protein-1, bone morphogenetic proteins 2 and 7, osteonectin, somatomedin-like peptide, osteocalcin, interferon alpha, interferon alpha A, interferon beta, interferon gamma, interferon 1 alpha, amino acids, peptides, polypeptides, and proteins, e.g., structural proteins, enzymes, and peptide hormones.

For agents such as nucleic acids, any nucleic acid can be used to contact the polymeric fibers. Examples include, but are not limited to deoxyribonucleic acid (DNA), ent-DNA, and ribonucleic acid (RNA). Embodiments involving DNA include, but are not limited to, cDNA sequences, natural DNA sequences from any source, and sense or anti-sense oligonucleotides. For example, DNA can be naked (e.g., U.S. Pat. Nos. 5,580,859; 5,910,488) or complexed or encapsulated (e.g., U.S. Pat. Nos. 5,908,777; 5,787,567). DNA can be present in vectors of any kind, for example in a viral or plasmid vector. In some embodiments, nucleic acids used will serve to promote or to inhibit the expression of genes in cells inside and/or outside the polymeric fibers. The nucleic acids can be in any form that is effective to enhance uptake into cells.

Agents used to treat the polymeric fibers of the invention may also be cell fragments, cell debris, organelles and other cell components, tablets, and viruses as well as vesicles, liposomes, capsules, nanoparticles, and other agents that serve as an enclosure for molecules. In some embodiments, the agents constitute vesicles, liposomes, capsules, or other enclosures that contain agents that are released at a time after contacting, such as at the time of implantation or upon later stimulation or interaction. In one illustrative embodiment, transfection agents such as liposomes contain desired nucleotide sequences to be incorporated into cells that are located in or on the polymeric fibers.

Magnetically or electrically reactive materials are examples of other agents that are optionally used to contact the polymeric fibers of the present invention. Examples of magnetically active materials include but are not limited to ferrofluids (colloidal suspensions of magnetic particles), and various dispersions of electrically conducting polymers. Ferrofluids containing particles approximately 10 nanometers in diameter, polymer-encapsulated magnetic particles about 1-2 microns in diameter, and polymers with a glass transition temperature below room temperature are particularly useful. Examples of electrically active materials are polymers including, but not limited to, electrically conducting polymers such as polyanilines and polypyrroles, ionically conducting polymers such as sulfonated polyacrylamides are related materials, and electrical conductors such as carbon black, graphite, carbon nanotubes, metal particles, and metal-coated plastic or ceramic materials.

Suitable biocides for contacting the polymeric fibers of the invention, include, but are not limited to, organotins, brominated salicylanilides, mercaptans, quaternary ammonium compounds, mercury compounds, and compounds of copper and arsenic.

Antimicrobial agents, which include antibacterial agents, antiviral agents, antifungal agents, and anti-parasitic agents, may also be used to contact the polymeric fibers of the invention.

The present invention is also directed to the polymeric fibers produced using the methods and device of the invention, as well as, tissues, membranes, filters, and drug delivery device, e.g., polymeric fibers treated with, e.g., a pharmaceutically active agent, comprising the polymeric fibers of the invention.

XI. Use of Polymeric Fibers Formed Using Exemplary Embodiments

Exemplary polymeric fibers formed using exemplary embodiments may be used in a broad range of applications, including, but not limited to, manufacture of engineered tissue and organs, including structures such as patches or plugs of tissues or matrix material, prosthetics, and other implants, tissue scaffolding for, e.g., fractal neural and/or vascular networks, repair or dressing of wounds, hemostatic devices, devices for use in tissue repair and support such as sutures, surgical and orthopedic screws, and surgical and orthopedic plates, natural coatings or components for synthetic implants, cosmetic implants and supports, repair or structural support for organs or tissues, substance delivery, bioengineering platforms, platforms for testing the effect of substances upon cells, cell culture, catalytic substrates, photonics, filtration, protective clothing, cell scaffolding, drug delivery, wound healing, food products, and numerous other uses.

One of the benefits of the polymeric fibers of the invention is that they can be used to tightly control the biotic/abiotic interface. In other words, the polymeric fibers of the invention can be used to direct the growth and/or development of specific cell and/or tissue types.

For example, in one embodiment, the polymeric fibers of the invention may be used to prepare a membrane, which is useful as, for example, a dressing for wounds or injuries of any type. Stem cells, fibroblasts, epithelial cells, and/or endothelial cells may be included to allow tissue growth. In certain embodiments, use of the polymeric fibers will, in addition to providing support, will direct and/or impede desired cells types to the area of a wound or injury. For example, use of the polymeric fibers to repair the heart may include the addition of any suitable substance that will direct cells to differentiate into, for example, myocytes, rather than, for example, fibroblasts, and/or encourage the migration of a desired cell type to migrate to the area of the wound. Such methods will ensure that the repair is biologically functional and/or discourage, for example restonosis. Such use of the polymeric fibers may be combined with other methods of treatment, repair, and contouring.

In another embodiment, a polymeric fiber membrane can be inserted as a filler material into wounds to enhance healing by providing a substrate that does not have to be synthesized by fibroblasts and other cells, thereby decreasing healing time and reducing the metabolic energy requirement to synthesize new tissue at the site of the wound.

Several uses of polymeric fiber membranes are possible in the field of surgical repair or construction. For example, membranes of the present invention may be used to make tissue or orthopedic screws, plates, sutures, or sealants that are made of the same material as the tissue in which the devices will be used.

In other exemplary embodiments, polymeric fiber membranes may be used to form, e.g., a sleeve to use as reinforcement for aneurysms or at the site of an anastamosis. Such sleeves are placed over the area at which reinforcement is desired and sutured, sealed, or otherwise attached to the vessel. Polymeric fiber membranes may also be used as hemostatic patches and plugs for leaks of cerebrospinal fluid. Yet another use is as an obstruction of the punctum lacryma for a patient suffering from dry eye syndrome.

Polymeric fiber membranes may also be used to support or connect tissue or structures that have experienced injury, surgery, or deterioration. For example, such membranes may be used in a bladder neck suspension procedure for patients suffering from postpartum incontinence. Rectal support, vaginal support, hernia patches, and repair of a prolapsed uterus are other illustrative uses. The membranes may be used to repair or reinforce weakened or dysfunctional sphincter muscles, such as the esophageal sphincter in the case of esophageal reflux. Other examples include reinforcing and replacing tissue in vocal cords, epiglottis, and trachea after removal, such as in removal of cancerous tissue.

Other uses for the membranes of the invention include, for example, preparing an obstruction or reinforcement for an obstruction to a leak. For example, to seal openings in lungs after lung volume reduction (partial removal).

Another exemplary us of the polymeric fibers of the invention is as a barrier for the prevention of post-operative induced adhesion(s).

Yet another exemplary use of the polymeric fibers of the invention is to serve as a template for nerve growth.

In another embodiment of the invention, the polymeric fibers may be used to prepare a filter. Such filters are useful for filtration of contaminants, biological agents and hazardous but very small particles, e.g., nanoparticles. For example, a polymeric fiber filter of the invention may be used to purify liquids, such as water, e.g., drinking water, oil, e.g., when used in an automobile oil filter. In another embodiment, a polymeric fiber filter may be used to purify air when used in, e.g., a face mask, to filter out viruses, bacteria and hazardous nanoparticles.

The polymeric fibers of the invention may also be incorporated into biosensor devices, e.g., a device that uses a biological element (e.g., enzyme, antibody, whole cell, etc.) to monitor the presence of various chemicals on a substrate by enabling highly specific interactions between biological molecules to be detected and utilized, e.g., as a biorecognition surface. Such biosensors may be used in various applications such as the monitoring of pollutants in water, air, and soil, and in the detection of medically important molecules such as hormones, sugars, and peptides in body fluids, and for pathogen detection.

In yet other embodiments of the invention, the polymeric fibers may be used to prepare textiles. In one embodiment, the textile are biological protective textiles, e.g., textiles that provide protection from toxic agents, e.g., biological and chemical toxins. For example, the polymeric fibers may include, e.g., chlorhexidine, which can kill most bacteria, or an oxime that can break down organophosphates, chemicals that are the basis of many pesticides, insecticides and nerve gases.

In another embodiment, the polymeric fibers of the invention may be used to prepare food products. For example, polymeric fibers may be made of an edible polymer, e.g., alginate, to which a flavoring, e.g., fruit flavoring or chocolate, may be added. In one embodiment, the food product is not cotton candy.

In another embodiment, the polymeric fibers of the invention may be used to prepare furniture upholstery.

In another embodiment, the polymeric fibers of the invention may be used to form or manufacture medical devices.

In another embodiment, the polymeric fibers of the invention may be used to create fibers inside the cavity of a body, e.g., inside an organ like the heart.

Another use of the polymeric fibers of the present invention is the delivery of one or more substances to a desired location and/or in a controlled manner. In some embodiments, the polymeric fibers are used to deliver the materials, e.g., a pharmaceutically active substance. In other embodiments, the polymeric fibers materials are used to deliver substances that are contained in the polymeric fibers or that are produced or released by substances contained in the polymeric fibers materials. For example, polymeric fibers containing cells can be implanted in a body and used to deliver molecules produced by the cells after implantation. The present compositions can be used to deliver substances to an in vivo location, an in vitro location, or other locations. The present compositions can be applied or administered to these locations using any method.

The ability to seed the polymeric fibers of the invention with living cells also provides the ability to build tissue, organs, or organ-like tissues. Cells included in such tissues or organs can include cells that serve a function of delivering a substance, seeded cells that will provide the beginnings of replacement tissue, or both.

In one embodiment of the invention, a plurality of polymeric fibers are treated with a plurality of living cells and cultured under appropriate conditions to produce a bioengineered tissue.

In some embodiments, polymeric fibers contacted or seeded with living cells are combined with a drug such that the function of the implant will improve. For example, antibiotics, anti-inflammatories, local anesthetics or combinations thereof, can be added to the cell-treated polymeric fibers of a bioengineered organ to speed the healing process.

Examples of bioengineered tissue include, but are not limited to, bone, dental structures, joints, cartilage, (including, but not limited to articular cartilage), skeletal muscle, smooth muscle, cardiac muscle, tendons, menisci, ligaments, blood vessels, stents, heart valves, corneas, ear drums, nerve guides, tissue or organ patches or sealants, a filler for missing tissues, sheets for cosmetic repairs, skin (sheets with cells added to make a skin equivalent), soft tissue structures of the throat such as trachea, epiglottis, and vocal cords, other cartilaginous structures such as articular cartilage, nasal cartilage, tarsal plates, tracheal rings, thyroid cartilage, and arytenoid cartilage, connective tissue, vascular grafts and components thereof, and sheets for topical applications, and repair of organs such as livers, kidneys, lungs, intestines, pancreas visual system, auditory system, nervous system, and musculoskeletal system.

In one particular embodiment, a plurality of polymeric fibers are contacted with a plurality of living muscle cells and cultured under appropriate conditions to guide cell growth with desired anisotropy to produce a muscle thin film (MTF) or a plurality of MTFs prepared as described in U.S. Patent Publication No. 20090317852 and PCT Publication No. WO 2010/127280, the entire contents of each of which are incorporated herein by reference.

Polymeric fibers contacted with living cells can also be used to produce prosthetic organs or parts of organs. Mixing of committed cell lines in a three dimensional polymeric fiber matrix can be used to produce structures that mimic complex organs. The ability to shape the polymeric fibers allows for preparation of complex structures to replace organs such as liver lobes, pancreas, other endocrine glands, and kidneys. In such cases, cells are implanted to assume the function of the cells in the organs. Preferably, autologous cells or stem cells are used to minimize the possibility of immune rejection.

In some embodiments, polymeric fibers contacted with living cells are used to prepare partial replacements or augmentations. For example, in certain disease states, organs are scarred to the point of being dysfunctional. A classic example is hepatic cirrhosis. In cirrhosis, normal hepatocytes are trapped in fibrous bands of scar tissue. In one embodiment of the invention, the liver is biopsied, viable liver cells are obtained, cultured in a plurality of polymeric fibers, and re-implanted in the patient as a bridge to or replacement for routine liver transplantations.

In another example, by growing glucagon secreting cells, insulin secreting cells, somatostatin secreting cells, and/or pancreatic polypeptide secreting cells, or combinations thereof, in separate cultures, and then mixing them together with polymeric fibers, an artificial pancreatic islet is created. These structures are then placed under the skin, retroperitoneally, intrahepatically or in other desirable locations, as implantable, long-term treatments for diabetes.

In other examples, hormone-producing cells are used, for example, to replace anterior pituitary cells to affect synthesis and secretion of growth hormone secretion, luteinizing hormone, follicle stimulating hormone, prolactin and thyroid stimulating hormone, among others. Gonadal cells, such as Leydig cells and follicular cells are employed to supplement testosterone or estrogen levels. Specially designed combinations are useful in hormone replacement therapy in post and perimenopausal women, or in men following decline in endogenous testosterone secretion. Dopamine-producing neurons are used and implanted in a matrix to supplement defective or damaged dopamine cells in the substantia nigra. In some embodiments, stem cells from the recipient or a donor can be mixed with slightly damaged cells, for example pancreatic islet cells, or hepatocytes, and placed in a plurality of polymeric fibers and later harvested to control the differentiation of the stem cells into a desired cell type. In other embodiments thyroid cells can be seeded and grown to form small thyroid hormone secreting structures. This procedure is performed in vitro or in vivo. The newly formed differentiated cells are introduced into the patient.

Bioengineered tissues are also useful for measuring tissue activities or functions, investigating tissue developmental biology and disease pathology, as well as in drug discovery and toxicity testing.

Accordingly, the present invention also provides methods for identifying a compound that modulates a tissue function. The methods include providing a bioengineered tissue produced using the devices of the invention and according to the methods of the invention, such as a muscle thin film; contacting the bioengineered tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound that modulates a tissue function.

In another aspect, the present invention also provides methods for identifying a compound useful for treating or preventing a disease. The methods include providing a bioengineered tissue produced using the devices of the invention and according to the methods of the invention, e.g., a muscle thin film; contacting a bioengineered tissue with a test compound; and determining the effect of the test compound on a tissue function in the presence and absence of the test compound, wherein a modulation of the tissue function in the presence of the test compound as compared to the tissue function in the absence of the test compound indicates that the test compound modulates a tissue function, thereby identifying a compound useful for treating or preventing a disease.

The methods of the invention generally comprise determining the effect of a test compound on an bioengineered tissue as a whole, however, the methods of the invention may comprise further evaluating the effect of a test compound on an individual cell type(s) of the bioengineered tissue.

The methods of the invention may involve contacting a single bioengineered tissue with a test compound or a plurality of bioengineered tissues with a test compound.

As used herein, the various forms of the term "modulate" are intended to include stimulation (e.g., increasing or upregulating a particular response or activity) and inhibition (e.g., decreasing or downregulating a particular response or activity).

As used herein, the term "contacting" (e.g., contacting a bioengineered tissue with a test compound) is intended to include any form of interaction (e.g., direct or indirect interaction) of a test compound and a bioengineered tissue. The term contacting includes incubating a compound and a bioengineered tissue (e.g., adding the test compound to a bioengineered tissue).

Test compounds, may be any agents including chemical agents (such as toxins), small molecules, pharmaceuticals, peptides, proteins (such as antibodies, cytokines, enzymes, and the like), and nucleic acids, including gene medicines and introduced genes, which may encode therapeutic agents, such as proteins, antisense agents (i.e., nucleic acids comprising a sequence complementary to a target RNA expressed in a target cell type, such as RNAi or siRNA), ribozymes, and the like.

The test compound may be added to a bioengineered tissue by any suitable means. For example, the test compound may be added drop-wise onto the surface of a bioengineered tissue of the invention and allowed to diffuse into or otherwise enter the bioengineered tissue, or it can be added to the nutrient medium and allowed to diffuse through the medium. In the embodiment where the bioengineered tissue is cultured in a multi-well plate, each of the culture wells may be contacted with a different test compound or the same test compound. In one embodiment, the screening platform includes a microfluidics handling system to deliver a test compound and simulate exposure of the microvasculature to drug delivery.

Numerous physiologically relevant parameters, e.g., insulin secretion, conductivity, neurotransmitter release, lipid production, bile secretion, e.g., muscle activities, e.g., biomechanical and electrophysiological activities, can be evaluated using the polymeric fiber tissues of the invention. For example, in one embodiment, the polymeric fiber tissues of the present invention can be used in contractility assays for muscular cells or tissues, such as chemically and/or electrically stimulated contraction of vascular, airway or gut smooth muscle, cardiac muscle or skeletal muscle. In addition, the differential contractility of different muscle cell types to the same stimulus (e.g., pharmacological and/or electrical) can be studied.

In another embodiment, the bioengineered tissues of the present invention can be used for measurements of solid stress due to osmotic swelling of cells. For example, as the cells swell the polymeric fiber tissues will bend and as a result, volume changes, force and points of rupture due to cell swelling can be measured.

In another embodiment, the bioengineered tissues of the present invention can be used for pre-stress or residual stress measurements in cells. For example, vascular smooth muscle cell remodeling due to long term contraction in the presence of endothelin-1 can be studied.

Further still, the bioengineered tissues of the present invention can be used to study the loss of rigidity in tissue structure after traumatic injury, e.g., traumatic brain injury. Traumatic stress can be applied to vascular smooth muscle bioengineered tissues as a model of vasospasm. These bioengineered tissues can be used to determine what forces are necessary to cause vascular smooth muscle to enter a hyper-contracted state. These bioengineered tissues can also be used to test drugs suitable for minimizing vasospasm response or improving post-injury response and returning vascular smooth muscle contractility to normal levels more rapidly.

In other embodiments, the bioengineered tissues of the present invention can be used to study biomechanical responses to paracrine released factors (e.g., vascular smooth muscle dilation due to release of nitric oxide from vascular endothelial cells, or cardiac myocyte dilation due to release of nitric oxide).

In other embodiments, the bioengineered tissues of the invention can be used to evaluate the effects of a test compound on an electrophysiological parameter, e.g., an electrophysiological profile comprising a voltage parameter selected from the group consisting of action potential, action potential duration (APD), conduction velocity (CV), refractory period, wavelength, restitution, bradycardia, tachycardia, reentrant arrhythmia, and/or a calcium flux parameter, e.g., intracellular calcium transient, transient amplitude, rise time (contraction), decay time (relaxation), total area under the transient (force), restitution, focal and spontaneous calcium release. For example, a decrease in a voltage or calcium flux parameter of a bioengineered tissue comprising cardiomyocytes upon contacting the bioengineered tissue with a test compound, would be an indication that the test compound is cardiotoxic.

In yet another embodiment, the bioengineered tissues of the present invention can be used in pharmacological assays for measuring the effect of a test compound on the stress state of a tissue. For example, the assays may involve determining the effect of a drug on tissue stress and structural remodeling of the bioengineered tissues. In addition, the assays may involve determining the effect of a drug on cytoskeletal structure and, thus, the contractility of the bioengineered tissues.

In still other embodiments, the bioengineered tissues of the present invention can be used to measure the influence of biomaterials on a biomechanical response. For example, differential contraction of vascular smooth muscle remodeling due to variation in material properties (e.g., stiffness, surface topography, surface chemistry or geometric patterning) of bioengineered tissues can be studied.

In further embodiments, the bioengineered tissues of the present invention can be used to study functional differentiation of stem cells (e.g., pluripotent stem cells, multipotent stem cells, induced pluripotent stem cells, and progenitor cells of embryonic, fetal, neonatal, juvenile and adult origin) into contractile phenotypes. For example, the polymeric fibers of the invention are treated with undifferentiated cells, e.g., stem cells, and differentiation into a contractile phenotype is observed by thin film bending. Differentiation can be observed as a function of: co-culture (e.g., co-culture with differentiated cells), paracrine signaling, pharmacology, electrical stimulation, magnetic stimulation, thermal fluctuation, transfection with specific genes and biomechanical perturbation (e.g., cyclic and/or static strains)

In another embodiment, the bioengineered tissues of the invention may be used to determine the toxicity of a test compound by evaluating, e.g., the effect of the compound on an electrophysiological response of a bioengineered tissue. For example, opening of calcium channels results in influx of calcium ions into the cell, which plays an important role in excitation-contraction coupling in cardiac and skeletal muscle fibers. The reversal potential for calcium is positive, so calcium current is almost always inward, resulting in an action potential plateau in many excitable cells. These channels are the target of therapeutic intervention, e.g., calcium channel blocker sub-type of anti-hypertensive drugs. Candidate drugs may be tested in the electrophysiological characterization assays described herein to identify those compounds that may potentially cause adverse clinical effects, e.g., unacceptable changes in cardiac excitation, that may lead to arrhythmia.

For example, unacceptable changes in cardiac excitation that may lead to arrhythmia include, e.g., blockage of ion channel requisite for normal action potential conduction, e.g., a drug that blocks $Na^+$ channel would block the action potential and no upstroke would be visible; a drug that blocks $Ca^{2+}$ channels would prolong repolarization and increase the refractory period; blockage of $K^+$ channels would block rapid repolarization, and, thus, would be dominated by slower $Ca^{2+}$ channel mediated repolarization.

In addition, metabolic changes may be assessed to determine whether a test compound is toxic by determining, e.g., whether contacting a bioengineered tissue with a test compound results in a decrease in metabolic activity and/or cell death. For example, detection of metabolic changes may be measured using a variety of detectable label systems such as fluorometric/chromogenic detection or detection of bioluminescence using, e.g., AlamarBlue fluorescent/chromogenic determination of REDOX activity (Invitrogen), REDOX indicator changes from oxidized (non-fluorescent, blue) state to reduced state (fluorescent, red) in metabolically active cells; Vybrant MTT chromogenic determination of metabolic activity (Invitrogen), water soluble MTT reduced to insoluble formazan in metabolically active cells; and Cyquant NF fluorescent measurement of cellular DNA content (Invitrogen), fluorescent DNA dye enters cell with assistance from permeation agent and binds nuclear chromatin. For bioluminescent assays, the following exemplary reagents is used: Cell-Titer Glo luciferase-based ATP measurement (Promega), a thermally stable firefly luciferase glows in the presence of soluble ATP released from metabolically active cells.

The bioengineered tissues of the invention are also useful for evaluating the effects of particular delivery vehicles for therapeutic agents e.g., to compare the effects of the same agent administered via different delivery systems, or simply to assess whether a delivery vehicle itself (e.g., a viral vector or a liposome) is capable of affecting the biological activity of the bioengineered tissue. These delivery vehicles may be of any form, from conventional pharmaceutical formulations, to gene delivery vehicles. For example, the devices of the invention may be used to compare the therapeutic effect of the same agent administered by two or more different delivery systems (e.g., a depot formulation and a controlled release formulation). The bioengineered tissues of the invention may also be used to investigate whether a particular vehicle may have effects of itself on the tissue. As the use of gene-based therapeutics increases, the safety issues associated with the various possible delivery systems become increasingly important. Thus, the bioengineered tissues of the present invention may be used to investigate the properties of delivery systems for nucleic acid therapeutics, such as naked DNA or RNA, viral vectors (e.g., retroviral or adenoviral vectors), liposomes and the like. Thus, the test compound may be a delivery vehicle of any appropriate type with or without any associated therapeutic agent.

Furthermore, the bioengineered tissues of the present invention are a suitable in vitro model for evaluation of test compounds for therapeutic activity with respect to, e.g., a muscular and/or neuromuscular disease or disorder. For example, the bioengineered tissues of the present invention (e.g., comprising muscle cells) may be contacted with a candidate compound by, e.g., immersion in a bath of media containing the test compound, and the effect of the test compound on a tissue activity (e.g., a biomechanical and/or electrophysiological activity) may measured as described herein, as compared to an appropriate control, e.g., an untreated bioengineered tissue. Alternatively, a bioengineered tissue of the invention may be bathed in a medium containing a candidate compound, and then the cells are washed, prior to measuring a tissue activity (e.g., a biomechanical and/or electrophysiological activity) as described herein. Any alteration to an activity determined using the bioengineered tissue in the presence of the test agent (as compared to the same activity using the device in the absence of the test compound) is an indication that the test compound may be useful for treating or preventing a tissue disease, e.g., a neuromuscular disease.

Additional contemplated uses of the polymeric fibers of the invention are disclosed in, for example, PCT Publication Nos.: WO 2008/045506, WO 2003/099230, and WO 2004/032713, the entire contents of which are incorporated herein by reference.

This invention is further illustrated by the following examples which should not be construed as limiting. The contents of all references, patents and published patent applications cited throughout this application, as well as the Figures, are hereby incorporated herein in their entirety by reference.

EXAMPLES

Example 1

The Effect of Varying Rotational Speed on Fiber Formation and Fiber Diameter

Fibers were fabricated from an 8% solution of polylactic acid dissolved in chloroform. The exemplary fiber formation device of FIG. 29 was used, in which the brush was rotated at exemplary rotational speeds of about 35,000 rpm and about 15,000 rpm. A gap distance between the rotating brush and the collector was about 10 cm, and the flow rate of the polylactic acid was about 12 ml/hour.

Figure 31:
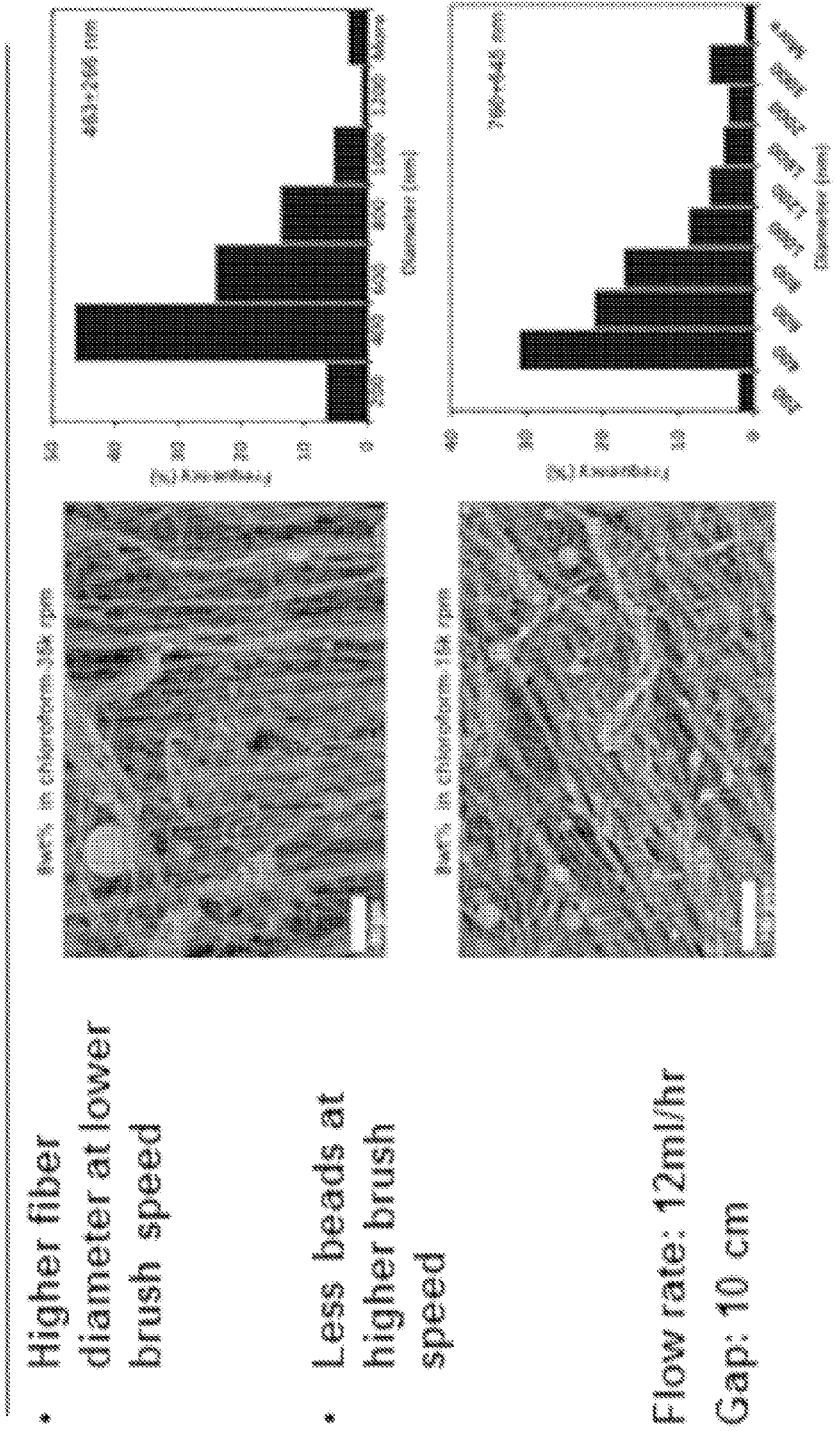
FIG. 31 illustrates scanning electron micrographs of fibers fabricated using the exemplary device depicted in FIG. 29 and graphs illustrating exemplary fiber diameters.

FIG. 31 illustrates scanning electron micrographs of fibers fabricated and graphs illustrating exemplary fiber diameters. As depicted in FIG. 31, higher rotational speeds (e.g., about 35,000 rpm) provide higher stretching forces to the polymer jet as it is being flung. This allows the polymer jet to extend farther, thereby facilitating fiber formation and resulting in fewer beads formed in the fibers. In addition, higher rotational speeds (e.g., about 35,000 rpm) result in lower fiber diameters than fiber diameters achieved by lower rotational speeds (e.g., about 15,000 rpm). Exemplary fibers formed at about 35,000 rpm rotational speed may have an exemplary average diameter of about 463 nm, while exemplary fibers formed at about 15,000 rpm may have an exemplary average diameter of about 760 nm.

Example 2

The Effect of Varying Polymer Concentration and Polymer Flow Rate on Fiber Formation Fibers were fabricated using an 6% solution of polylactic acid dissolved in chloroform and the rotational speed of the exemplary fiber forming device depicted in FIG. 29 with a gap of about 10 cm and a flow rate of the polymer of about 2 ml/hour was varied from about 5,000 rpm, 15,000 rpm, and 35,000 rpm.

Figure 32:
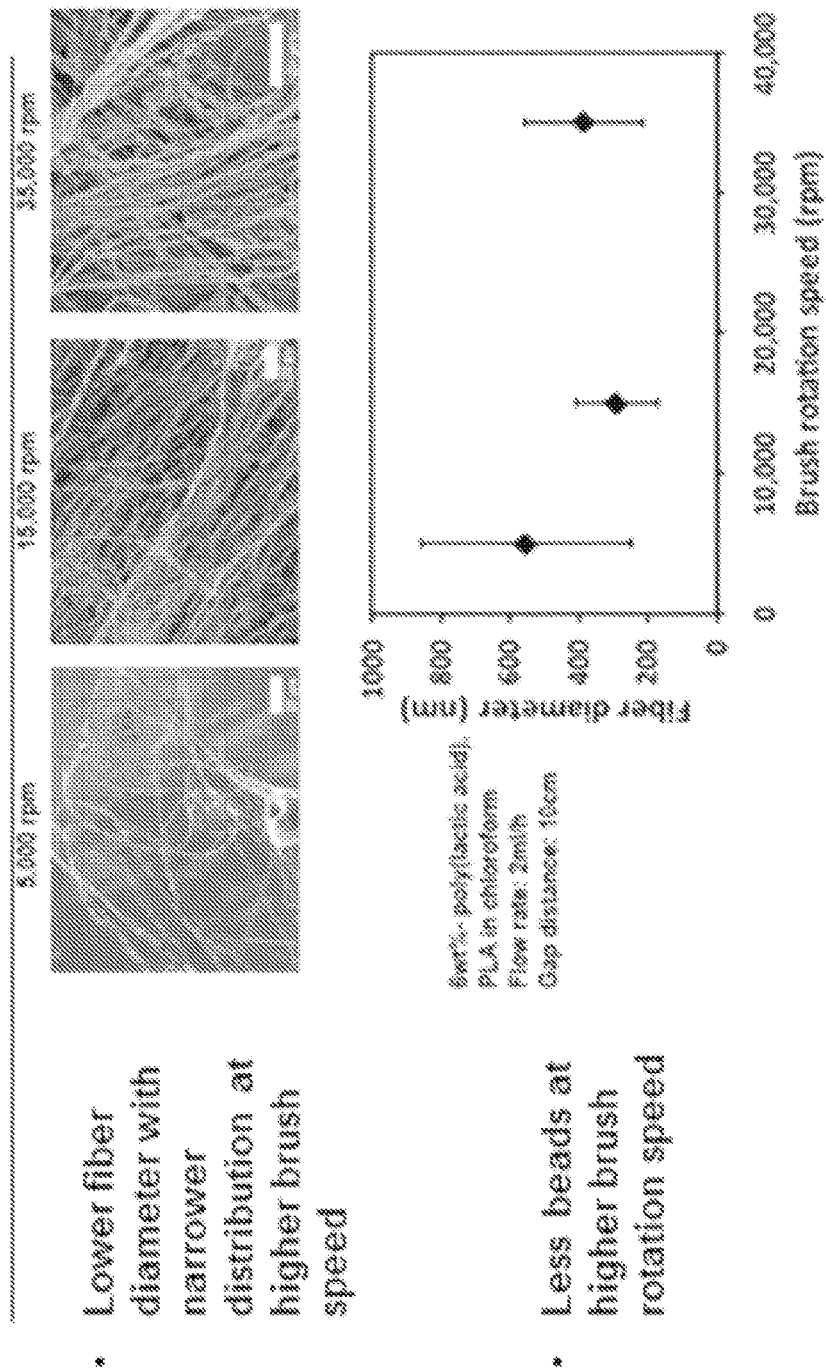
FIGS. 32 and 33 illustrate scanning electron micrographs of fibers fabricated using the exemplary device depicted in FIG. 29 and a graph demonstrating the effect of varying rotation speed on fiber diameter.

FIG. 32 illustrates scanning electron micrographs of fibers fabricated using the exemplary device depicted in FIG. 29 and a graph demonstrating the effect of varying rotational speed on fiber diameter. As depicted in FIG. 32, higher rotational speeds (e.g., about 35,000 rpm) provide higher stretching forces to the polymer jet as it is being flung. This allows the polymer jet to extend farther, thereby facilitating fiber formation and resulting in fewer beads formed in the fibers. In addition, higher rotational speeds (e.g., about 35,000 rpm) result in lower fiber diameters with narrower distribution than fiber diameters achieved by lower rotational speeds (e.g., about 5,000 rpm).

Example 3

Figure 33:
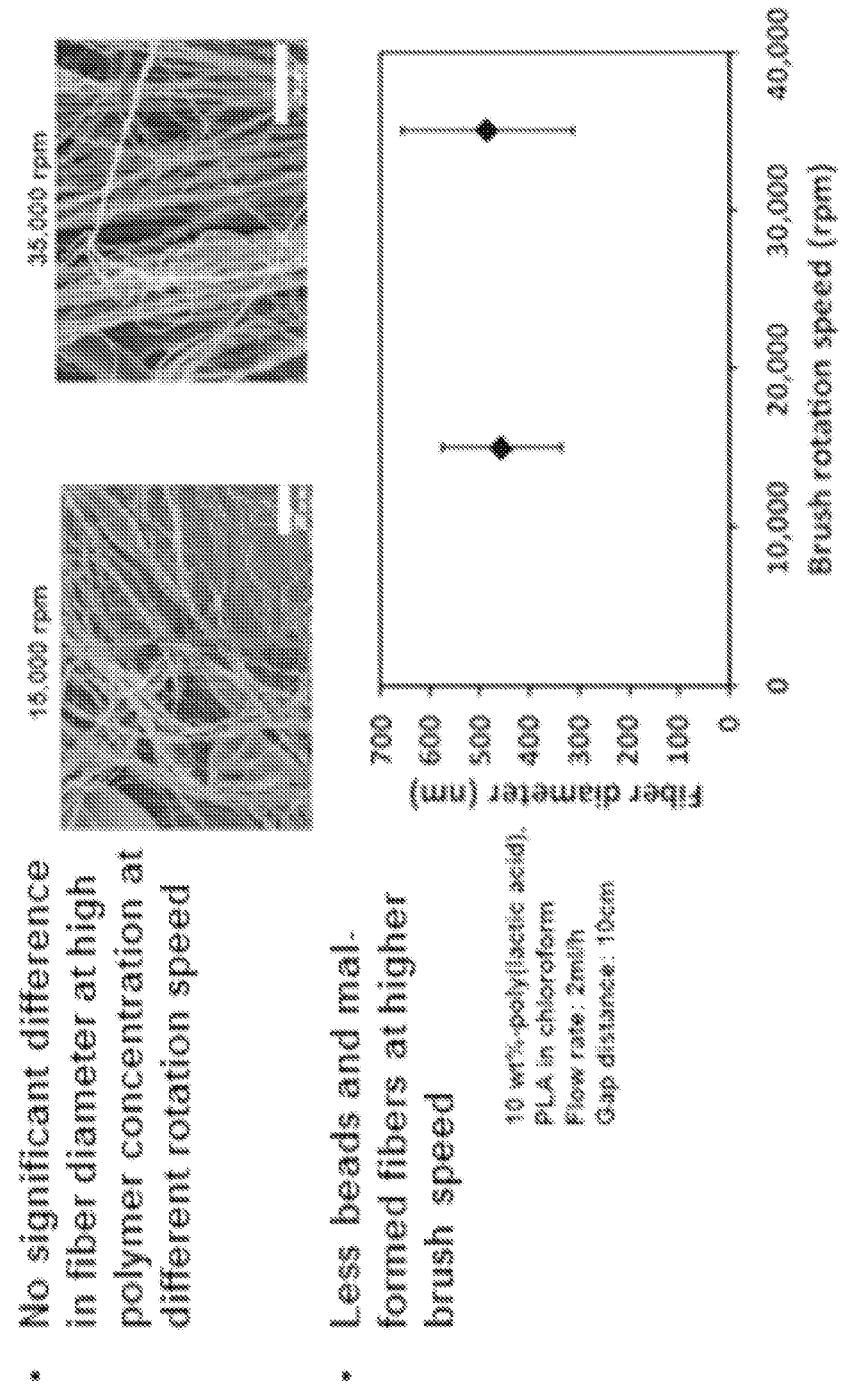

The Effect of Varying Polymer Concentration and Polymer Flow Rate on Fiber Formation Fibers were fabricated using an 10% solution of polylactic acid dissolved in chloroform and the rotational speed of the exemplary fiber forming device depicted in FIG. 29 with a gap distance of about 10 cm and a flow rate of the polymer of about 2 ml/hour was varied from about 15,000 rpm to about 35,000 rpm. As depicted in FIG. 33, higher rotational speeds (about 35,000 rpm) provide more force and fewer beads form in the fibers. Varying the speed had no effect on fiber diameter in this example.

Example 4

The Effect of Varying Rotation Speed and Polymer Flow Rate on Fiber Formation

Figure 34:
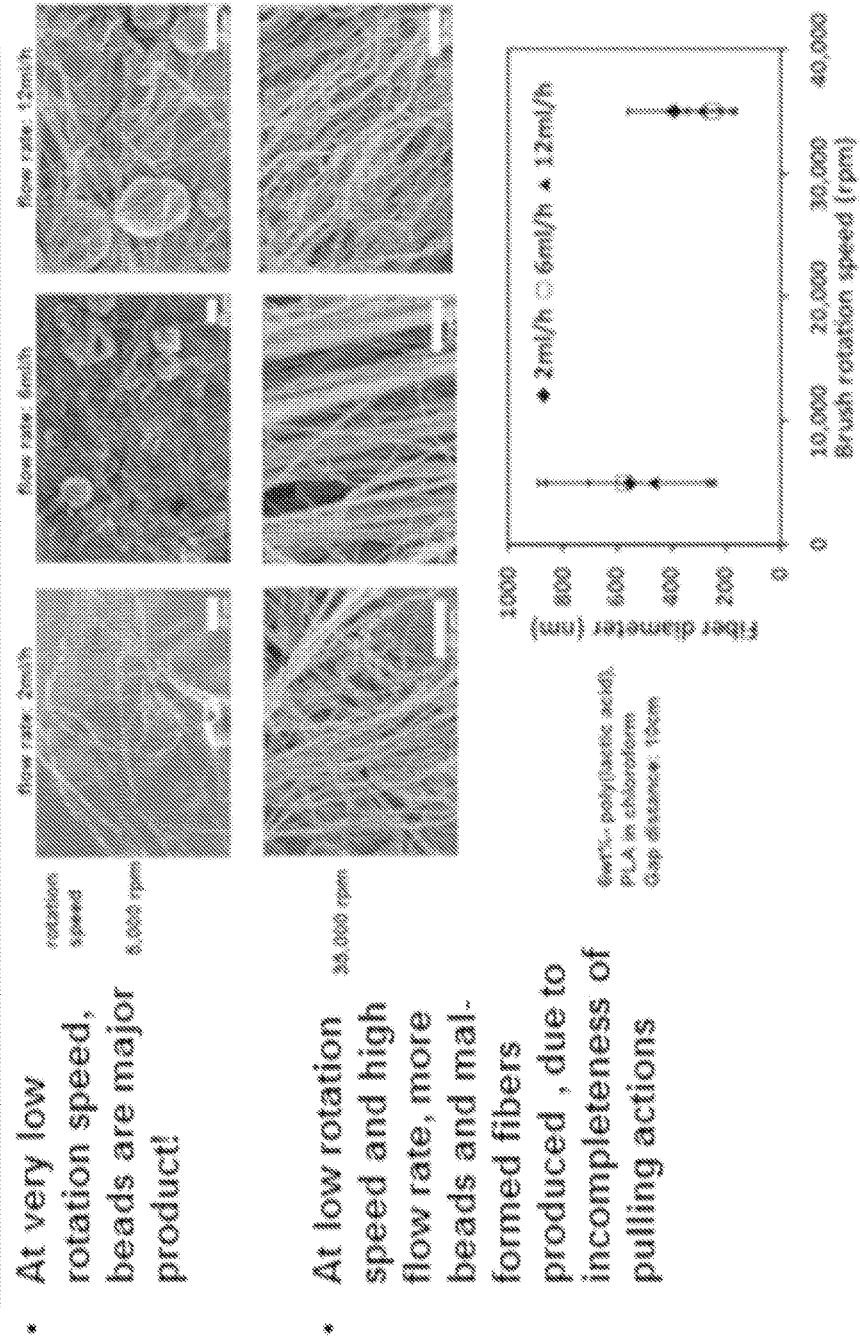
FIGS. 34 and 35 illustrate scanning electron micrographs of fibers fabricated using the exemplary device depicted in FIG. 29 and a graph demonstrating the effect of varying rotation speed and polymer flow rate on fiber diameter.

Fibers were fabricated using an 6% solution of polylactic acid dissolved in chloroform and the rotational speed of the exemplary fiber forming device depicted in FIG. 29 with a gap of about 10 cm, a flow rate of the polymer varying from about 2 ml/hour, 6 ml/hour, and 12 ml/hour and speeds varying from about 5,000 rpm and 35,000 rpm. As depicted in FIG. 34, at low rotational speeds beads are formed. At low rotational speeds and high flow rates, more beads and malformed fibers are formed.

Example 5

The Effect of Varying Rotation Speed and Polymer Flow Rate on Fiber Formation

Figure 35:
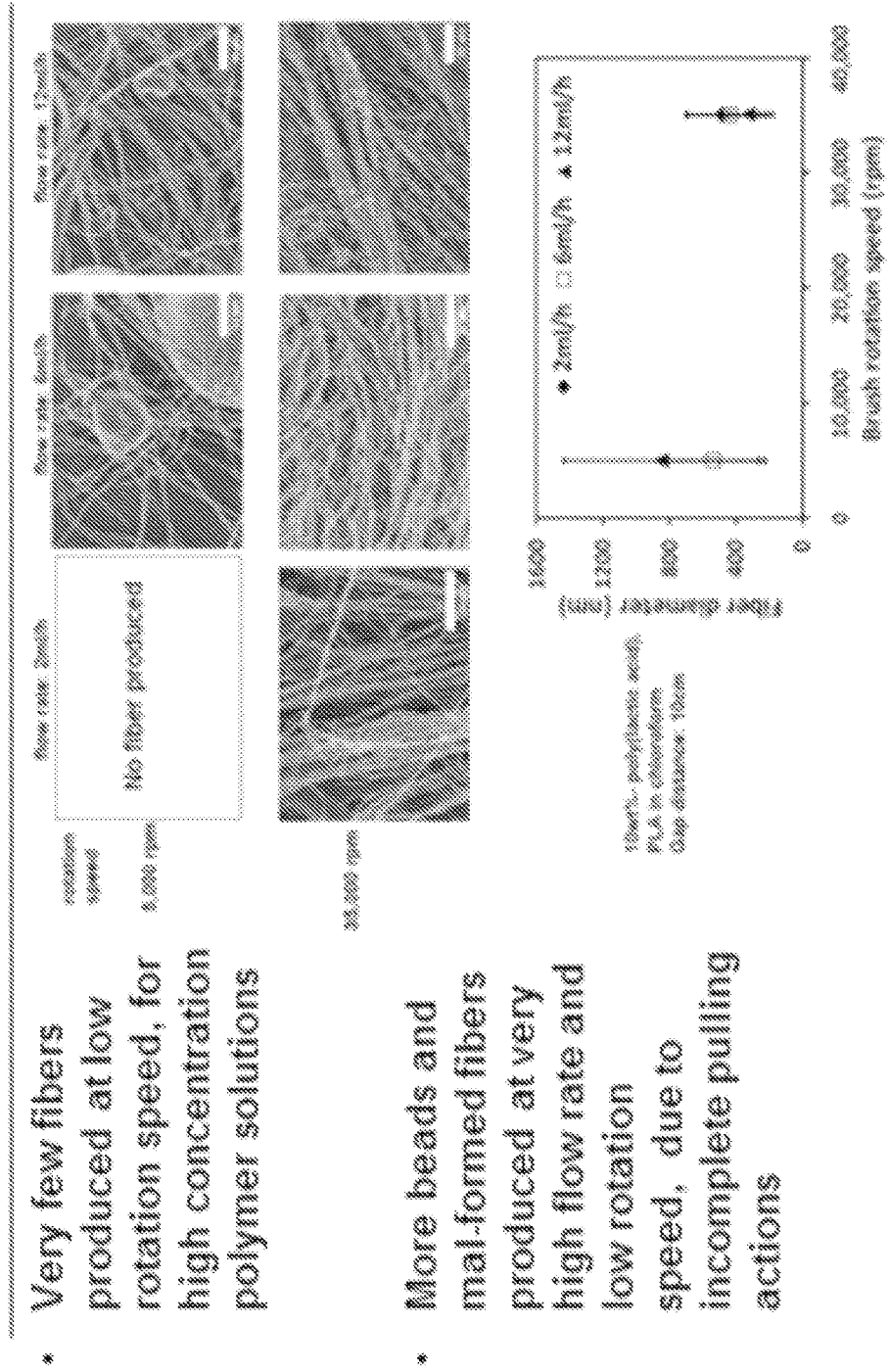

Fibers were fabricated using an 10% solution of polylactic acid dissolved in chloroform and the rotational speed of the exemplary fiber forming device depicted in FIG. 29 with a gap of about 10 cm, a flow rate of the polymer varying from about 2 ml/hour, 6 ml/hour, and 12 ml/hour and speeds varying from about 5,000 rpm and 35,000 rpm. As depicted in FIG. 35, at low rotational speeds very few fibers are produced for high concentration polymer solutions, e.g., about 10%. At low rotational speeds and high flow rates, more beads and malformed fibers are formed.

Example 6

Use of Polymer Melts

Figure 36:
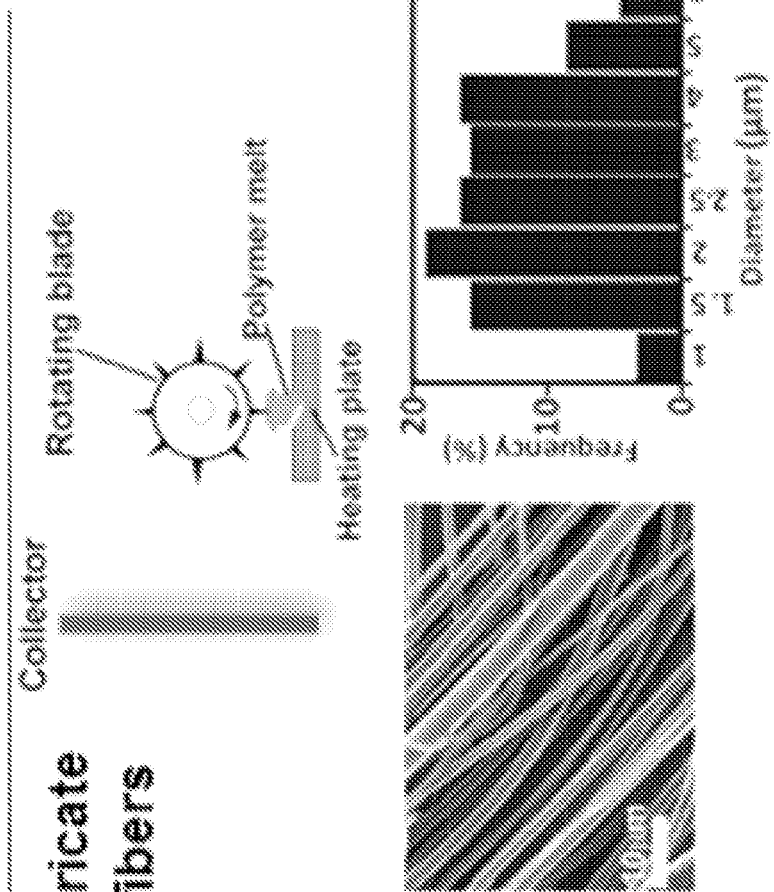
FIG. 36 illustrates an exemplary fiber formation device including a heating element for heating a polymer melt, a scanning electron micrograph of fibers fabricated using a polymer melt and the exemplary fiber formation device, and a graph showing exemplary diameters of the fabricated fibers.

FIG. 36 illustrates an exemplary fiber formation device including a heating element for heating a polymer melt, a scanning electron micrograph of fibers fabricated using a polymer melt and the exemplary fiber formation device, and a graph showing exemplary diameters of the fabricated fibers.

As depicted in FIG. 36, melt-spun fibers have a smoother surface and more uniform structure as compared to solvent-spun fibers. In some cases, the average diameter of the fibers that are melt-spun is higher than fibers spun from solvents due to the high viscosity of the polymer melts. Exemplary fibers formed from a polymer melt may have an exemplary diameter of about 2.6 microns.

INCORPORATION BY REFERENCE

The entire contents of all references, including patents and patent applications, cited throughout this application are hereby incorporated herein by reference in their entirety. The appropriate components and methods of those references may be selected for the invention and embodiments thereof. Still further, the components and methods identified in the Background section are integral to this disclosure and may be used in conjunction with or substituted for components and methods described elsewhere in the disclosure within the scope of the invention.

EQUIVALENTS

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

What is claimed is:

1. A method for forming a micron, submicron or nanometer dimension polymeric fiber, the method comprising:
providing a stationary deposit of a liquid material comprising a polymer solution or a polymer melt; and
making a contact with a surface of the liquid material in the stationary deposit to impart sufficient momentary force thereto in order to:
decouple a portion of the liquid material from the deposit, and
fling the portion of the liquid material away from the contact and from the deposit of the liquid material, wherein the force is applied substantially parallel to the surface of the liquid material by a rotating structure that penetrates the stationary deposit of the liquid material during its rotation, thereby forming a micron, submicron or nanometer dimension polymeric fiber.

2. The method of claim 1, wherein the rotating structure includes a blade and a central core, and wherein the blade is affixed to an outer surface of the central core.

3. The method of claim 2, wherein the rotating structure penetrates the liquid material to a depth of between 1 nanometer and 1 centimeter.

4. The method of claim 2, wherein the rotating structure rotates at a rate between 100 rpm and 500,000 rpm.

5. The method of claim 1, further comprising:
imparting a second force to the surface of the liquid material to form a second micron, submicron or nanometer dimension polymeric fiber, wherein the first and second fibers are aligned substantially in the same direction, or wherein the first and second fibers are aligned in different directions.

6. The method of claim 1, further comprising:
introducing a gas into the liquid material before or during the imparting of the force to the surface of the liquid material in order to facilitate formation of a meniscus.

7. The method of claim 1, further comprising:
increasing air turbulence experienced by the fiber using one or more air blades disposed in the vicinity of the liquid material.

8. The method of claim 6, wherein the gas is introduced by carbonation of the polymer.

9. The method of claim 1, further comprising:
providing the stationary deposit of the liquid material before or during formation of the fiber.

10. The method of claim 9, wherein the liquid material is provided using a micro- or macro-channel.

11. The method of claim 1, further comprising:
collecting the polymeric fiber using a collector.

12. The method of claim 11, wherein the collector is stationary or moveable.

13. The method of claim 1, further comprising:
imparting a second force to the surface of the polymer to form a second micron, submicron or nanometer dimension polymeric fiber, wherein the first and second fibers are aligned in different directions.

14. The method of claim 1, wherein the liquid material comprises a polymer solution.

15. The method of claim 1, wherein the fiber has a diameter of between 1 nanometer and 100 microns.

16. The method of claim 1, further comprising:
directing the fiber using a conduit that provides a pathway for the fiber.

17. The method of claim 1, further comprising contacting the micron, submicron or nanometer dimension polymeric fiber with a plurality of living cells.

18. The method of claim 17, wherein the living cells are selected from the group consisting of muscle cells, neuron cells, endothelial cells, and epithelial cells, or a combination thereof.

19. The method of claim 18, wherein the living cells are cultured such that a living tissue is produced.

20. The method of claim 1, further comprising contacting the micron, submicron or nanometer dimension polymeric fiber with a biologically active agent.

21. The method of claim 1, wherein the micron, submicron or nanometer dimension polymeric fiber is treated with a pharmaceutically active agent.

22. The method of claim 1, wherein the liquid material is mixed with living cells during formation of the polymer fiber to produce cell-encapsulated fibers.

23. The method of claim 1, wherein the liquid material further comprises a biologically active agent selected from the group consisting of proteins, nucleotides, lipids, drugs, pharmaceutically active agents, biocidal, and antimicrobial agents.

24. The method of claim 1, wherein the surface penetrating by the rotating structure is a free surface of the liquid material.

\* \* \* \* \*